(12) United States Patent  
Matsuoka et al.

(10) Patent No.: US 7,216,250 B2  
(45) Date of Patent: May 8, 2007

(54) CLOCK CONTROL CIRCUIT FOR CORRECTING FREQUENCY OF SECOND CLOCK SIGNAL BASED ON FIRST CLOCK SIGNAL AND MONITORING OSCILLATION STATE OF FIRST CLOCK SIGNAL BASED ON SECOND CLOCK SIGNAL

(75) Inventors: Toshihiko Matsuoka, Nukata-gun (JP); Yoshinori Teshima, Toyota (JP); Shinichi Noda, Okazaki (JP); Susumu Tsuruta, Okazaki (JP); Hiroshi Fujii, Nukata-gun (JP); Hideaki Ishihara, Okazaki (JP)

(73) Assignee: DENSO Corporation, Kariya (JP)

( * ) Notice: Subject to any disclaimer, the term of this patent is extended or adjusted under 35 U.S.C. 154(b) by 406 days.

(21) Appl. No.: 10/744,645

(22) Filed: Dec. 23, 2003

(65) Prior Publication Data

US 2004/0158761 A1 Aug. 12, 2004

(30) Foreign Application Priority Data

Dec. 27, 2002 (JP) .............................. 2002-380002

(51) Int. Cl.  
*G06F 1/04* (2006.01)

(52) U.S. Cl. ...................................... 713/503; 713/600

(58) Field of Classification Search ................ 713/500, 713/600; 327/292, 298  
See application file for complete search history.

(56) References Cited

U.S. PATENT DOCUMENTS

| 3,708,686 | A | * | 1/1973 | Butler et al. ................. 307/149 |
|---|---|---|---|---|
| 5,969,558 | A | * | 10/1999 | Abe ............................ 327/292 |
| 6,629,256 | B1 | * | 9/2003 | Ilan et al. .................... 713/501 |
| 6,639,441 | B2 | * | 10/2003 | Ono et al. ................... 327/175 |
| 6,670,839 | B2 | * | 12/2003 | Kitahara ...................... 327/292 |
| 6,759,911 | B2 | * | 7/2004 | Gomm et al. ................. 331/10 |
| 6,845,457 | B1 | * | 1/2005 | Mirov et al. ................. 713/322 |
| 6,928,566 | B2 | * | 8/2005 | Nunomura ................... 713/322 |
| 2002/0097075 | A1 | | 7/2002 | Ono et al. |

FOREIGN PATENT DOCUMENTS

| JP | 5-165543 | 7/1993 |
|---|---|---|
| JP | 6-75827 | 3/1994 |
| JP | 6-138975 | 5/1994 |
| JP | 11-305888 | 11/1999 |
| JP | 2000-357089 | 12/2000 |
| JP | 2000-357947 | 12/2000 |
| JP | 2001-111389 | 4/2001 |
| JP | 2002-217697 | 8/2002 |

* cited by examiner

*Primary Examiner*—Chun Cao  
(74) *Attorney, Agent, or Firm*—Harness, Dickey & Pierce, PLC

(57) ABSTRACT

The present invention relates to a clock control circuit apparatus including a first oscillation circuit for generating a first clock signal and a second oscillation circuit for generating a second clock signal and capable of, when the two clock signals are put to use, improving the reliability of oscillation operations thereof. In the clock control circuit apparatus, a sub-clock correction unit corrects an oscillation frequency of a sub-clock signal on the basis of a main clock signal, while a main clock monitoring unit monitors an oscillation state of the main clock signal on the basis of the sub-clock signal.

10 Claims, 35 Drawing Sheets

IN (g), 0: ROM READOUT PERMISSION, 1: ROM READOUT INHIBITION

CLOCK CONTROL CIRCUIT FOR CORRECTING FREQUENCY OF SECOND CLOCK SIGNAL BASED ON FIRST CLOCK SIGNAL AND MONITORING OSCILLATION STATE OF FIRST CLOCK SIGNAL BASED ON SECOND CLOCK SIGNAL

BACKGROUND OF THE INVENTION

1) Field of the Invention

The present invention relates to a clock control circuit apparatus equipped with an oscillation circuit for generating a first clock signal through the use of an oscillator and a CR oscillation circuit capable of adjusting an oscillation frequency of a second clock signal, and further to a microcomputer equipped with the clock control circuit apparatus.

In addition, the present invention relates to a microcomputer including an oscillation circuit for generating a first clock signal through the use of an oscillator and a CR oscillation circuit capable of adjusting an oscillation frequency of a second clock signal and having a function to correct the oscillation frequency of the second clock signal on the basis of the first clock signal, and further to a clock signal oscillation frequency adjusting method.

Still additionally, the present invention relates to an oscillation circuit apparatus capable of conducting an oscillating operation at a frequency determined in accordance with a set oscillation control condition and capable of temporarily stopping the oscillation operation.

Moreover, the present invention relates to a microcomputer including a frequency multiplication circuit for multiplying a frequency of a reference clock signal to output the frequency-multiplied reference clock signal and a CPU capable of supplying the multiplied clock signal as an operation clock signal.

Still moreover, the present invention relates to a microcomputer provided with a CPU capable of setting a low power dissipation mode to stop its operation temporarily while maintaining its internal state.

Yet moreover, the present invention relates to a memory interface circuit apparatus connected between a CPU and one or more ROMs providing a data bus width larger than that of the CPU to, when the CPU reads out data from the ROM, control the readout of the data.

2) Description of the Related Art

Japanese Patent Laid-Open Nos. HEI 6-138975, 6-75827 and 5-165543 disclose the techniques of improving the reliability at the start of oscillation by detecting a rise (leading) of a clock (stable state of the oscillation frequency) or monitoring an oscillation state of an oscillation circuit and using a watch dog timer and of making the switching to another clock signal when a clock signal stops.

In addition, Japanese Patent Laid-Open No. HEI 11-337597 discloses a microcomputer having a function to connect the frequency of a clock signal outputted from a CR oscillation circuit.

In general, in a case in which an oscillation operation of an oscillation circuit is resumed after once stopped, it takes time until its oscillation frequency reaches a set oscillation frequency. For example, FIG. 37 shows an arrangement of an analog PLL (Phase Locked Loop) circuit, generally designated at reference numeral 200. In FIG. 37, a phase comparator 201 receives a reference clock signal from a reference oscillator 202 and further receives an oscillation output signal from a VCO (voltage controlled oscillator) 203 through a programmable divider (frequency divider) 204. Moreover, the phase comparator 201 outputs a voltage signal corresponding to a phase difference therebetween through a charge pump circuit 205 to the VCO 203.

FIG. 38 is an illustration of one example of a timing chart in a case in which the oscillation operation of the PLL circuit 200 is resumed from a stopped state. In a PLL circuit, the time until its oscillation frequency reaches a target oscillation frequency owing to the operation of a phase comparator is referred to as a "lock time", and this lock time becomes relatively long as indicated by (e) of FIG. 38.

Still additionally, Japanese Patent Laid-Open No. 2000-357947 discloses a technique of, in a DPLL circuit forming a digital controlled type PLL circuit, for shifting to a low power dissipation mode, stopping the oscillation operation of a ring oscillator of a frequency multiplication circuit. In this technique, the employment of the ring oscillator achieves the shortening of the time needed for the shifting from a low power dissipation mode to a normal mode.

In a conventional microcomputer, for switching the oscillation frequency of a clock signal or a signal source, the maximum time needed for the switching is estimated in advance and the control is resumed while waiting for this time. Accordingly, the CPU waits for the elapse of a redundant stand-by time, which leads to lowering the processing efficiency.

Yet additionally, Japanese Patent Laid-Open No. HEI 6-138975 discloses a technique of, in a microcomputer using a plurality of clock signals concurrently, issuing an interrupt request to a CPU at the timing of the completion of the rising of a clock signal for making a notification.

In a microcomputer, in the case of the occurrence of a state in which there is no need for a CPU to conduct the processing, a low power dissipation mode is taken to reduce the power dissipation in a manner such that the oscillation operation is stopped in a state where its internal state is kept (for example, Japanese Patent Laid-Open No. HEI 11-305888).

A microcomputer is designed to change a level of an external signal output terminal for controlling an external device connected to that terminal. In this case, the output level of the terminal and the term for which the terminal is made active are set according to a program.

Moreover, in particular, in a microcomputer including a battery as an operation power supply, in a case in which there is no need for a CPU to conduct the processing, the shifting to the low power dissipation mode for the reduction of the power dissipation is made by stopping the oscillation operation for a clock signal while maintaining its internal state. In this case, the internal processing in the microcomputer, the control of an external device, or the like is scheduled to be periodically implemented in a manner such that, for example, the low power dissipation mode and the normal mode are alternately taken as shown in FIG. 39.

Alternatively, in a case in which there is a need to conduct the processing irregularly in accordance with some event occurring in the exterior of the microcomputer, the event can be used as a release factor from the low power dissipation mode so that the shifting to the normal mode is made in response to the occurrence of the event for implementing the processing.

The CPU reads out instruction codes stored in a ROM and decodes the instruction codes for the implementation. Moreover, in this case, the data bus width of the CPU agrees with the number of bits. Moreover, if the CPU is of an RISC (Reduced Instruction Set Computer) type, in general the readout of the instruction codes is made according to cycle. Therefore, the operating speed of the CPU (or, the microcomputer) depends upon the data readout speed of the ROM.

However, in the case of using two clock signals concurrently, no technique based on a concept of improving the reliability on the entire operation thereof exists. For example, in a case in which a microcomputer is equipped with a watch dog timer (WDT) which operates with a clock signal independent of an operation clock signal for a CPU, it is considered to additionally monitor the operation clock signal by the WDT.

In this case, it is expectable that the WDT clearing cycle of the CPU is prolonged because the frequency of the operation clock signal lowers and the WDT immediately falls into an overflow state so that a reset takes place. However, since the intended monitoring function of the WDT is not prepared to conduct the clearing operation at a strict timing, difficulty is encountered in expecting it additionally along with a clock monitoring function.

Furthermore, for example, a CR oscillation circuit which can be constructed at a low cost is frequently employed as a clock source of the WDT. However, the CR oscillation circuit is susceptible to temperature or voltage and, hence, the monitoring time of the WDT can vary so that there is a possibility that the WDT falls into an overflow state even if the CPU makes clear the WDT according to the design, thereby causing the occurrence of a reset.

Meanwhile, the technique disclosed in Japanese Patent Laid-Open No. HEI 11-337597 makes the frequency correction step by step in a minimum unit until the frequency of a clock signal becomes equal to a set target value. This takes a long time for the correction.

Moreover, in the technique disclosed in Japanese Patent Laid-Open No. 2000-357947, cycle measurement data on a reference clock signal, which acts as a control condition for setting an oscillation frequency, is reset in response to the shifting to a low power dissipation mode and, hence, in the case of the shifting from the low power dissipation mode to the normal mode, there is a need to again measure and acquire the measurement data. For this reason, there is a problem in that the time until the oscillation frequency reaches a desired oscillation frequency is delayed by the time needed for the re-measurement.

However, so far, there has not been known a technical concept that a CPU is made to use one clock signal finally and, in a microcomputer made to carry out the switching on the clock signal, the stand-by time of the CPU associated with the clock switching is shortened to the utmost.

On the other hand, in the case of the conventional microcomputer disclosed in Japanese Patent Laid-Open No. 2000-357947, an external noise is applied thereto during the shifting to the low power dissipation mode, there is a possibility that the output level of an external output terminal varies. For example, when the microcomputer is designed to control the driving of a motor, the level of the external output terminal is controlled to stop the rotation of the motor at the shifting to the low power dissipation mode. In this state, if the output level of the external output terminal varies due to an external noise, the rotation of the motor occurs.

For example, when a program is executed in the normal mode, the program sets the level of the external output terminal (for example, High), maintains that level during the output time period, and brings the level into the original value in response to the end of the output time period (for example, Low). In addition, for the detection of the output time period, the program uses a timer made to operate on the basis of an operation clock (machine clock) or the like.

Moreover, although the program can carry out another processing concurrently during the aforesaid output time period, the processing executable concurrently do not always exist. In this case, in consequence, the CPU is activated only for maintaining the terminal output level. Still moreover, during the time period, the operation clock continues, which leads to an increase in current dissipation.

For example, in a case in which the readout speed of the ROM is low, for enhancing the processing speed of the CPU, it is considered to interleave the ROM. However, only the simple interleaving requires a wait cycle for the readout of instruction codes because the first access to the ROM depends upon the readout speed of the ROM.

For solving such problems, there has been known a method in which the instruction readout addresses of the CPU corresponding to a predetermined number of cycles are outputted in advance to reduce the wait cycle. However in this case, there is a need to construct an internal circuit of the CPU accordingly, and it is not realizable with the general-purpose CPU.

SUMMARY OF THE INVENTION

The present invention has been developed with a view to eliminating these problems, and it is therefore a first object of the invention to provide a clock control circuit apparatus capable of, in the case of the employment of first and second clock signals, improving the reliability of the oscillation operation therefor, and further to provide a microcomputer including this clock control circuit apparatus.

A second object of the invention is to provide a microcomputer capable of, in the case of the employment of first and second clock signals, adjusting the oscillation frequency of the second clock signal for a short period of time, and further to provide a clock signal oscillation frequency adjusting method.

A third object of the invention is to provide an oscillation circuit apparatus capable of shortening the oscillation stability time to the utmost in the case of resuming the oscillation operation from a temporarily stopped condition.

A fourth object of the invention is to provide a microcomputer capable of, in switching an operation clock signal, shortening the stand-by time, as compared with a conventional one.

A fifth object of the invention is to provide a microcomputer capable of, when the setting of a low power dissipation mode is possible, reducing the influence of an external noise to the utmost.

A sixth object of the invention is to provide a microcomputer capable of setting a level of an external output terminal even in a state shifted to a low power dissipation mode.

A seventh object of the invention is to provide a memory interface apparatus capable of, even if the ROM readout speed is low, increasing the processing speed in a CPU through the use of a simple configuration.

For these purposes, in a clock control circuit apparatus according to an aspect of the present invention, a correction circuit corrects an oscillation frequency of a second clock signal on the basis of a first clock signal, and a monitoring circuit monitors an oscillation state of the first clock signal on the basis of the second clock signal. That is, the first and second clock signals are monitored and corrected through the use of the same second and first clock signals, which leads to an improvement of the reliability of the oscillation operations.

In this apparatus, the first clock signal monitoring cycle period) is set to be shorter than a measurement cycle of a watch dog timer. Therefore, the monitoring circuit can detect the occurrence of an abnormality indiscoverable in the monitoring cycle of the watch dog timer.

In addition, in a microcomputer according to another aspect of the present invention, when adjusting the oscillation frequency of a CR oscillation circuit immediately after an activation of a CPU, comparison adjustment means decreases the absolute value of an adjustment signal level gradually according to adjustment cycle (at every adjustment cycle). That is, at the reset release of a CPU or at the activation such as the shifting from a low power dissipation mode to a normal mode, the oscillation state of the CR oscillation circuit becomes considerably unstable, and it is considered that its oscillation frequency is considerably remote from a set frequency. Therefore, with respect to the adjustment operation during that time period, the absolute value of the adjustment signal level is adjusted to decrease gradually from a larger value to a smaller value according to adjustment cycle, thus enabling the convergence into the set frequency more quickly.

In this microcomputer, the comparison adjustment means starts the adjustment operation at the maximum value of an adjustment range and decreases the absolute value thereof by ½ according to adjustment cycle. That is, the employment of a method similar to a so-called binary search in the data retrieval can achieve the convergence of the oscillation frequency of the CR oscillation circuit into the set frequency more promptly.

Moreover, in the aforesaid microcomputer, after the absolute value of the adjustment signal level reaches a minimum value, the comparison adjustment means continues the adjustment using the minimum value. This enables a precise adjustment when the oscillation frequency approaches the vicinity of the set frequency.

Still moreover, in the aforesaid microcomputer, with respect to the adjustment operation immediately after the CPU is placed into activation, the comparison adjustment means is made to selectively determine whether or not to conduct the adjustment operation for decreasing the absolute value of the adjustment signal level gradually according to adjustment cycle. That is, in a case in which the CPU is designed to be capable of implementing a low power dissipation mode, if the shifting to the low power dissipation mode is made in the middle of the adjustment operation for decreasing the absolute value thereof gradually according to adjustment cycle, the shifting thereto can take place in a state where the oscillation frequency of the CR oscillation circuit is considerably remote from the set frequency. For this reason, the adjustment method is designed as selected according to the setting of the shifting cycle to the low power dissipation mode, thus enabling the adjustment to meet the user's intention.

Furthermore, in an oscillation circuit apparatus according to a further aspect of the present invention, when a digital controlled oscillation operation is temporarily stopped, an oscillation control condition set at that time is maintained and the oscillation operation is resumed according to the oscillation control condition maintained. Therefore, unlike a conventional technique, there is no need to again set the oscillation control condition in resuming the oscillation operation, so the oscillation state becomes stable more quickly at the resumption. Add to it that the further reduction of the power dissipation is achievable.

In addition, this oscillation circuit apparatus comprises a ring oscillator constructed by connecting a plurality of logical inverting circuits into a ring-like configuration. This enables realizing a configuration for obtaining a polyphase clock signal needed for the digital controlled oscillation operation through the use of a less number of gates, thereby achieving the lower power dissipation.

Still additionally, in this oscillation circuit apparatus, the oscillation control condition can be altered prior to the resumption of the oscillation operation, so the oscillation frequency can be switched at the resumption of the oscillation operation.

Yet additionally, in this oscillation circuit apparatus, the oscillation control condition can be altered prior to the stopping of the present oscillation operation. Therefore, for example, in a case in which the CPU controls the oscillation operation and sets the oscillation control condition, when, in a stage before the CPU stops the oscillation operation, the oscillation frequency is changed in resuming the operation next time, the corresponding oscillation control condition can be set in advance.

Moreover, this oscillation circuit apparatus comprises polyphase clock signal outputting means and a frequency multiplication circuit for multiplying a frequency of a reference clock signal outputted from a reference clock oscillation circuit by n to produce and output an n-multiplied clock signal. Therefore, in the digital control system, the oscillation operation can be conducted with high accuracy.

Still moreover, in this configuration including the frequency multiplication circuit, when the oscillation control condition is reset, the cycle of the reference clock signal is measured on the basis of the cycle of the polyphase clock signal and the multiplication operation is again conducted on the basis of the measured value. On the other hand, if the oscillation control condition is maintained, there is no need to again measure the cycle of the reference clock signal and, hence, the oscillation operation can be stabilized at an extremely high speed.

Yet moreover, in the foregoing oscillation circuit apparatus, when stopping the operation of a clock synchronization circuit for the shifting to a low power dissipation mode, low power dissipation control means stops the oscillation operation of the polyphase clock signal outputting means, and the data holding means retains cycle measurement data on the reference clock signal. Therefore, in response to the release from the low power dissipation mode, it is possible to immediately carry out the oscillation operation based on the cycle measurement data retained in the data holding means.

Furthermore in a microcomputer according to a further aspect of the present invention, a switching notification control unit monitors the oscillation operation of a frequency multiplication circuit and, when the frequency of a multiplied clock signal is switched, issues an interrupt request to a CPU at the timing that the oscillation operation after the switching thereof becomes stable. Therefore, for the switching of the frequency of the multiplied clock signal, the CPU can find the stable state of the oscillation operation from the interruption, which eliminates the need for the setting of a redundant stand-by time, thus improving the processing efficiency.

In this microcomputer, the switching notification control unit monitors the oscillation operation of the frequency multiplication circuit on the basis of a control signal outputted from sequence control means made to control the oscillation operation sequence of the frequency multiplication circuit. Therefore, the stable state of the oscillation operation is clearly recognizable through the control signal.

Moreover, in this microcomputer, a clock signal for the operation of the CPU can be selected from a plurality of clock signals including the multiplied clock signal. This can provide the above-mentioned effects.

Still moreover, in this microcomputer, the switching notification control unit also monitors the oscillation operation of an external oscillator and issues an interrupt request to the CPU at the timing that the oscillation operation after the operation switching becomes stable. In a case in which a clock signal outputted from the external oscillator is used as a reference clock signal for the frequency multiplication circuit, the CPU can find the timing suitable for the start of the operation of the frequency multiplication circuit through the occurrence of the interrupt request.

In a microcomputer according to a further aspect of the present invention, a CPU resets the level of an external signal terminal for the shifting to a low power dissipation mode whenever a release timer periodically makes the release from the low power dissipation mode. Therefore, even if the level of the external signal terminal varies due to the influence of an external noise during the shifting to the low power dissipation mode, since the CPU resets the output terminal level whenever the release from the low power dissipation mode periodically takes place, the reliability is improvable.

In a microcomputer according to a further aspect of the present invention, terminal control means sets an external signal terminal to a high impedance state when a CPU shifts to a low power dissipation mode. Therefore, even if the CPU receives the influence of an external noise during the shifting to the low power dissipation mode, since the external signal terminal is in the high impedance state, an external device is not driven through that terminal, which enhances the reliability.

In a microcomputer according to a further aspect of the present invention, signal level changing means changes a level of an external signal output terminal while a CPU is set in a low power dissipation mode. Therefore, since there is no need for the CPU to continue the normal operation mode only for changing the level of the external signal output terminal, the power dissipation is reducible.

In this microcomputer, the signal level changing means changes the level of the external signal output terminal when a comparison circuit makes a comparison between a count value of the level change timer and a value of a register in which a level changing timing is set and the comparison results shows the agreement therebetween. The level of the output terminal can be changed at the timing set in the register.

Moreover, in this microcomputer, the register is made such that an arbitrary data value can be set therein by the CPU. Therefore, a level changing timing can arbitrarily be set by a user program.

Still moreover, in this microcomputer, the level of the external signal outputting terminal can be reset by the CPU after the release from the low power dissipation mode. Therefore, the level of the output terminal can immediately be reset at the time that the CPU has conducted the necessary processing.

Yet moreover, in this microcomputer, when the release from the low power dissipation mode also occurs due to the occurrence of a release factor after the signal level changing means changes the level of the external signal output terminal, interrupt generation means issues an interrupt request to the CPU at the timing that the release from the low power dissipation mode is to be made by the release timer.

That is, there may be a request to the effect of maintaining at least the level of the external signal output terminal changed by the signal level changing means (for example, a request on the control of an external device connected to the external signal output terminal). In this case, since the level maintaining time period is determined in accordance with the relationship with the time period of the setting of the low power dissipation mode, if the release from the low power dissipation mode occurs earlier than scheduled due to the occurrence of a release factor, the CPU loses the original signal level maintaining time period.

Accordingly, when the interrupt generation means issues an interrupt request to the CPU at the aforesaid timing, the CPU can recognize the maintaining time period and can reset the level of the output terminal when needed after the recognition of the interrupt request.

In this microcomputer, the level change timer is also used as the release timer, thereby further simplifying the construction.

Moreover, in this microcomputer, the release timer is also used as a watch dog timer for monitoring the operation of the CPU or as a free-run timer made to conduct a counting operation independently of the CPU operation clock, thereby further simplifying the construction.

In a memory interface circuit apparatus according to a further aspect of the present invention, when an address retained in address holding means and an address outputted from a CPU in an instruction readout cycle agree with each other, data readout means increases the value of the address retained in the address holding means and reads out data from a ROM. In addition, an instruction buffer buffers, of the data read out by the data readout means, the data corresponding to an excess amount over a bus width of the CPU, and when the CPU implements an instruction readout cycle with respect to the ROM at a consecutive address next time, readout control means outputs the data retained in the instruction buffer to a data bus of the CPU.

That is, even in a case in which the readout speed of the ROM is low, when the CPU implements the instruction readout at a consecutive address, an instruction to be read out next time by the CPU is read out simultaneously with the present readout and retained in the instruction buffer, and at the next readout, the instruction is read out from the instruction buffer. This can reduce the wait cycle which has been required in a conventional technique when the CPU conducts the readout from the ROM, thereby enhancing the processing efficiency.

In this memory interface circuit apparatus, the data read out from the ROM when the CPU implements the data readout cycle is stored in a data buffer by an amount by which a bus width of the ROM exceeds the bus width of the CPU. In addition, at this time, the aforesaid readout address is put in address storing means. Still additionally, when the CPU implements the next data readout cycle, if the readout control means makes a decision that the data corresponding to that readout address is stored in the data buffer, this data is outputted to a data bus of the CPU.

That is, since the data buffer acts as a so-called data cache, if the data readout address hits the data buffer, the CPU can read out that data at a high speed. Therefore, the data readout efficiency becomes improvable.

Moreover in this memory interface circuit apparatus, a bus width of the buffer is made to be larger than a data bus width of the ROM. Therefore, if the data readout means conducts the readout plural times and puts the data in the buffer, the previous readout on more data is feasible.

Still moreover, in the foregoing memory interface circuit apparatus, even in a case in which a stall in the operation of the CPU occurs and is detected, if the data readout from the ROM is in implementation, the data readout means continues the readout processing until the completion. That is, since the readout is not suspended immediately at the time of the occurrence of the stall, the readout efficiency is improvable.

Yet moreover, in the foregoing memory interface circuit apparatus, the readout control means cuts off the dissipation current in the ROM when a stall condition in the CPU continues for a predetermined period of time, thus reducing the useless power dissipation.

In addition, in the foregoing memory interface circuit apparatus, the readout control means cuts off the dissipation current other than the ROM on which the data readout means conducts the readout. Therefore, if the ROM is constructed with a plurality of mats, the useless power dissipation is reducible.

Still additionally, in the foregoing memory interface circuit apparatus, when the CPU shifts to the low power dissipation mode, the readout control means cuts off all the dissipation currents in the ROM, thus reducing the useless power dissipation.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Embodiments of the present invention will be described hereinbelow with the reference to the drawings.

(First Embodiment)

Figure 1:
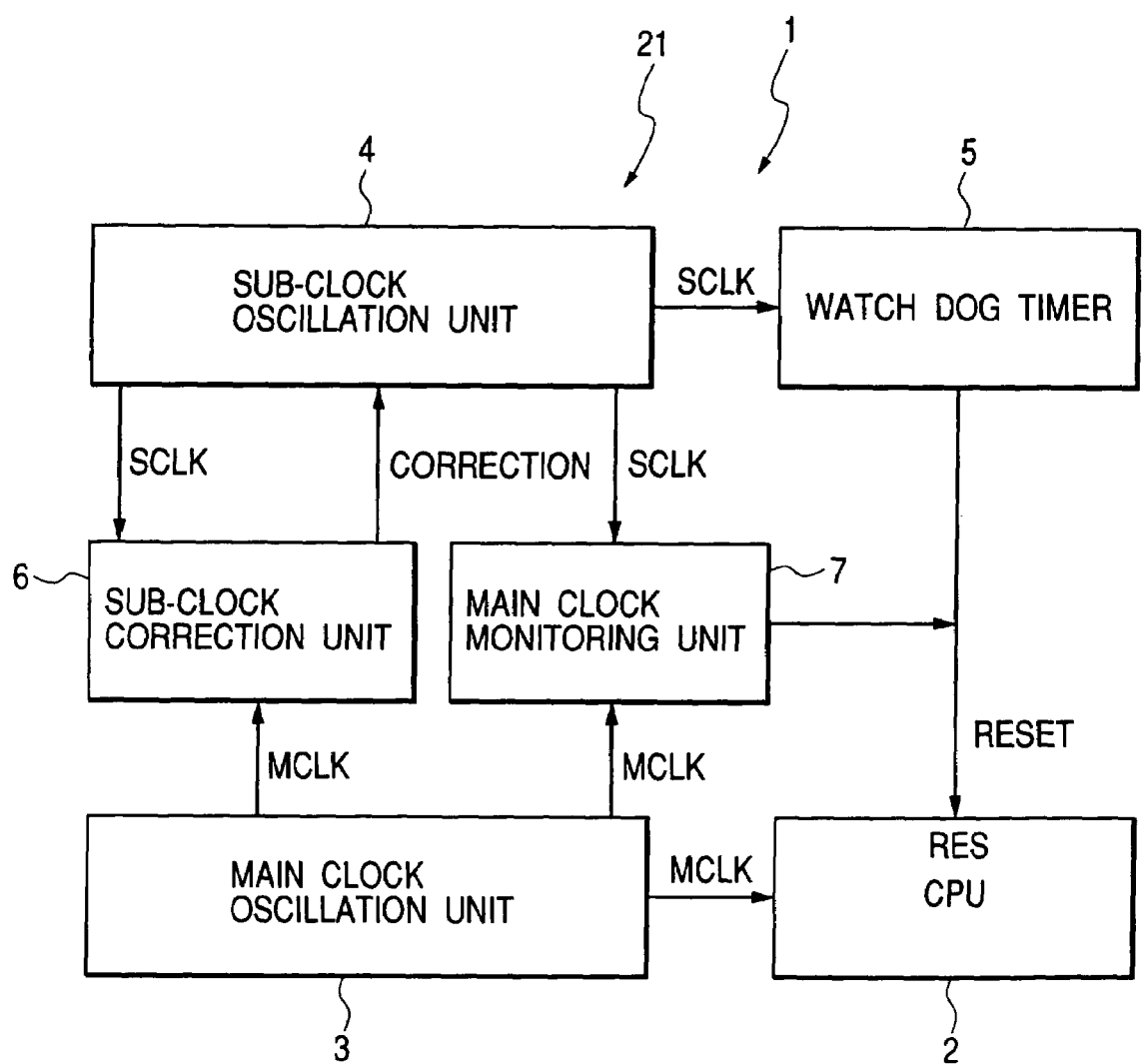
FIG. 1 is a functional block diagram showing an electric configuration of a microcomputer according to a first embodiment of the present invention.

Referring to FIGS. 1 to 4, a description will be given hereinbelow of a microcomputer according to a first embodiment of the present invention. FIG. 1 is a functional block diagram showing an electric configuration of a microcomputer according to the first embodiment.

In FIG. 1, a microcomputer, generally designated at reference numeral 1, is based upon a CPU 2, and the CPU 2 receives, as an operation clock signal, a main clock signal MCLK (for example, having a frequency of 4 MHz; first clock signal) outputted from a main clock oscillator (oscillation circuit) 3. Although not shown concretely, the main clock oscillator 3 is constructed with a crystal oscillator.

In addition, the microcomputer 1 is equipped with a sub-clock oscillator (CR oscillation circuit) 4 comprising a CR oscillation circuit. A sub-clock signal SCLK (for example, having a frequency of 25 kHz; second clock signal) outputted from the sub-clock oscillator 4 is supplied as a count clock signal to a watch dog timer 5.

The watch dog timer 5 has a crush (runaway) monitoring function for the CPU 2 and overflows when the CPU 2 does not implement the clearing operation periodically to output a reset signal to the CPU 2. Moreover, in this embodiment, the watch dog timer 5 is made to also output the reset signal when its count value does not exceed a lower limit value.

A sub-clock correction unit (correction circuit) 6 is designed to make the correction on the oscillation frequency of the sub-clock signal SCLK through the use of the main clock signal MCLK. On the other hand, a main clock monitoring unit (monitoring circuit) 7 monitors the main clock signal MCLK through the use of the sub-clock signal SCLK, and when detecting the abnormality of the main clock signal MCLK, outputs a reset signal to the CPU 2.

Figure 2:
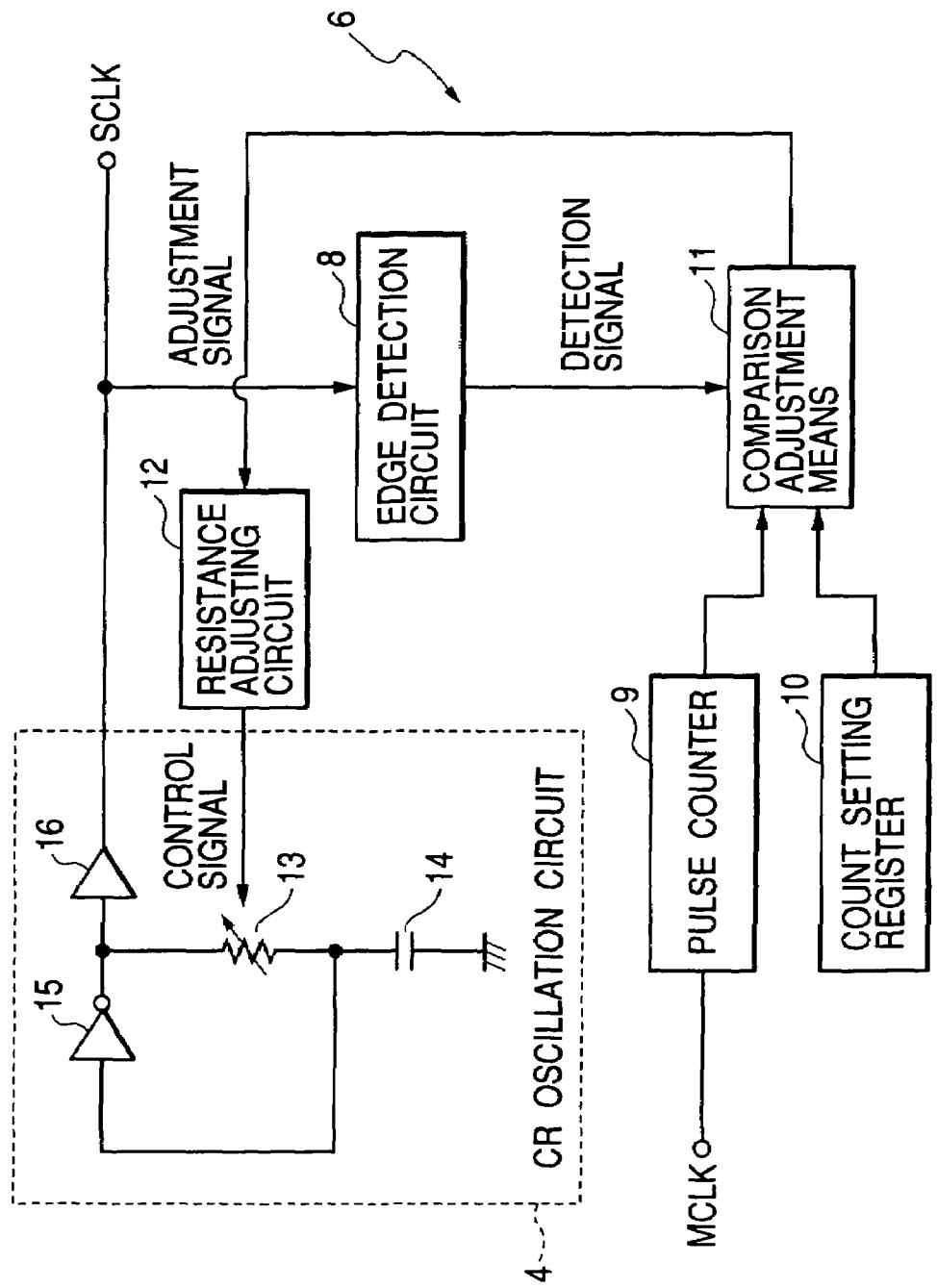
FIG. 2 is an illustration of a detailed configuration of a sub-clock correction unit according to the first embodiment.

FIG. 2 is an illustration of a detailed configuration principally including the sub-clock correction unit 6. The sub-clock correction unit 6 is composed of an edge detecting circuit 8, a pulse counter 9, a count setting register 10, a comparison adjustment means 11 and a resistance adjusting circuit 12. Moreover, the sub-clock oscillator 4 is composed of a ladder resistor 13 serving as a variable resistor whose resistance value is variable in accordance with a control signal from the resistance adjusting circuit 12, a capacitor 14, an inverter 15 and a buffer 16.

In the sub-clock correction unit 6, the edge detecting circuit 8 detects an edge of an oscillation output from the sub-clock oscillator 4 to produce a detection signal. The pulse counter 9 is a digital counter to count the output pulses of the main clock signal MCLK. The count setting register 10 is for storing an appropriate number of counts of the MCLK pulses corresponding to one cycle (period) of the sub-clock signal SCLK. That is, a value to which the oscillation cycle of the sub-clock signal SCLK is to be adjusted is set as a count value set in the count setting register 10 in accordance with the time for which the MCLK pulses reach that count value.

The comparison adjustment means 11, when receiving an edge detection signal from the edge detecting circuit 8, compares the count value of pulses from the pulse counter 9 with the count value stored in the register 4 to output an adjustment signal for adjusting the oscillation cycle of the sub-clock signal SCLK on the basis of the count value comparison result.

The resistance adjusting circuit 12 produces a control signal on the basis of the adjustment signal from the comparison adjustment means 11 and adjusts the resistance value of the ladder resistor 13 of the sub-clock oscillator 4 through the use of this control signal.

Incidentally, the operation of the sub-clock correction unit 6 is disclosed in Japanese Patent Laid-Open No. 2001-111389, and a description will be given hereinbelow of the outline thereof. After the elapse of one cycle of the sub-clock signal SCLK, when the edge detecting circuit 8 detects an edge of the clock pulse, a detection signal is outputted to the comparison adjustment means 11. At this time, the comparison adjustment means 11 reads out the integrated pulse count value from the last detection signal in the pulse counter 9 and the count value set in the count setting register 10 to compare them.

Figure 3:
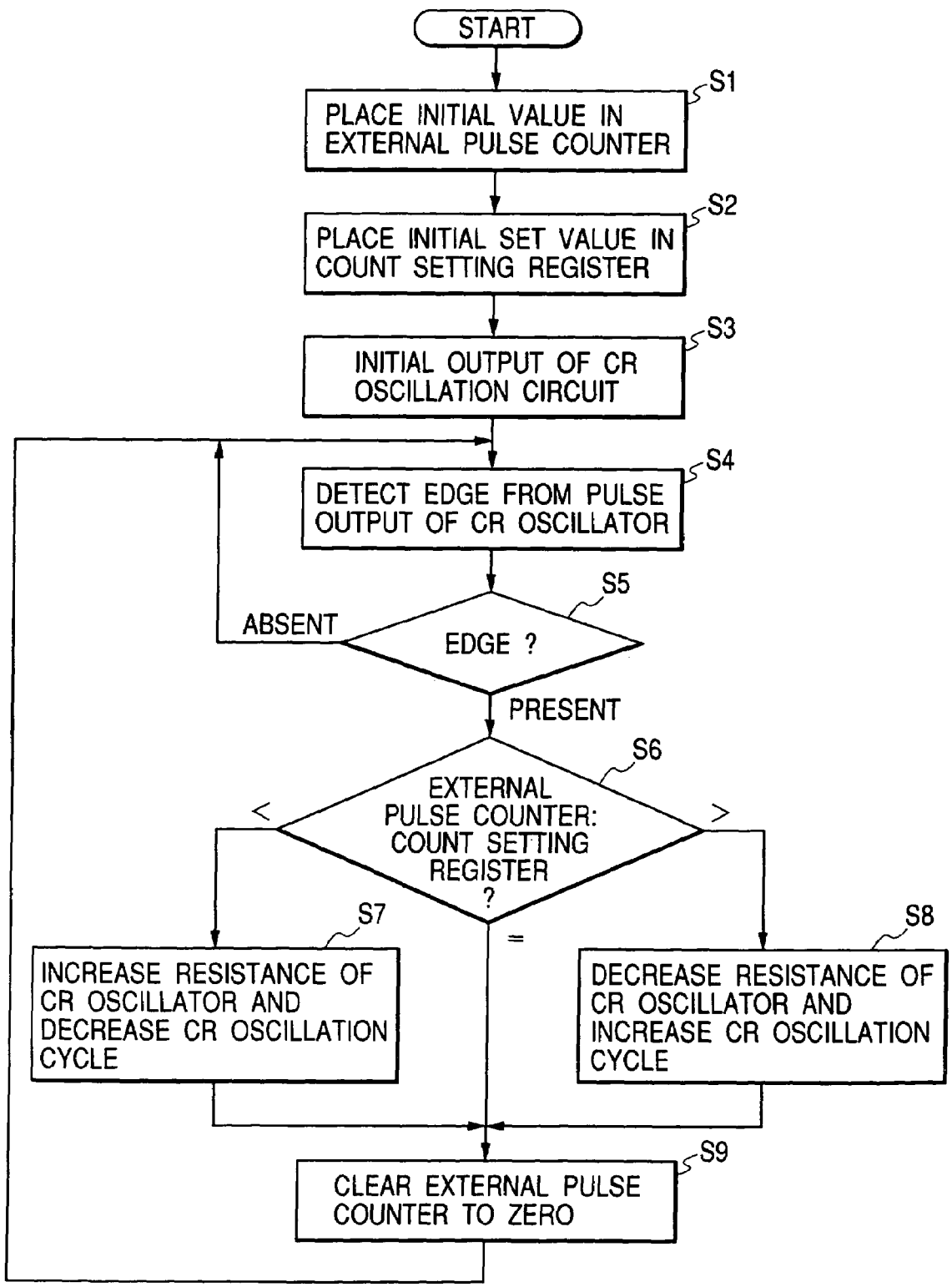
FIG. 3 is a flow chart showing correction processing in the sub-clock correction unit according to the first embodiment.

In this case, the count value set in the register 10 is an appropriate integrated value (number) of pulses corresponding to one cycle of the sub-clock signal SCLK. Thus, on the basis of the integrated number of MCLK pulses within one cycle of the sub-clock signal SCLK, the comparison adjustment means 11 can make a decision as to the degree by which one cycle of the sub-clock signal SCLK is larger or smaller than an appropriate set value. The comparison adjustment means 11 produces an adjustment signal, to be used for adjusting the oscillation cycle of the sub-clock signal SCLK, on the basis of the decision result, and the resistance adjusting circuit 12 produces and outputs a control signal on the basis of this adjustment signal to adjust the resistance value of the ladder resistor 13. FIG. 3 is a flow chart showing the above-mentioned correction processing.

Figure 4:
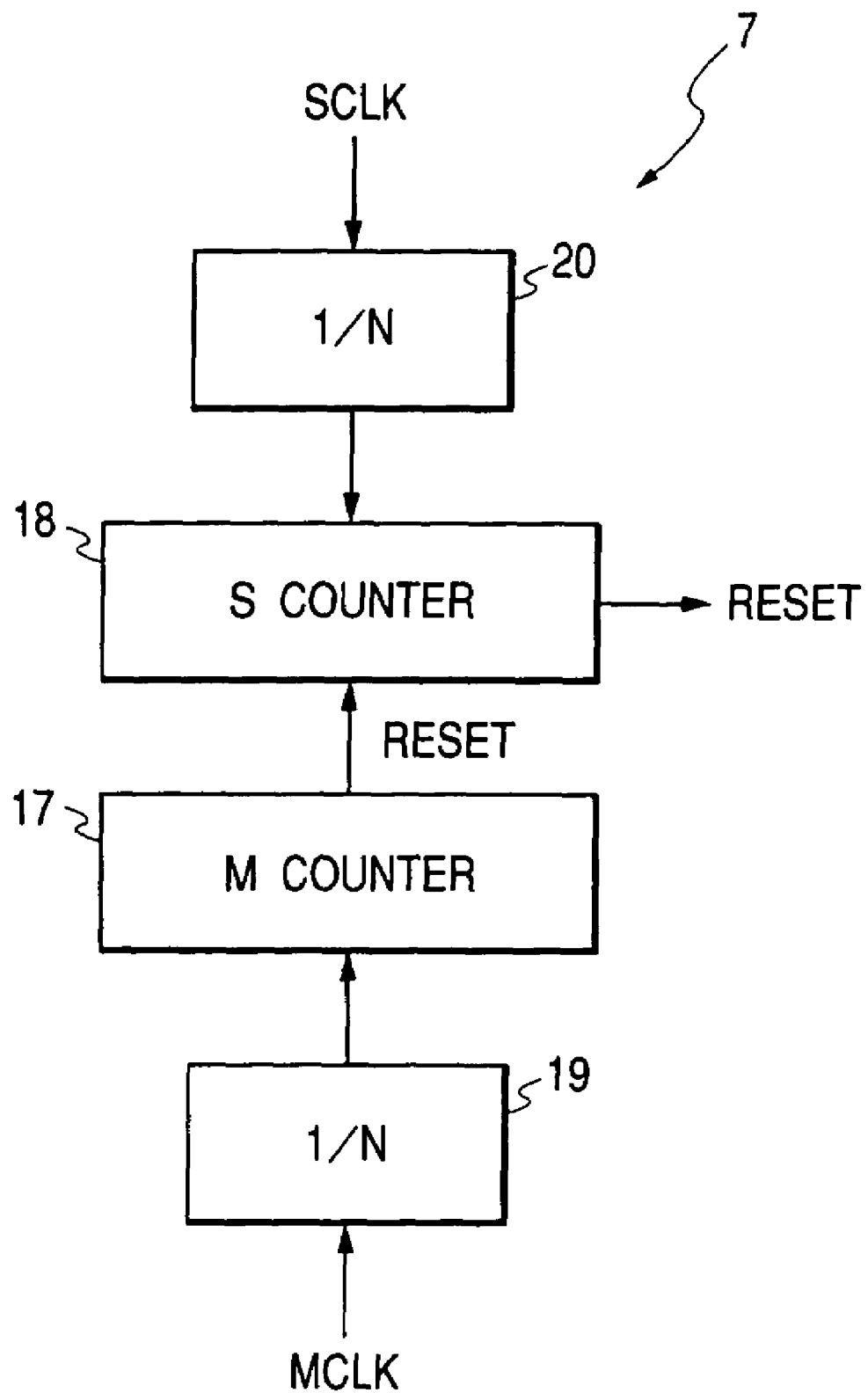
FIG. 4 is an illustration of a detailed configuration of a main clock monitoring unit according to the first embodiment.

FIG. 4 is an illustration of a detailed configuration of the main clock monitoring unit 7. The main clock monitoring unit 7 principally includes an M counter 17 and an S counter 18. The M counter 17 counts the pulses of the main clock signal MCLK given through a 1/N divider 19, while the S counter 18 counts the pulses of the sub-clock signal SCLK given through a 1/N divider 20. Moreover, the S counter 18 is reset when the MSB of the count data in the M counter 17 appears and, if overflowing without being reset, it outputs a reset signal to the CPU 2.

The division values of the 1/N dividers 19 and 20 can be set by a program in the CPU 2. Moreover, the dividers 19 and 20 can also output it directly without dividing.

That is, in the main clock monitoring unit. 7, if the frequency of the main clock signal MCLK is proper, before the S counter 18 counting the output pulses of the sub-clock signal SCLK overflows, the MSB of the count data in the M counter 17 stands to reset the S counter 18. Moreover, when the frequency of the main clock signal MCLK lowers, since the S counter 18 overflows before the MSB in the M counter 17 appears, the CPU 2 is reset.

In addition, the overflow cycle of the S counter 18 in the main clock monitoring unit 7 is made to be shorter than the overflow cycle of the watch dog timer 5.

In this configuration, the main clock oscillator 3, the sub-clock oscillator 4, the sub-clock correction unit 6 and the main clock monitoring unit 7 constitute a clock control circuit apparatus 21. Although not shown concretely, the microcomputer 1 is further equipped with peripheral circuits including a ROM, a RAM, an I/O and an A/D converter.

A combination of the functions of the sub-clock correction unit 6 and the main clock monitoring unit 7 in the clock control circuit apparatus 21 and the watch dog timer 5 overall provides the following monitoring mode.

1) MCLK: Normal, SCLK: Drop of Frequency

The correction is made within a range of the sub-clock correction unit 6, and if the correction is out of the range, the watch dog timer 5 resets the CPU 2.

2) MCLK: Normal, SCLK: Rise of Frequency

The correction is made within a range of the sub-clock correction unit 6, and if the correction is out of the range, the main clock monitoring unit 7 resets the CPU 2.

3) MCLK: Drop of Frequency, SCLK: Normal

Since SCLK relatively speeds up, the main clock monitoring unit 7 resets the CPU 2.

4) MCLK: Rise of Frequency, SCLK: Normal

Since SCLK relatively slows, the watch dog timer 5 resets the CPU 2.

In this embodiment thus arranged, the sub-clock correction unit 6 of the clock control circuit apparatus 21 corrects the oscillation frequency of the sub-clock signal SCLK on the basis of the main clock signal MCLK, while the main clock monitoring unit 7 monitors the oscillation state of the main clock signal MCLK on the basis of the sub-clock signal SCLK. Therefore, since the correction and monitor of the sub-clock signal SCLK and the main clock signal MCLK are made through the use of the two clock signals, which overall improves the reliability of the oscillation operations.

Moreover, according to this embodiment, the cycle (period) in which the main clock monitoring unit 7 monitors the main clock signal MCLK is set to be shorter than the cycle of the watch dog timer 5. Therefore, the main clock monitoring unit 7 can detect the occurrence of abnormality which cannot be detected in the monitoring cycle of the watch dog timer 5. That is, if the main clock signal MCLK slows, the main clock monitoring unit 7 performs the resetting before the resetting by the watch dog timer 5.

Still moreover, owing to the connection of the sub-clock signal SCLK, the CPU 2 can reset the watch dog timer 5 as designed.

(Second Embodiment)

Figure 5:
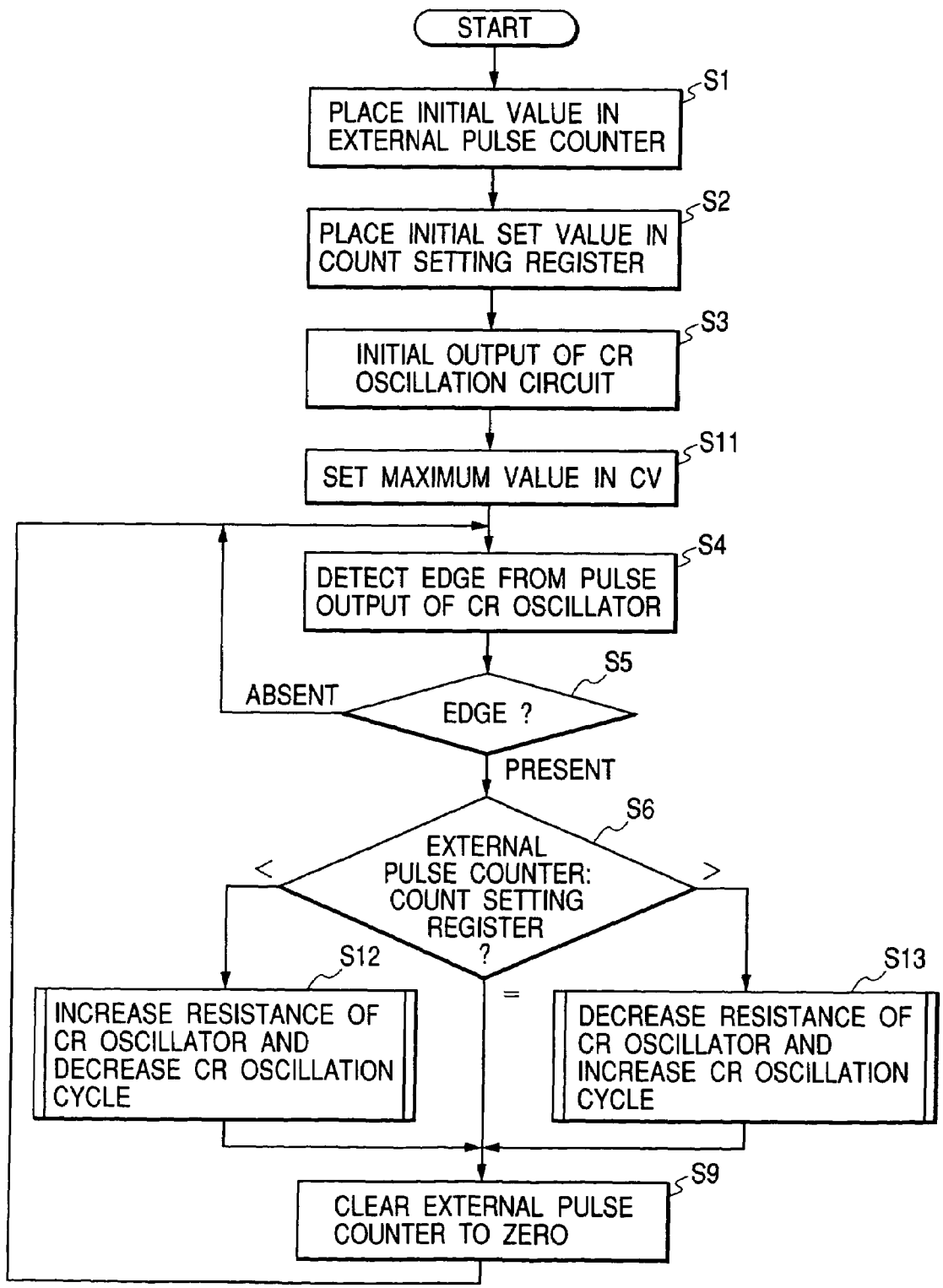
FIG. 5 is a flow chart showing correction processing according to a second embodiment of the present invention.
Figure 6:
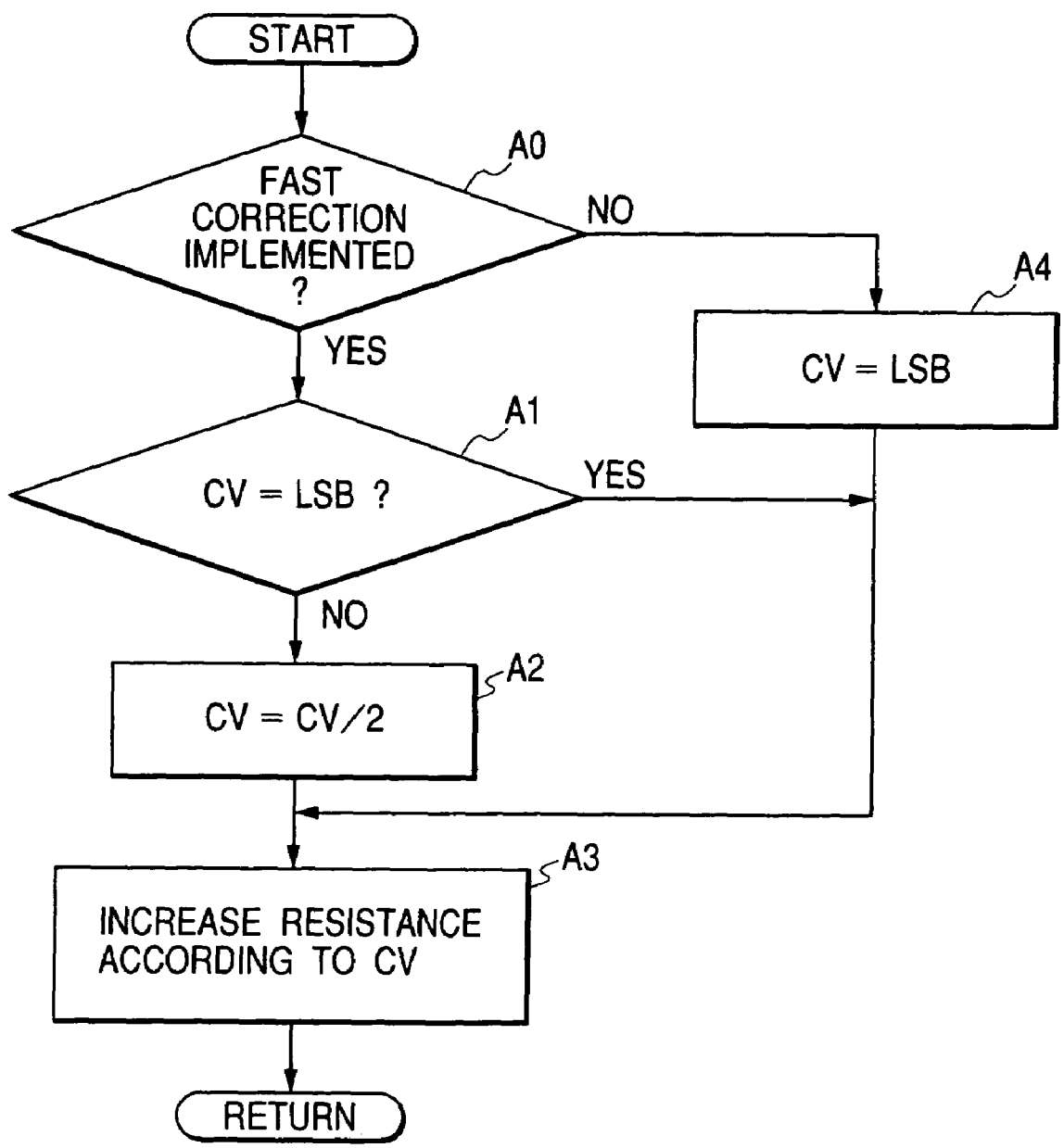
FIG. 6 is a flow chart showing the contents of the processing in step S12 of FIG. 5.
Figure 7:
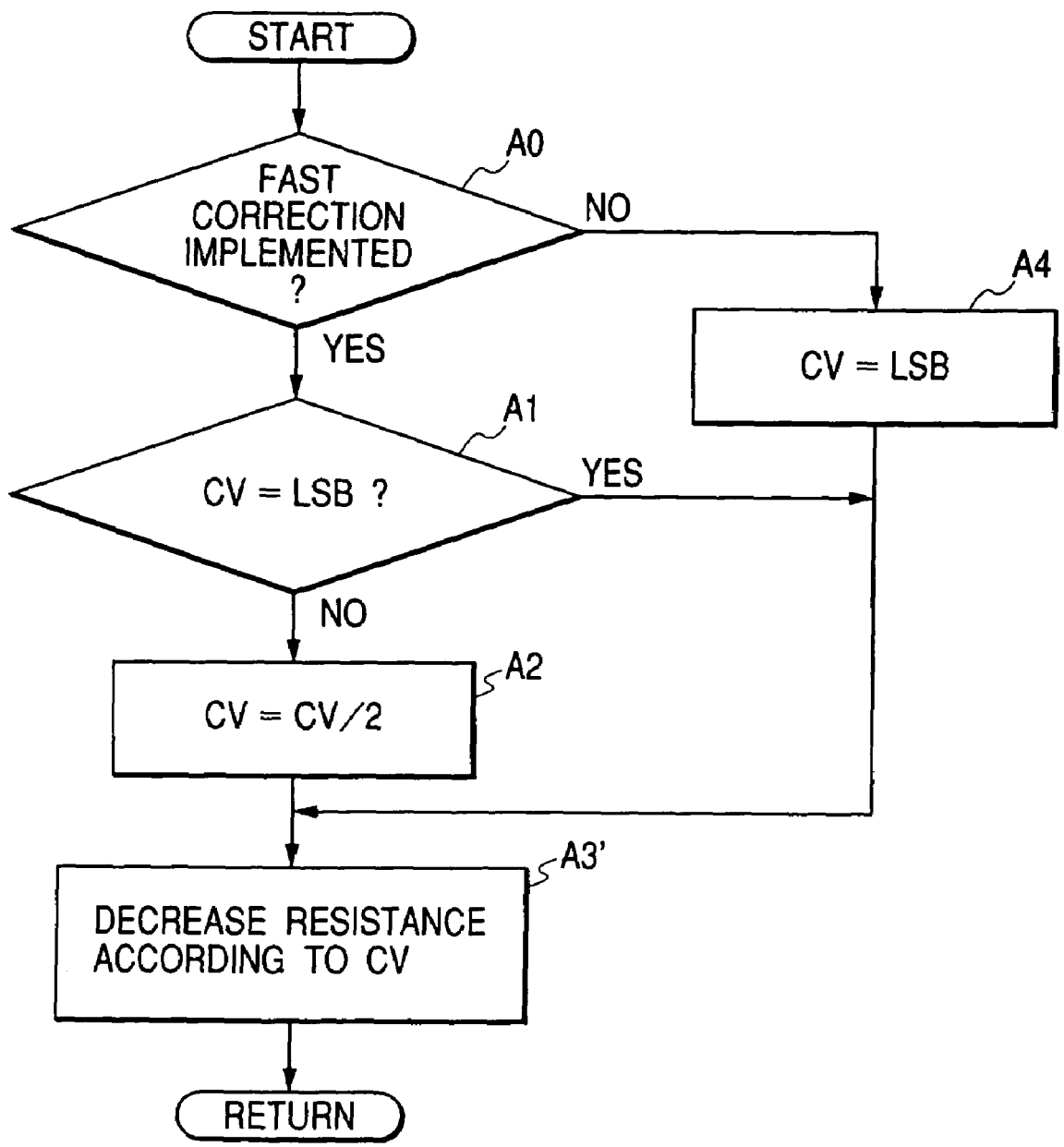
FIG. 7 is a flow chart showing the contents of the processing in step S13 of FIG. 5.

Referring to FIGS. 5 to 7, a description will be given hereinbelow of a second embodiment of the present invention. In the illustrations, the same parts as those in the above-described first embodiment are marked with the same reference numerals, and the description thereof will be omitted for brevity. The configuration according to the second embodiment is basically similar to that of the first embodiment, while there is a slight difference in the comparison adjustment means 11 therebetween.

That is, in a flow chart shown in FIG. 5, a processing step S11 ("set maximum value in CV") is put between the steps S3 and S4. Moreover, the steps S7 and S8 are replaced with steps S12 and S13. In this case, "CV" signifies adjustment signal data to be outputted from the comparison adjustment means 11.

Accordingly, the implementation of the flow chart shown in FIG. 5 starts at the resetting of the CPU 2 or the activation after the release from a low power dissipation mode such as a sleep mode. In this case, in the step S11, the initial value of correction data is set at a maximum value (max).

FIG. 6 shows the contents of the processing in the step S12. First, the comparison adjustment means 11 makes a decision as to whether or not to carry out fast correction (step A0). This setting is made by a user. For example, it is set in a user program or by a DIP switch. If the fast correction is not set ("NO"), the comparison adjustment means 11 sets adjustment signal data CV at a minimum unit (LSB) of the correction data (step A4), and the operational flow goes to a step A3. In this case, since the correction is made in the minimum unit, a low-speed correction is made as in the case of the first embodiment. In the step A3, the adjustment signal data is outputted to the resistance adjusting circuit 12 to increase the resistance value of the ladder resistor 13 in accordance with the data CV.

On the other hand, if the fast correction is set in the step A0 ("YES"), the comparison adjustment means 11 makes a decision as to whether or not the adjustment signal data is set at the minimum unit at that time (step A1). If the data CV is equal to the minimum unit ("YES"), the operational flow advances to the step A3.

If the step A1 shows that the data CV does not equal the minimum unit ("NO"), the comparison adjustment means 11 divides the adjustment signal data CV by 2 (step A2) before the operational flow then goes to the step A3. In the processing of the step S13 shown in FIG. 7, a step A3' is executed in place of the step A3, thus decreasing the resistance value of the ladder resistor 13 in accordance with the data CV.

Figure 8:
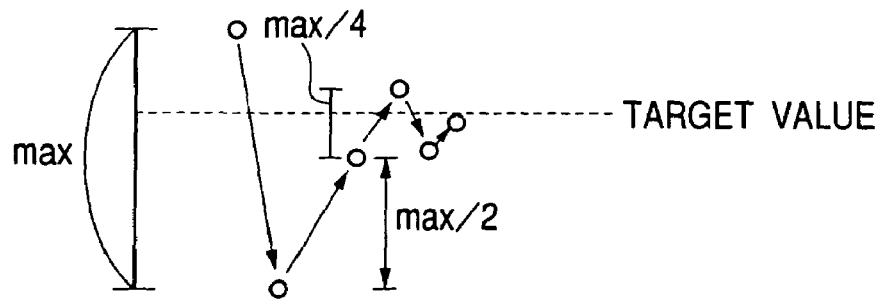
FIG. 8 is a conceptual illustration of a state of a fast correction operation.

FIG. 8 is a conceptual illustration of a state of a fast correction operation (that is, with respect to the step S12, the step A3 is implemented). That is, the first correction is made with the maximum value max of the adjustment range. For example, if the cycle data of the sub-clock signal SCLK is larger (lower in frequency) than a set value of the register 10, the correction is made (swung) by the maximum value max in a direction of shortening the cycle.

Since the cycle is shortened, the next correction is made by ½ of the maximum value max in a direction of lengthening the cycle. Furthermore, since the cycle is still short, the subsequent correction is made by ¼ of the maximum value in a direction of lengthening the cycle. At this time, since it exceeds a target (desired) value, the further correction is made by ⅛ of the maximum value max in a direction of shortening the cycle.

In this way, the correction starts with the maximum value max, and the further corrections are made so that the absolute value decrease gradually to ½, ¼, ⅛. In other words, it is based on the same conception as the so-called binary search in the case of the data retrieval method. That is, the oscillation state of the sub-clock oscillator 4 becomes considerably unstable at the release of the CPU 2 from the reset condition or at the activation in the case of the shifting from a low power dissipation mode to a normal mode, and it is considered that the oscillation frequency deviates largely from a set frequency. Therefore, during this term, the adjustment operation is conducted according to the binary search method, thereby making a correction so that the cycle data of the sub-clock signal SCLK becomes equal to a set value of the register 10 at higher speed (converging into a target frequency.

Moreover, when the processing of the adjustment signal data CV being decreased to ½ (halved) is conducted repeatedly, it finally reaches the minimum value (LSB) of the data (step A1, "YES"). Thereafter, the correction is continuously made with this minimum value.

The reason for the selection on whether or not to conduct the fast correction is as follows. That is, in a case in which the CPU 2 is designed to be capable of implementing a low power dissipation mode, when the shifting to the low power dissipation mode is made during the execution of the fast correction, there is a possibility that the shifting thereof is made in a state where the oscillation frequency of the sub-clock oscillator 4 deviates considerably from a set frequency. Therefore, when the adjustment method is selected in accordance with the setting of the shifting cycle 10 the low power dissipation mode.

As described above, according to the second embodiment, when the oscillation frequency of the sub-clock oscillator 4 is adjusted immediately after the activation of the CPU 2, the comparison adjustment means 11 of the sub-clock correction unit 6 starts the adjustment at the maximum value of the adjustment range and decreases the absolute value thereof by ½ at every adjustment cycle. Therefore, the frequency of the sub-clock signal SCLK can be converged to the set frequency more quickly.

In addition, when the absolute value of the adjustment signal level reaches the minimum value (LSB), the comparison adjustment means 11 thereafter continues the adjustment through the use of the minimum value and, hence, the precise adjustment can be made when the oscillation frequency approaches the vicinity of the set frequency. Still additionally, in the adjustment operation immediately after the activation of the CPU 2, the comparison adjustment means 11 can select whether or not to make the fast correction, and the adjustment can be made according to the user's intention.

(Third Embodiment)

Figure 9:
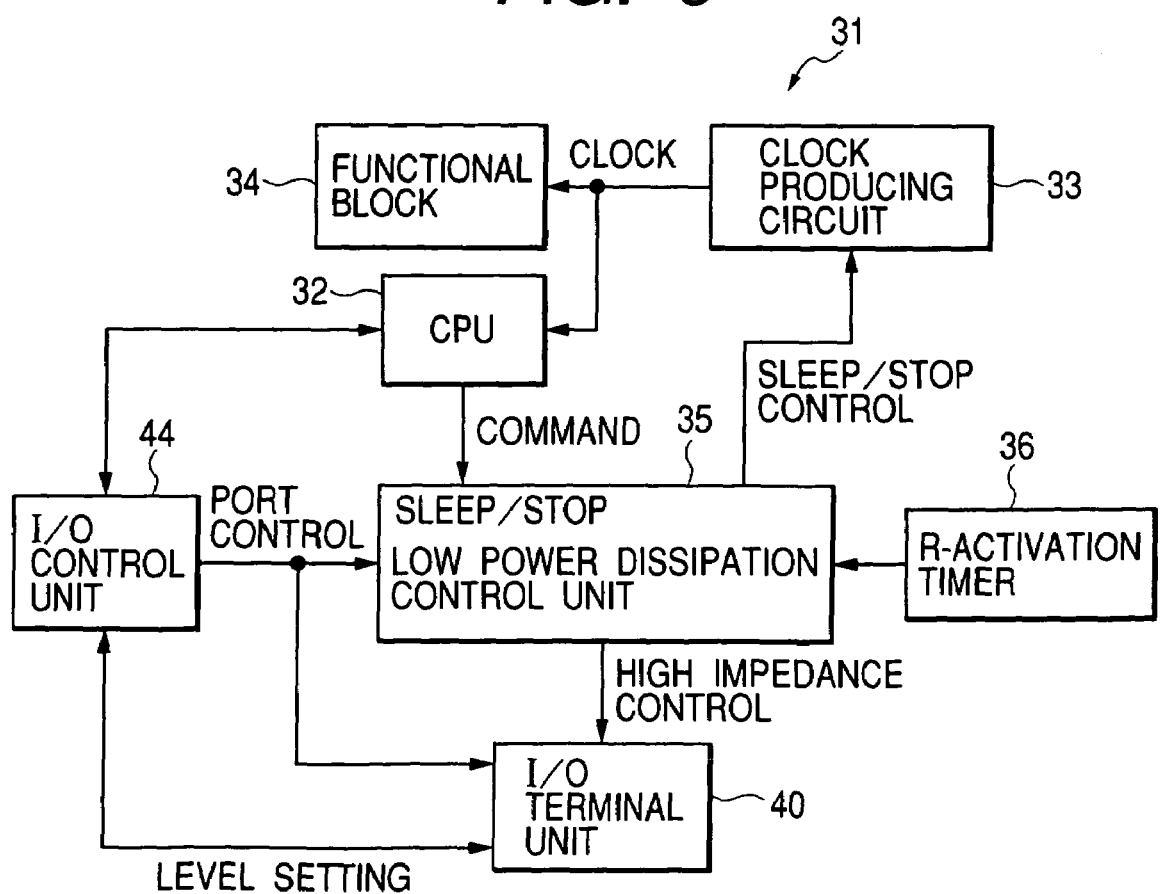
FIG. 9 is a functional block diagram showing a configuration of a microcomputer according to a third embodiment of the present invention.

Referring to FIGS. 9 to 13, a description will be given hereinbelow of a third embodiment of the present invention. FIG. 9 is a functional block diagram showing a configuration of a microcomputer. The microcomputer, generally designated at reference numeral 31, is constructed using a CPU 32 as an essential part. This CPU 32 receives, as an operation clock signal, a clock signal produced and outputted from a clock producing circuit 33. This clock signal is also supplied to a functional block 34 such as peripheral circuits.

A low power dissipation control unit (terminal control means) 35 is for executing the control on a low power dissipation mode such as so-called sleep/stop modes in accordance with a control command given by the CPU 32. In this case, the sleep mode signifies a mode in which the operation of the clock producing circuit 33 is stopped to suspend the supply of the operation clock to the CPU 32 and the CPU 32 temporarily interrupts the processing in a state where the data values in an internal register, and the like, are retained. The release (wake-up) from the sleep mode is made periodically at a set time interval.

On the other hand, although the stop mode stops the processing in the CPU 32 as with the sleep mode, the stop mode does not undergo the release periodically and the release from the stop mode is made only when some event to be handled by the CPU 32 occurs.

Figure 10:
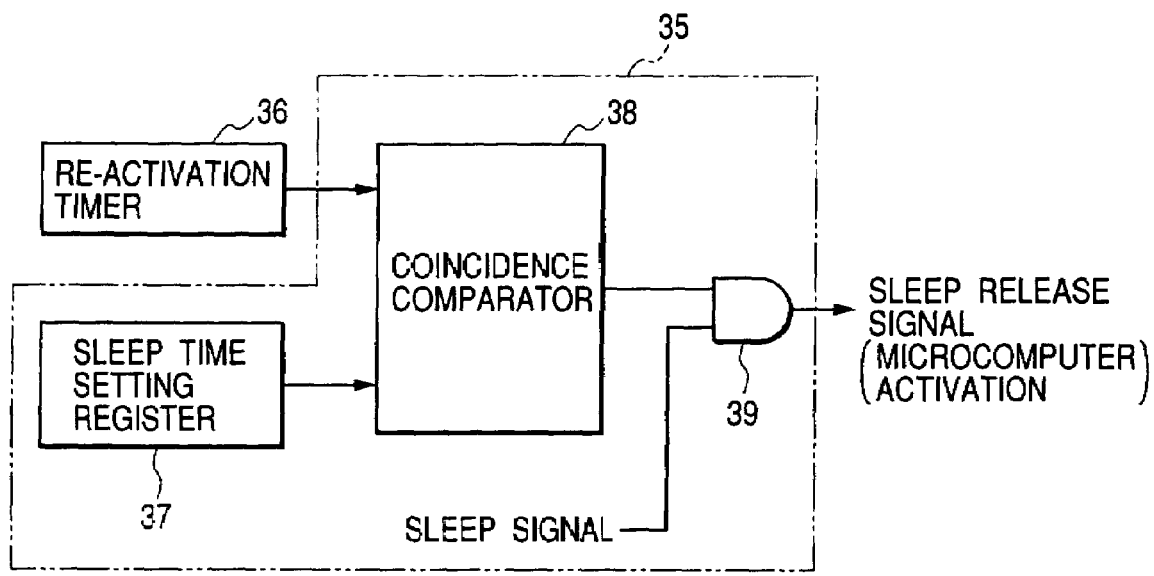
FIG. 10 is an illustration of a configuration of a function of a low power dissipation control unit for executing the control on a sleep mode according to the third embodiment.

FIG. 10 shows a configuration of a functional portion of the low power dissipation control unit 35 which executes the control on the sleep mode. That is, through the use of a coincidence comparator 38, the low power dissipation control unit 35 makes a comparison between a count value of a re-activation timer 36 constructed with, for example, a CR oscillation circuit and a set data value in an internal SLEEP time setting register 37 and, if they agree with each other, outputs a high-level coincidence signal to one input terminal of an AND gate 39. The other input terminal of the AND gate 39 receives a SLEEP signal.

Accordingly, when the coincidence comparator 38 outputs the coincidence signal while a high-level SLEEP signal is given thereto, the AND gate 39 outputs a high-level SLEEP release signal. At this time, the re-activation timer 36 is reset.

Figure 11:
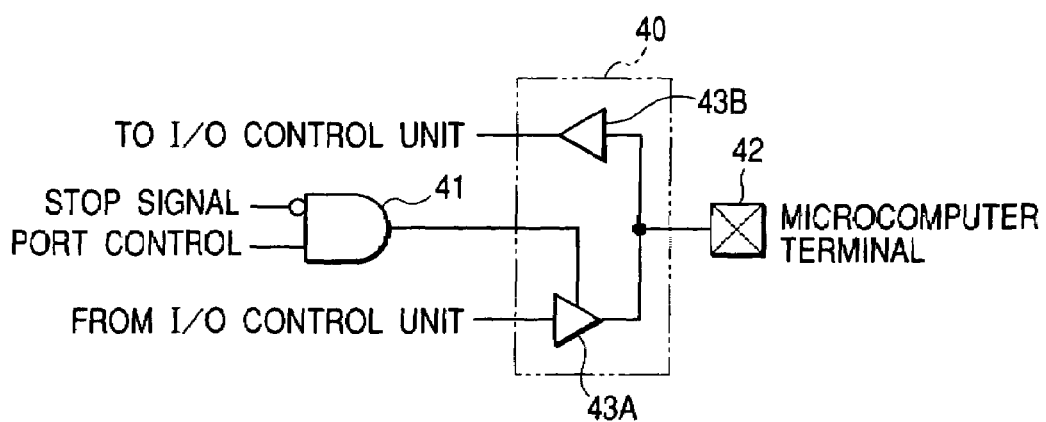
FIG. 11 is an illustration of a configuration of a function of the low power dissipation control unit for, when a stop mode is set, executing the control on an I/O terminal portion according to the third embodiment.

On the other hand, FIG. 11 shows a configuration of a functional portion for the control of an I/O terminal unit 40 when the low power dissipation control unit 35 sets the sleep mode. A STOP signal and a port control signal are given to a negative logical input terminal and a positive logical input terminal of the AND gate 41 of the low power dissipation control unit 35, respectively. Moreover, the AND gate 41 outputs a high-impedance control signal to the I/O terminal unit 40.

The I/O terminal unit 40 has a configuration in which buffers 43A and 43B are bidirectionally connected to an input/output terminal (external signal terminal) 42. The output buffer 43A is controlled by the high-impedance control signal outputted from the AND gate 41. Moreover, in the I/O terminal unit 40, input/output switching control (port control) and output level control are executed through the use of an I/O control unit 44. The aforesaid port control signal is outputted from the I/O control unit 44.

Figure 12:
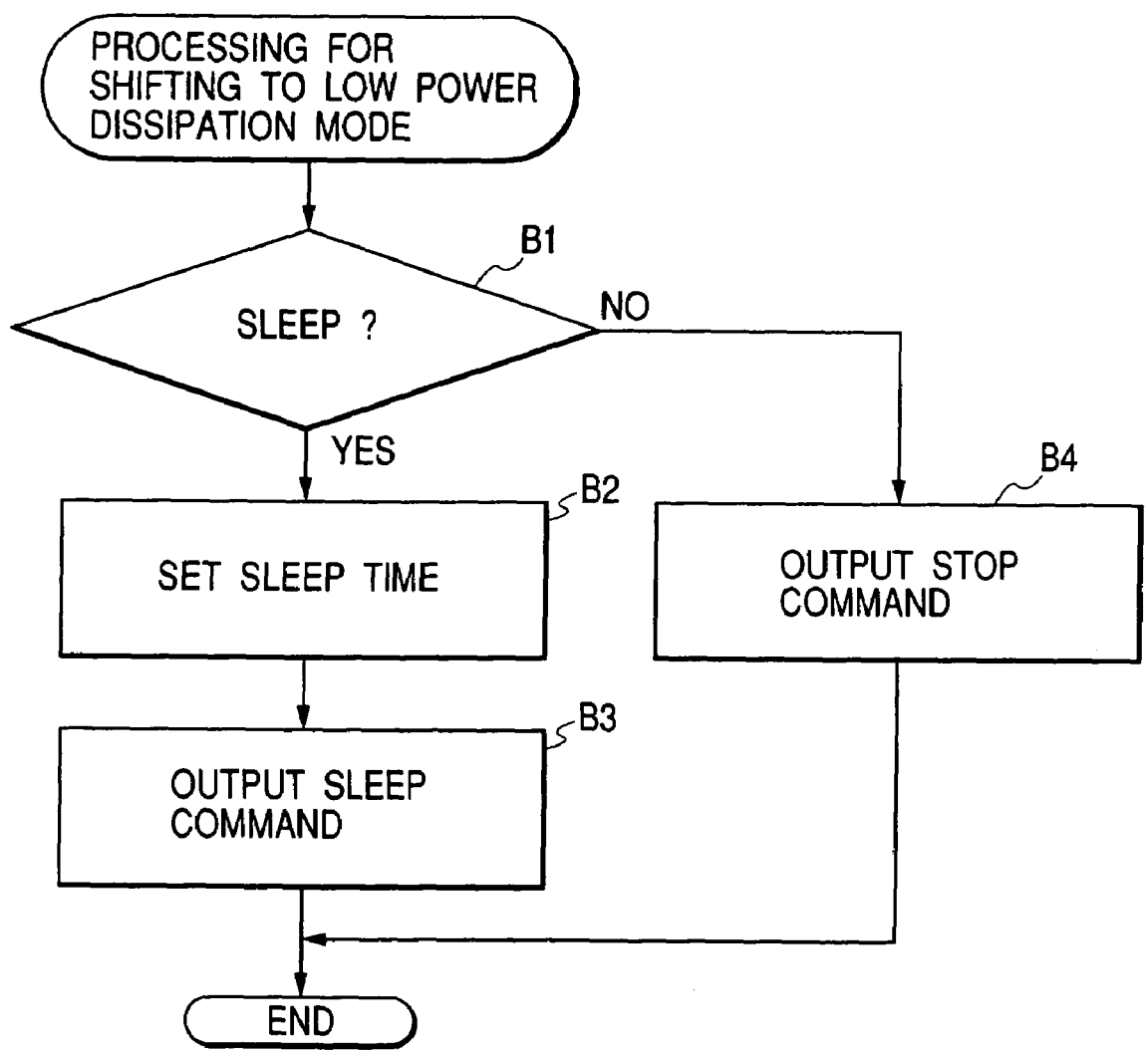
FIG. 12 is a flow chart showing the processing to be conducted when a CPU is shifted to a low power dissipation mode.

Furthermore, referring to FIGS. 12 and 13, a description will be given of an operation of the third embodiment. FIG. 12 is a flow chart showing the processing to be conducted when the CPU 32 shifts to the low power dissipation mode.

In FIG. 12, the CPU makes a decision as to whether or not the low power dissipation mode is "SLEEP" (step B1). If it is "SLEEP" ("YES"), sleep mode shifting time data is set in the SLEEP time setting register 37 (step B2). Following this, a SLEEP command is outputted to the low power dissipation control unit 35 (step B3), and this processing comes to an end. In this case, the portion of the low power dissipation control unit 35 shown in FIG. 9 is made active, and the measurement of the sleep shifting time starts and, after the elapse of this time, the release from the sleep mode takes place.

On the other hand, if the low power dissipation mode is "STOP" (step B1; "NO"), the CPU 32 outputs a STOP command to the low power dissipation control unit 35 (step B4), and this processing comes to an end. In this case, the portion of the low power dissipation control unit 35 shown in FIG. 11 acts. That is, the STOP signal turns to a high level and the output level of the AND gate 41 becomes low, thereby causing the output terminal of the output buffer 43A to switch into a high-impedance state.

Figure 13:
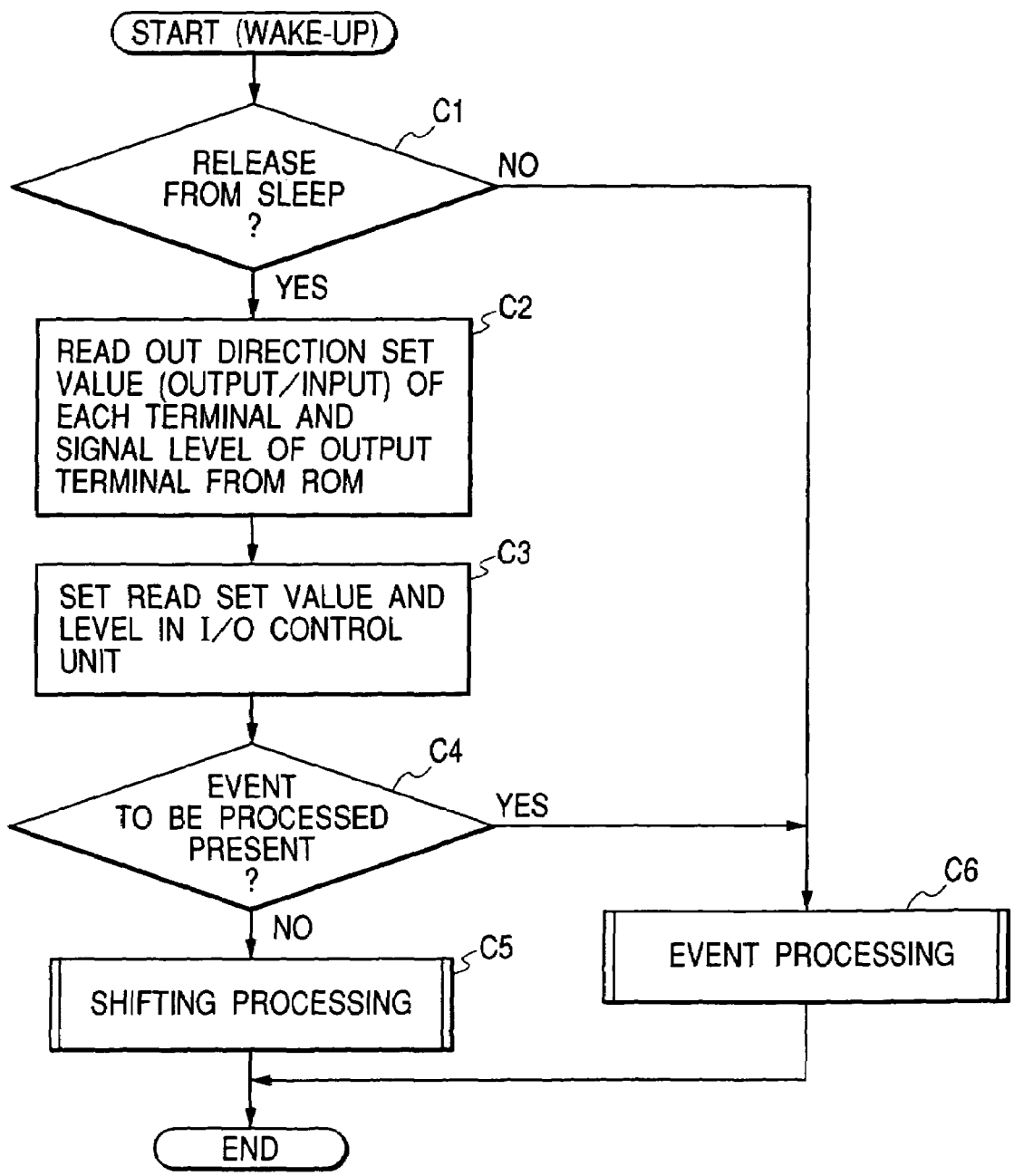
FIG. 13 is a flow chair showing the processing to be conducted when the CPU is activated (waked up) after the release from the low power dissipation mode according to the third embodiment.

FIG. 13 is a flow chart showing the processing to be conducted when the CPU 32 is placed into an activation (wake-up). The CPU 32 makes a decision as to whether or not the release is from the sleep mode (step C1). If it is from the sleep mode ("YES"), the direction (input/output) set value at that time and the signal level set on the output terminal are read out from a ROM (not shown) retaining them as data (step C2). Moreover, the set value or the level setting read out is again set in the I/O control unit 44 to re-set the output signal level in the input/output terminal 42 and others (step C3).

Following this, a decision is made as to whether or not an event to be processed at that time occurs (step C4). If it occurs ("YES"), after the processing on that event (step C6), the shifting processing to the low power dissipation mode shown in FIG. 12 is conducted (step C5). On the other hand, if the decision in the step C4 shows no event to be processing ("NO"), the operational flow goes directly to a step C5.

As described above, according to the third embodiment, the CPU 32 of the microcomputer 31 resets the signal output level at the input/output terminal 42 before shifting to the sleep mode whenever the release from the sleep mode is made periodically by the re-activation timer 36. Therefore, even if the CPU 32 receives the influence of an external noise during the shifting to the sleep mode so that the signal output level of the input/output terminal 42 varies, the output level is reset whenever the release from the sleep node periodically takes place, which leads to the improvement of the reliability of the microcomputer 31.

Moreover, the low power dissipation control unit 35 of the microcomputer 31 sets the input/output terminal 42 in a high-impedance state when the CPU 32 shifts to the low power dissipation mode. Therefore, likewise, even if the CPU 32 receives the influence of an external noise during the shifting to the stop mode, since the input/output terminal 42 is in the high-impedance state, an external device connected to the microcomputer 31 is not driven through that terminal 42, which enhances the reliability.

(Fourth Embodiment)

Figure 14:
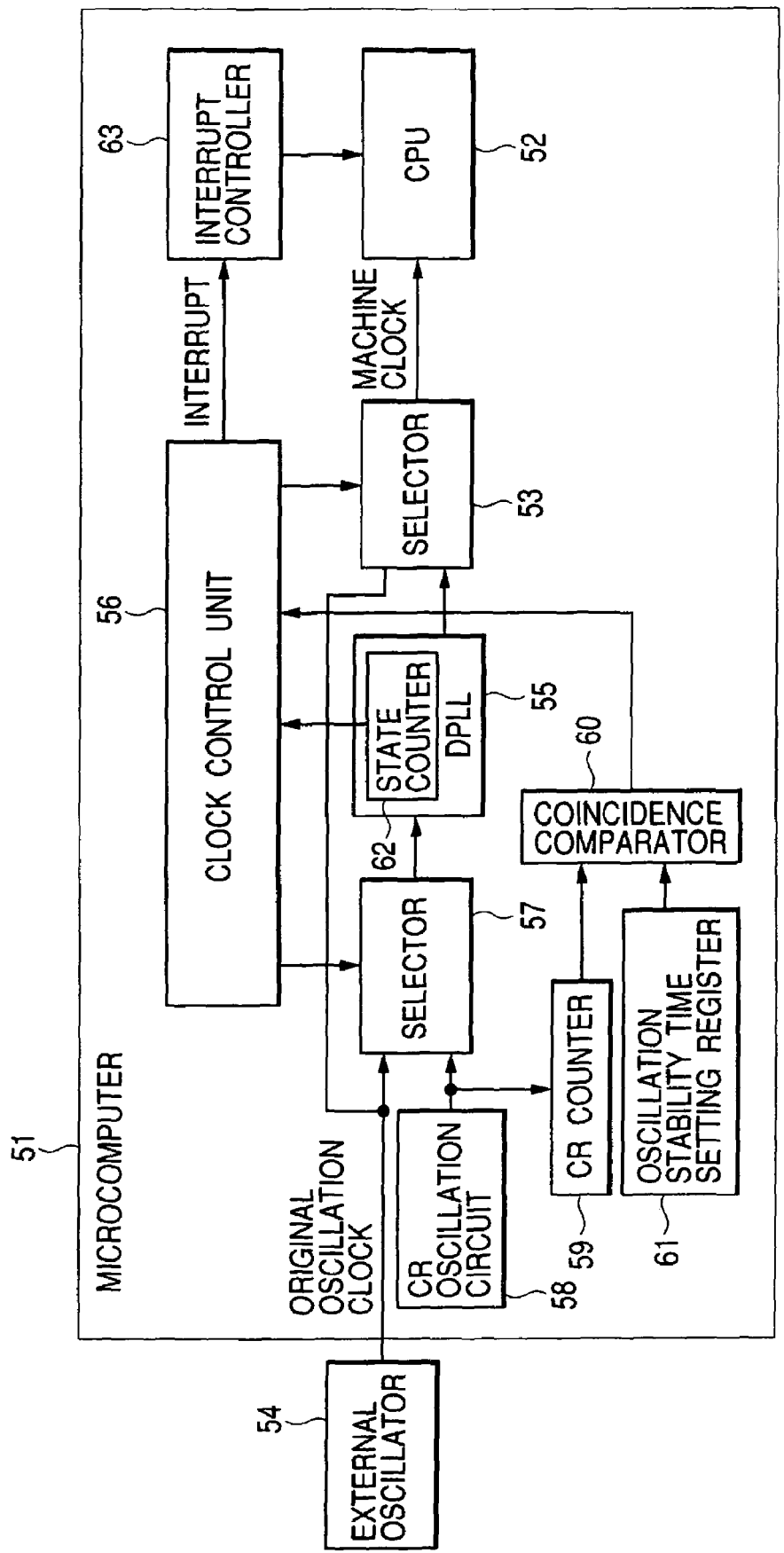
FIG. 14 is a block diagram showing a function on clock control in a microcomputer according to as fourth embodiment of the present invention.

Referring to FIGS. 14 to 17, a description will be given hereinbelow of a fourth embodiment of the present invention. FIG. 14 is a block diagram showing a functional portion on clock control in a microcomputer 51. The microcomputer 51 includes a CPU 52 as an essential part The CPU 52 is made to selectively receive an operation clock (machine clock) through a selector 53.

To the selector 53, there are given an original oscillation signal from an external oscillator 54 externally connected to the microcomputer 51 and a multiplied clock signal outputted from a DPLL (Digital Phase Locked Loop) circuit 55. The switching in the selector 53 is made by a clock control unit (switching notification control unit) 56.

Moreover, a reference clock signal is given through a selector 57 to the DPLL circuit (frequency multiplication circuit) 55, and to the selector 57 there are given the original oscillation signal from the external oscillator 54 and a CR clock signal outputted from a CR oscillation circuit 58. Moreover, the switching in the selector 57 is made by the clock control unit 56. For example, the original oscillation signal has a frequency of 4 MHz and the CR clock signal has a frequency of 25 kHz. If the CR clock signal is employed as a clock source for the DPLL circuit 55, the clock control unit 56 stops the oscillation operation of the external oscillator 54.

The CR clock signal is also fed as a counting clock to a CR counter 59. To a coincidence comparator 60, there are given count data from the CR counter 59 and set data in an oscillation stability time setting register 61. As this set data, the initial value is set by a hardware at the time of the power-on, and it can also be set by a user program the CPU 52 implements. When both the data are compared with each other and they agree with each other, the coincidence comparator 60 outputs a coincidence signal to the clock control unit 56.

That is, if data corresponding to an oscillation stability time of the external oscillator 54 is set in the setting register 61, the elapse of the oscillation stability time is decided on the basis of the timing of the output of the coincidence signal. Moreover, It is also possible that the clock control unit 56 refers to a count value of a state counter (sequence control means) 62 built in the DPLL circuit 55 and used for controlling the internal oscillation operation sequence for learning the elapse of the oscillation stability time in the DPLL circuit 55.

In this connection, the state counter 62 is similar to, for example, a control circuit 20 according to a fifth embodiment of the present invention, and for example, the output clock of the external oscillator 54 is used as a reference clock signal, 8 counts are set as one control cycle. Accordingly, at the start of the multiplication operation, a multiplied clock signal is outputted as a first arithmetic result at the time of the elapse of the one control cycle, and this term becomes an oscillation stability time.

In addition, at these detection timings, the clock control unit 56 is made to output a clock switching completion interrupt signal to an interrupt controller 63 of the CPU 52. The interrupt controller 63 also implements the enable control or the mask control in response to other interrupt factors to output an appropriate interrupt signal to the CPU 52.

Figure 15:
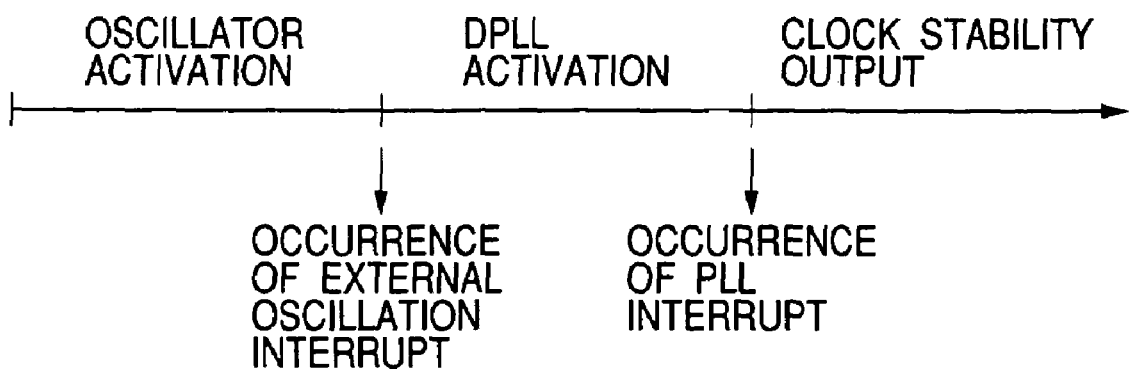
FIG. 15 is an illustration of a transition state of a clock signal at the power-on or in a wake-up condition when a CPU is activated from a sleep/stop mode.

Secondly, referring further to FIGS. 15 to 17, a description will be given hereinbelow of the operation and effects of the fourth embodiment. FIG. 15 shows a transition state of a clock signal at the power-on or the wake-up, i.e., the activation of the CPU 52 after a sleep/stop mode. That is, in the case of the transition to the sleep/stop mode, the clock signal oscillation operation stops except in the CR oscillation circuit 58. First, the external oscillator 54 starts its oscillation operation in response to the power-on. At the initial stage of the oscillation, the oscillation operation, i.e., the oscillation frequency, falls into an unstable condition and, hence, the CPU 52 inhibits the operation of the DPLL circuit 55.

Moreover, if the count value of the CR counter 59 agrees with the set data in the oscillation stability time setting register 61 and the coincidence comparator 60 outputs a coincidence signal to the clock control unit 56, then the clock control unit 56 outputs an interrupt signal through the interrupt controller 63 to the CPU 52. The CPU 52 recognizes from this interrupt signal the fact that the oscillation operation of the external oscillator 54 reaches a stable condition, and it makes the DPLL circuit 55 start the frequency multiplication operation.

Still moreover, the clock control unit 56 refers to the counter value of the state counter 62 of the DPLL circuit 55 and takes a stand-by state until the operation of the DPLL circuit 55 becomes stable and, when the operation thereof reaches a stable condition, outputs an interrupt signal. Therefore, the CPU 52 can learn from this interrupt signal that the operation of the DPLL circuit 55 reaches a stable condition.

Figure 16:
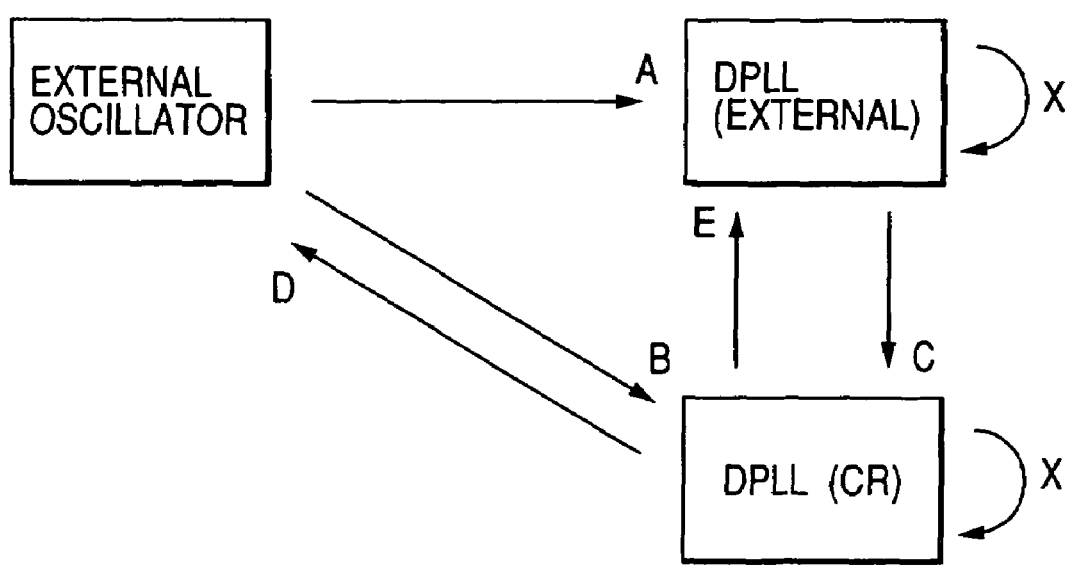
FIG. 16 is a diagram showing the switching of a machine clock to be made by a user program in a state where a CPU conducts a normal operation.
Figure 17:
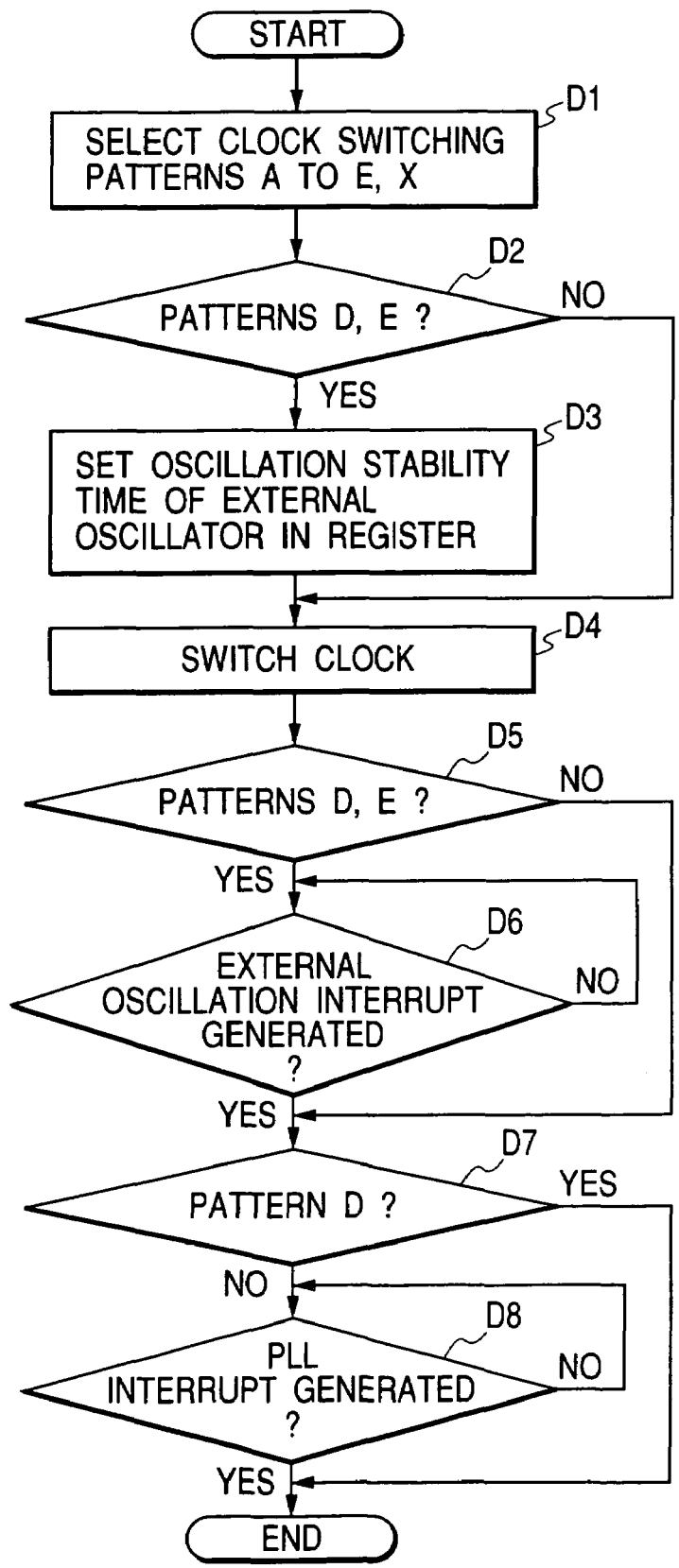
FIG. 17 is a flow chart showing the processing to be conducted when the CPU makes the switching of a machine clock signal on the basis of the diagram shown in FIG. 16.

FIG. 16 is a diagram showing a case in which a machine clock is switched through the use of a user program in a state where the CPU 52 conducts a normal operation. In this case, as clock sources, there are three types: the external oscillator 54, the DPLL circuit 55 (the external oscillator 54 acts as a source) and the DPLL circuit 55 (the CR oscillator 58 serves as a source), and the switching is made among these sources. In addition, since the DPLL circuit 55 can multiply or divide the frequency of the clock source when multiplication or division data is set by the CPU 52, the frequency switching is made in the DPLL circuit 55 itself. These patterns are as follows.

A: external oscillator→DPLL circuit (external source)
B: external oscillator→DPLL circuit (CR source)
C: DPLL circuit (external source)→DPLL circuit (CR source)
D: DPLL circuit (CR source)→external oscillator
E: DPLL circuit (CR source)→DPLL circuit (external source)
X: change of frequency in DPLL circuit FIG. 17 is a flow chart showing the processing to be conducted when the CPU 52 switches a machine clock signal on the basis of the diagram shown in FIG. 16. The CPU 52 first selects a switching pattern from the aforesaid A to E and X (step D1). If the patterns D and E are selected (step D2, "YES"), the oscillation stability time data of the external oscillator 54 is set in the setting register 61 (step D3), and the clock switching is made according to the patterns (step D4).

The clock switching is made by the switching between the selectors 53 and 57 in a manner such that the CPU 52 writes data in a setting register in the interior of the clock control unit 56. On the other hand, if the answer of the step D2 shows other than the patterns D and E ("NO"), the operational flow goes directly to the step D4.

Following this, the CPU 52 makes a decision as to whether or not the switching patterns are D and E, as in the case of the step D2 (step D5). If the switching patterns are D and E ("YES"), the CPU 52 waits until an external oscillation interrupt occurs (step D6). When the interrupt occurs ("YES"), the operational flow advances to a step D7. Likewise, when the answer of the step D5 indicates other than the patterns D and E, the operational flow goes to the step D7.

In the step D7, the CPU 52 makes a decision on whether or not the switching pattern is D and, if it is not D ("NO"), waits for the occurrence of a PLL interrupt (step D8). If the PLL interrupt occurs ("YES"), the processing comes to an end. On the other hand, if the decision in the step D7 indicates the pattern D ("YES"), this processing also comes to an end. That is, in the case of the pattern E, the CPU 52 recognizes the clock stability by waiting for the occurrences of both the external oscillation interrupt and the PLL interrupt. In the case of the pattern D, the CPU 52 recognizes the clock stability by waiting for the occurrence of only the external oscillation interrupt, and in the case of the other patterns, the CPU 52 recognizes the clock stability by waiting for the occurrence of only the PLL interrupt.

As described above, according to the fourth embodiment, the clock control unit 56 of the microcomputer 51 monitors the oscillation operation of the DPLL circuit 55 through the use of the state counter 62 and, when the frequency of the multiplied clock signal is switched, issues an interrupt request to the CPU 52 at the timing that the oscillation operation becomes stable after the switching.

Accordingly, the CPU 52 is not required to set a redundant stand-by time, thus improving the processing efficiency. Moreover, the clock control unit 56 can lean) from seeing the sequence counter 62 the fact that the oscillation operation of the DPLL circuit 55 reaches a stable condition.

In addition, the operation clock signal for the CPU 52 can be selected from a plurality of clock signals through the use of the selectors 53 and 57, and the more diverse clock signal selection is feasible, thereby enlarging the control range.

Still additionally, since the clock control unit 56 monitors the oscillation operation of the external oscillator 54 and issues an interrupt request to the CPU 52 at the timing that the oscillation operation becomes stable after switched, the CPU 52 can learn an appropriate timing of the start of the operation of the DPLL circuit 55 from the occurrence of the interrupt request.

(Fifth Embodiment)

Referring to FIGS. 18 to 23, a description will be given hereinbelow of a fifth embodiment in which the present invention is applied to an ECU (Electronic Control Unit) for a vehicle. Incidentally, a basic portion of this configuration is disclosed in Japanese patent Laid-Open No. 2000-357947.

Figure 18:
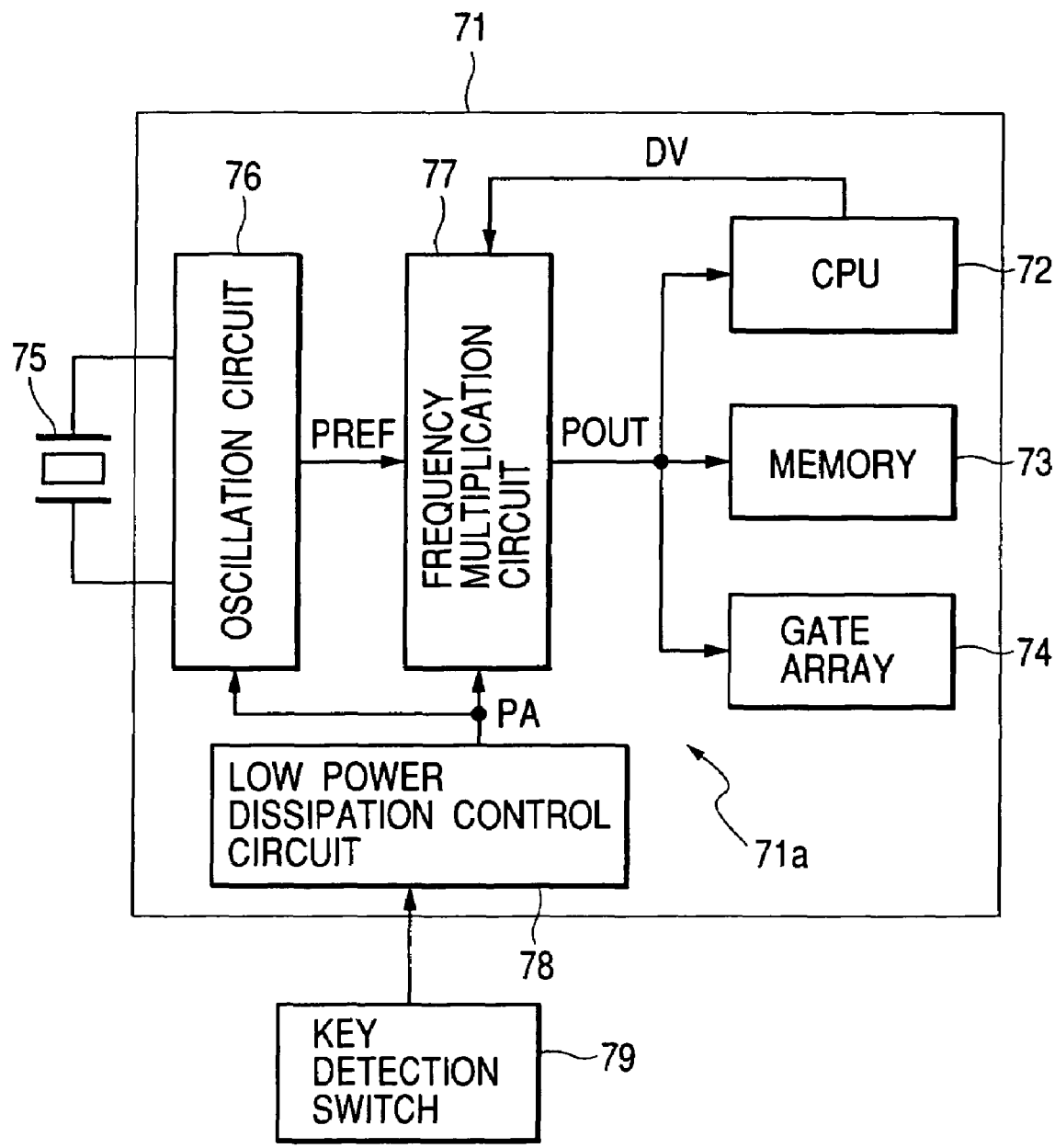
FIG. 18 is a functional block diagram showing an electric configuration of an electronic control unit (ECU) according to a fifth embodiment of the present invention.

FIG. 18 is a functional block diagram showing an electric configuration of an ECU (microcomputer) 71. The ECU 71 is constructed as a semiconductor integrated circuit (IC) and includes, as internal circuits, clock synchronization circuits such as a CPU 72, a memory 73 and a gate array 74. A crystal oscillator 75 is externally connected to the ECU 71, and an oscillation circuit (reference clock oscillation circuit) 76 applies a bias to the crystal oscillator 75 to output a reference clock signal PREF having a frequency of 16 kHz.

The reference clock signal PREF is fed to a frequency multiplication circuit 77, and the frequency multiplication circuit 77 produces a multiplied clock signal POUT having a frequency of 8 MHz by multiplying the reference clock signal PREF by 512, and outputs it to the clock input terminals of the CPU 72, the memory 73 and the gate array 74. The frequency multiplication circuit 77 is constructed in the form of a so-called DPLL (Digital Phase Locked Loop) circuit, and the multiplier factor (multiplication factor) is set in accordance with the value of multiplier factor setting data DV given by the CPU 72.

Moreover, to the frequency multiplication circuit 77, there is outputted a mode control signal PS (stop control) to be used for switching the operation mode of the ECU 71 to a low power dissipation mode or a stand-by mode by means of a low power dissipation control circuit (low power dissipation control means) 78.

A key detection switch 79 is for detecting whether or not a key (not shown) of a vehicle is inserted into a key cylinder (not shown). If the key detection switch 79 outputs no key detection signal to the low power dissipation control circuit 78, the low power dissipation control circuit 78 sets a mode control signal PA at a low level to maintain the ECU 71 in a low power dissipation mode (sleep/stop).

On the other hand, if the key detection switch 79 outputs the key detection signal, the low power dissipation control circuit 78 sets the mode control signal at a high level to switch the ECU 71 from the low power dissipation mode to the stand-by mode. In this case, the frequency multiplication circuit 77 and the low power dissipation control circuit 78 constitute a clock control circuit (oscillation circuit apparatus) 71a.

Figure 19:
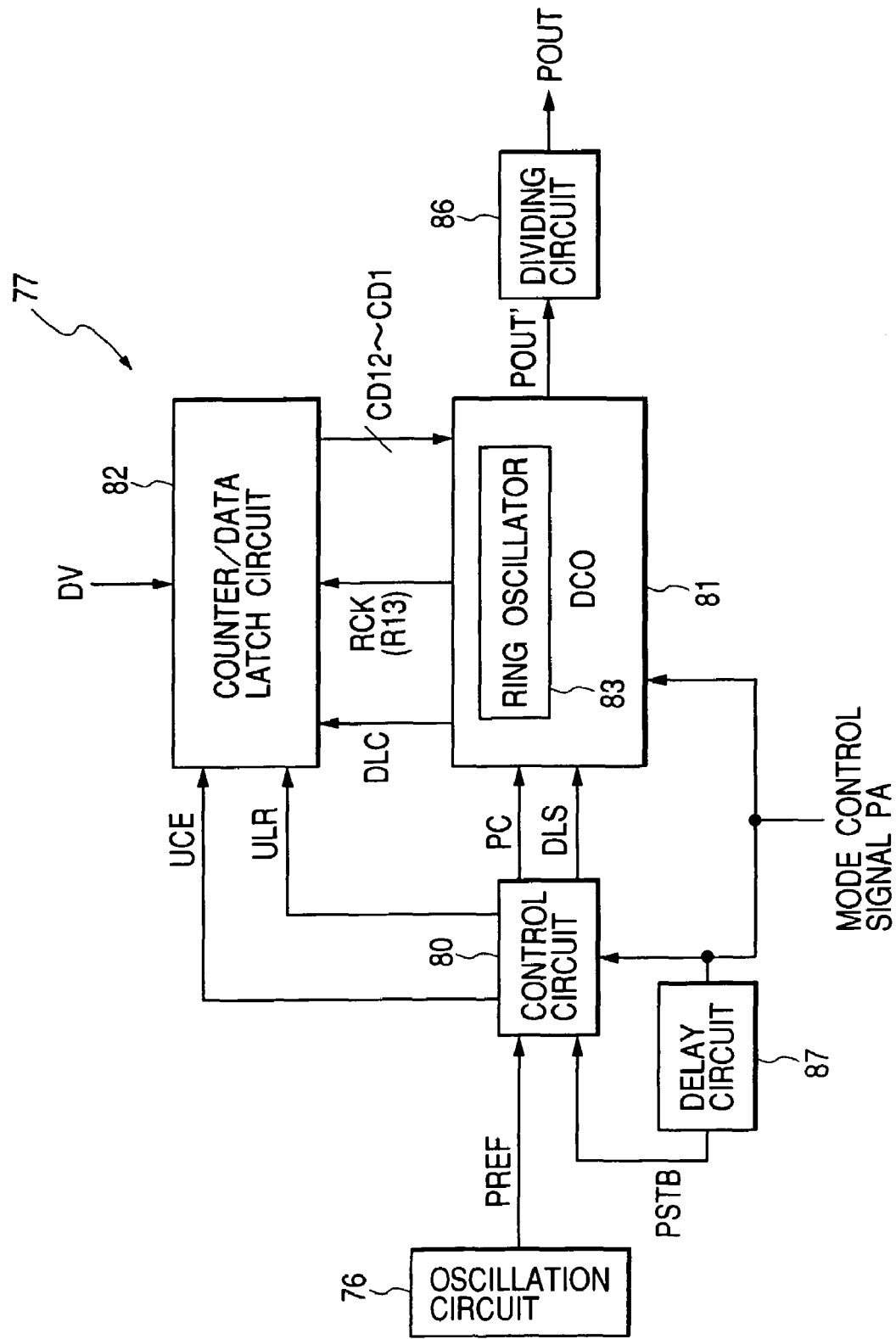
FIG. 19 is a functional block diagram schematically showing a configuration of a frequency multiplication circuit according to the fifth embodiment.

FIG. 19 is a functional block diagram schematically showing a configuration of the frequency multiplication circuit 77 (a detailed arrangement is disclosed in Japanese Patent Laid-Open No. HEI 8-265111). To a control circuit (sequence control means) 80, there is given the reference clock signal PREF outputted from the oscillation circuit 76. The control circuit 80 internally includes a sequence counter constructed with three flip-flops (not shown).

This sequence counter counts the number of input pulses of the reference clock signal and outputs various control timing signals to a DCO (Digital Controlled Oscillator) 81 and a counter/data latch circuit 82 in synchronism with the reference clock signal PREF in a state where 8 cycles of the reference clock signal PREF are set as one sequence control cycle.

Figure 21:
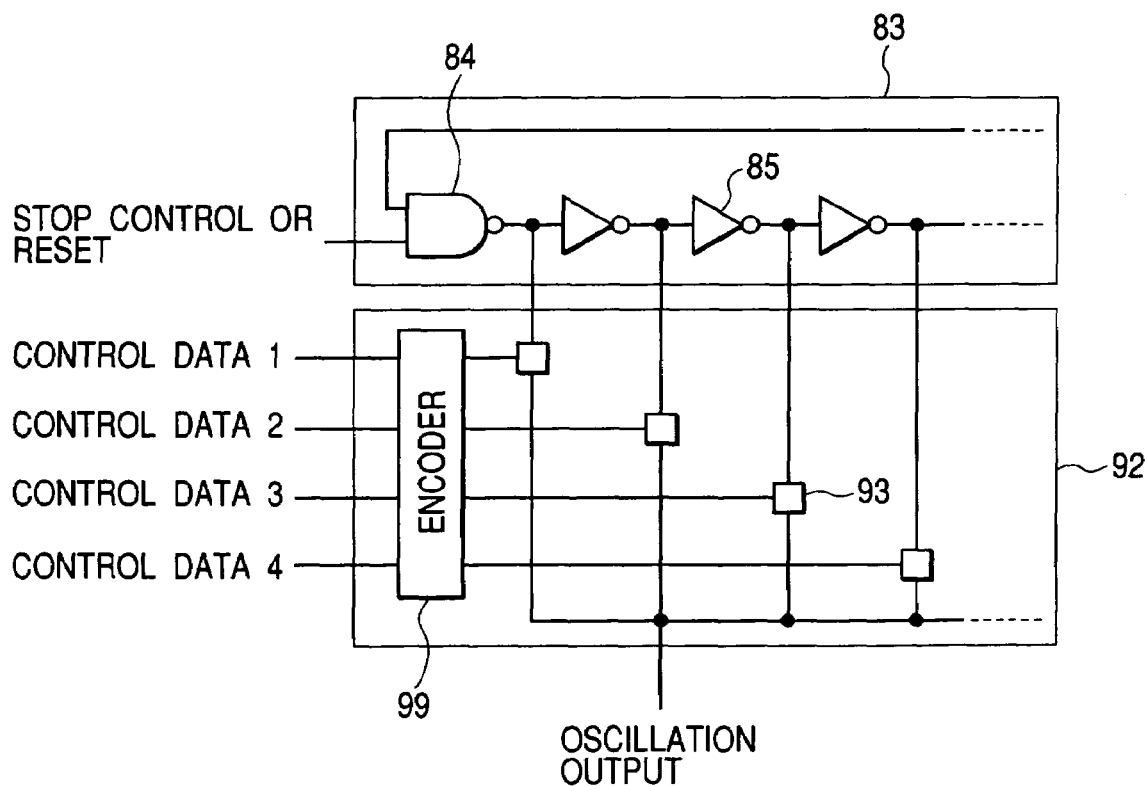
FIG. 21 is an illustration of a configuration of a ring oscillator according to the fifth embodiment.

The DCO 81 internally includes a ring oscillator (polyphase clock signal outputting means) 83. As shown in FIG. 21, the ring oscillator 83 is composed of an NAND gate 84 serving as a logical inverting circuit and a plurality of inverter (INV) gates S5. The output terminals of these INV gates 84 are connected to the next-stage input terminals thereof to form a ring-like configuration, and one input terminal of the NAND gate 84 is connected to the output terminal of the final-stage INV gate (not shown), while a stop control signal is given from the external to the other input terminal thereof. Moreover, polyphase clock signals R1 to R16 are outputted from the output terminals of the INV gate 84.

Referring again to FIG. 19, to the counter/data latch circuit 82, there are given control timing signals UCE and CLR outputted from the control circuit 80. These control timing signals UCE and CLR has a pulse width corresponding to one cycle of the reference clock signal PREF and are outputted in the third and seventh cycles of the sequence control cycles in the control circuit 80, respectively.

In addition, to the counter/data latch circuit 82, as the RCK, there is given the clock signal R13 outputted from the ring oscillator 83. Through the use of this clock signal RCK, its internal up-counter (16 bits) performs the count operation. Still additionally, the counter/data latch circuit 82 makes the counter conduct the up-count operation while the control timing signal UCE is outputted, thus counting (measuring) a time corresponding to one cycle of the reference clock signal PREF through the use of the clock signal RCK.

The count data is latched in response to a latch signal DLC when a control timing signal DLS is outputted from the control circuit 80 in the fifth cycle of the sequence control cycles and is given to the DCO 81, and when a control timing signal CLR is outputted therefrom, the latched data is made clear.

The counter/data latch circuit 82 shifts the counted 16-bit data DT 16 to DT1 in the right-hand direction in accordance with the multiplier factor setting data DV fed from the CPU 72 and then latches the 12-bit data after shifted. The latched 12-bit data are outputted as CD12 to CD1 to the DCO 81. A multiplication clock signal POUT' outputted from the DCO 81 is divided down into two through a dividing circuit 86 for adjusting the duty ratio and is outputted as a multiplication clock signal POUT.

Moreover, a mode control signal PA is given to the control circuit 80 and is also given as an operation start signal PSTB to the control circuit 80 through a delay circuit 87 which provides a delay time corresponding approximately to one cycle of the reference clock signal PREF.

Figure 20:
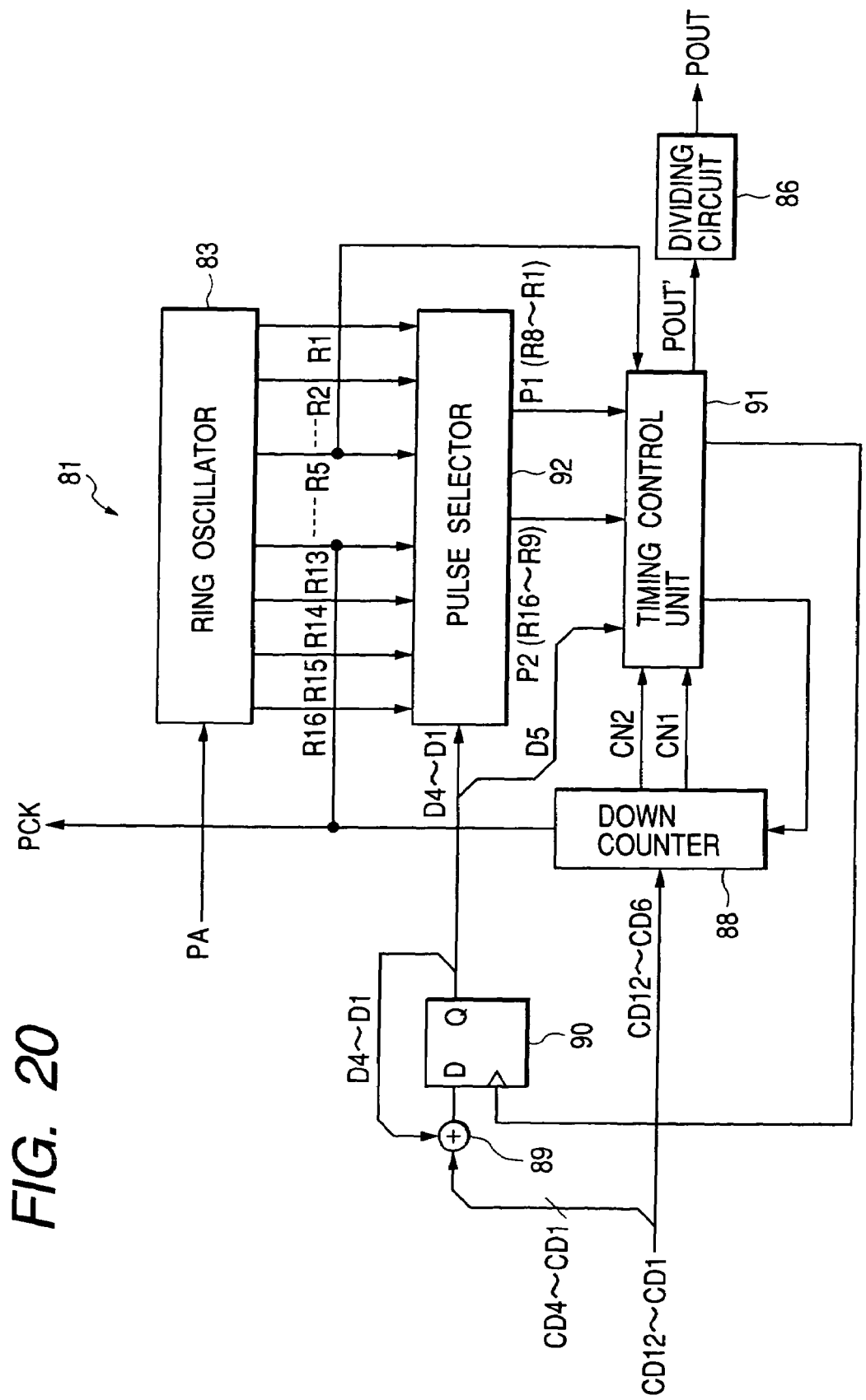
FIG. 20 is a functional block diagram showing a detailed configuration of a digital controlled oscillator (DCO) according to the fifth embodiment.

FIG. 20 is a functional block diagram showing a detailed configuration of the DCO 81, of the latched data CD12 to CD1, CD12 to CD5 forming the higher-order side eight bits are loaded as the counting data for a down counter 88 at a predetermined timing. Moreover, the down counter 88 counts the loaded counting data in response to the clock signal R13 outputted from the ring oscillator 83.

In addition, of the latched data CD12 to CD1, CD4 to CD1 forming the lower-order side four bits are supplied through an adder 89 to the data input terminal D of a register 90. The register 90 is made to output the output data of the adder 89 as 5-bit data D5 to D1 in response to a timing signal outputted from a timing control unit 91, and of these, the lower-order 3-bit data D4 to D1 are fed to a pulse selector 92 and further fed as an added value to the adder 89. Still additionally, the data D5 outputted from the register 90 is equivalent to a carrier signal developing in accordance with the addition in the adder 89 and is given to the timing control unit 91.

The polyphase clock signals R16 to R1 outputted from the ring oscillator 83 are given to the pulse selector 92, and of these polyphase clock signals R16 to R1, one is selected which corresponds to the values of the data D4 to D1 (numbers corresponding to (decimal digit+1)), and is outputted through one of output terminals P1 (R8 to R1) and R2 (R16 to R9) to the timing control unit 91. To the timing control unit 91, there is supplied the clock signal R5 outputted from the ring oscillator 83.

The down counter 88 counts down the loaded counting data and, when the count value reaches "2" sets an output signal CN2 at a high level, and when the count value reaches "1", sets an output signal CN1 at a high level, with these signals being outputted to the timing control unit 91.

The outline of the aforesaid operation is as follows. That is, the counting data DT16 to DT1 corresponding to one cycle of the reference clock signal PREF are counted at every eight cycles of the reference clock signal PREF and, of these, the 12-bit data CD12 to CD1 shifted in the right-hand direction in accordance with multiplied data DV are given to the DCO 81. Moreover, when the higher-order 8-bit data CD12 to CD5 are counted down, one of the polyphase clock signals R16 to R1 corresponding to the values (+1) of the lower-order data D4 to D1 given from the register 90 is selected and outputted as a multiplied clock signal POUT'.

In addition, as shown in FIG. 21, in the interior of the pulse selector 92, analog switches 93 are located in a state associated with the respective polyphase clock signals R1 to R6. Still additionally, one of the plurality of analog switches 93 is encoded by an encoder 99 on the basis of the control data D1 to D4 and alternatively turned on, thereby outputting one of the polyphase clock signals R1 to R16 to the timing control unit 91.

Figure 22:
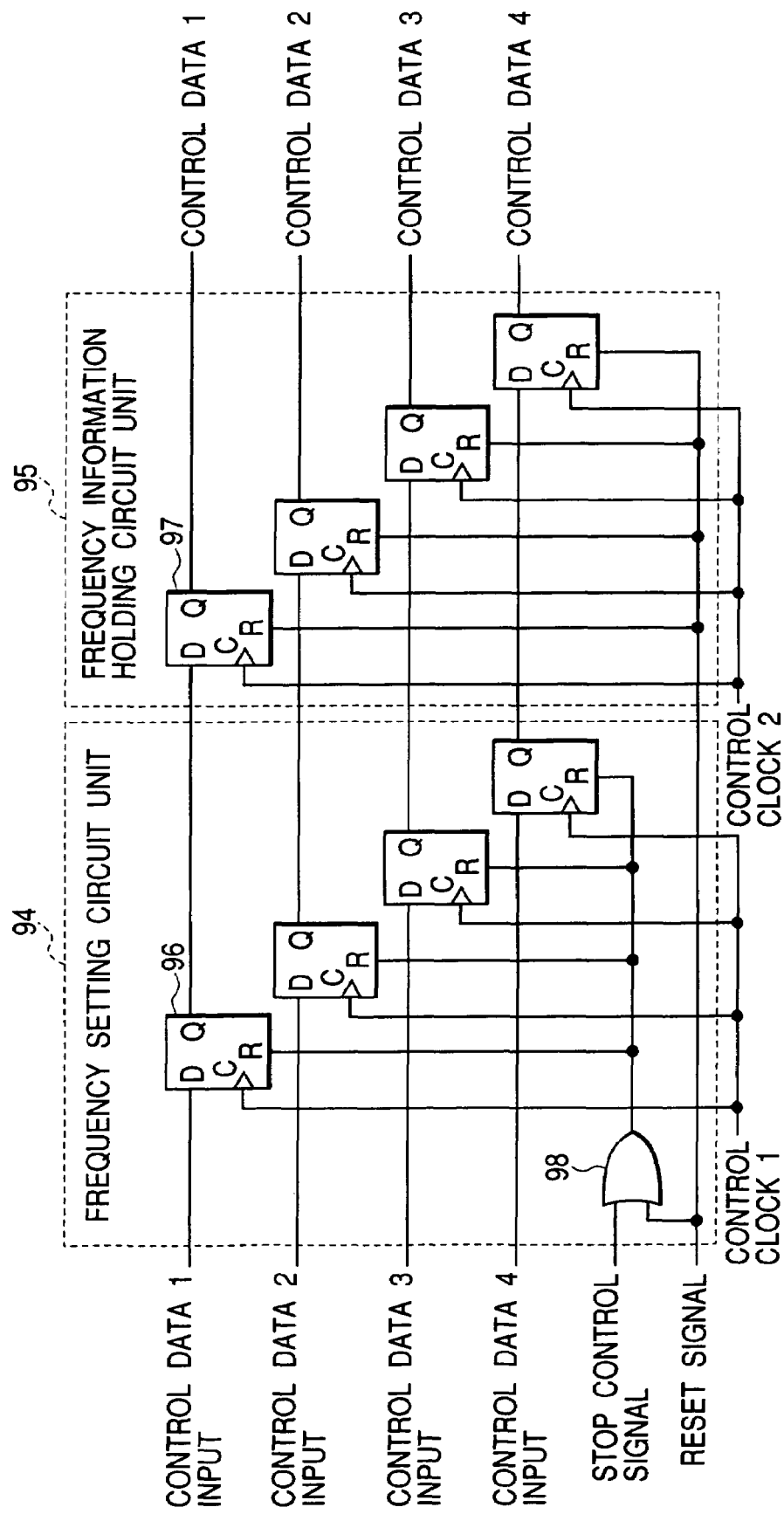
FIG. 22 is an illustration of a portion of an internal configuration of a counter data latch circuit according to the fifth embodiment.

FIG. 22 shows a portion of an internal arrangement of the counter/data latch circuit 82. That is, the control data CD12 to CD1 (only CD4 to CD1 are shown in the illustration) are retained in a double-latch arrangement comprising a frequency setting circuit unit 94 and a frequency information holding circuit unit (data holding means) 95. These circuit units 94 and 95 are constructed with flip-flops 96 and flip-flops 97, respectively, and control clocks 1 and 2 are supplied to clock input terminals of the flip-flops 96 and clock input terminals of the flip-flops 97, respectively.

Moreover, a reset signal is supplied to reset terminals of the flip-flops 97 constituting the frequency information holding circuit unit 95, while a reset signal and a stop control signal at a low power dissipation mode are given through an OR gate 98 to reset terminals of the flip-flops 96 organizing the frequency setting circuit unit 94.

The frequency information holding circuit unit 95 is used for, in a normal operation, re-synchronizing control data 1 to 4, synchronized by the frequency setting circuit unit 94 through the use of the control clock 1 and retained, through the use of the control clock 2. A similar function is also disclosed in Japanese Paten Laid-Open No. 2000-357947 (however, when the shifting to a low power dissipation mode takes place, the data is reset and disappears).

Figure 23:
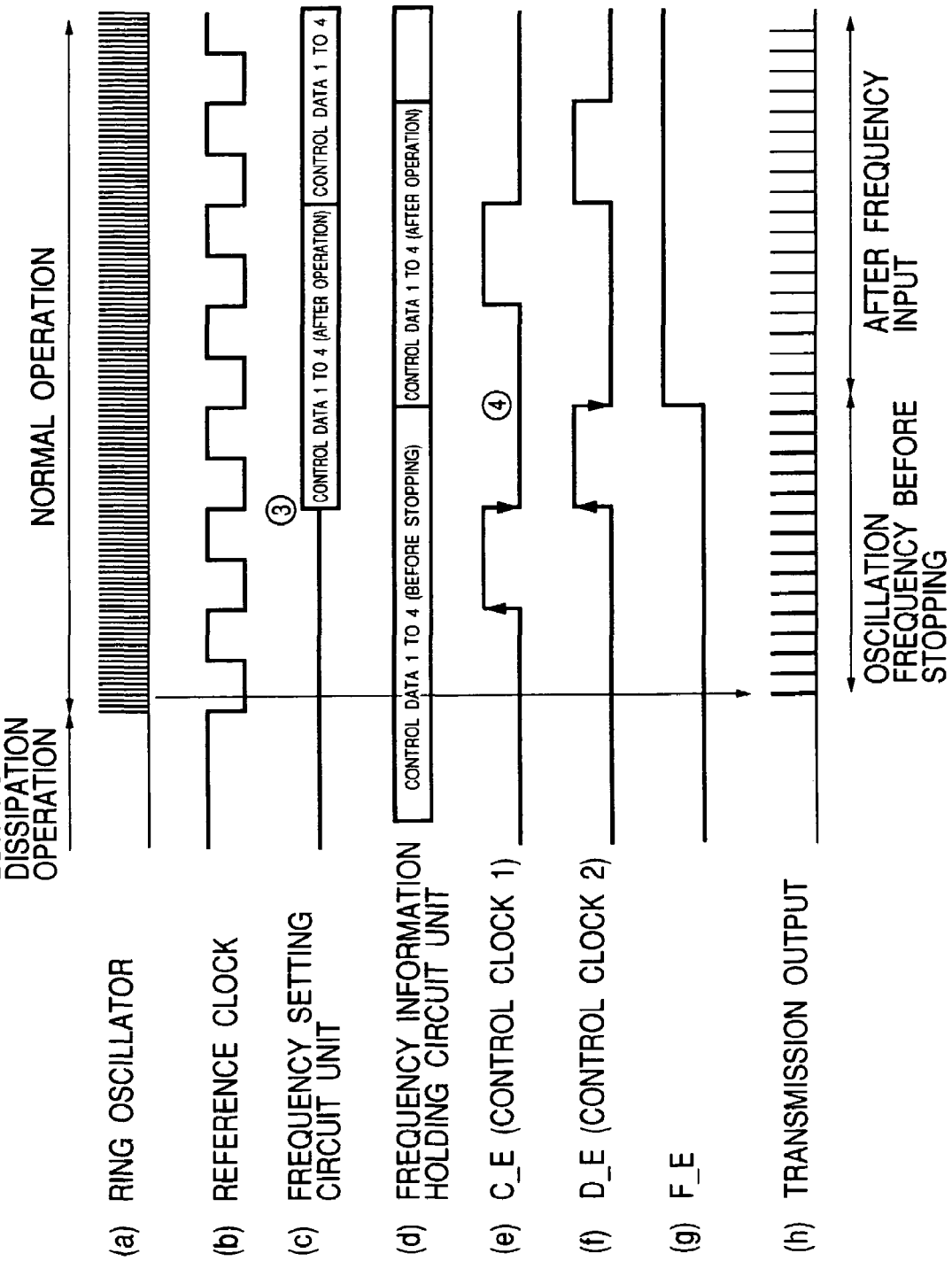
FIG. 23 is a timing chart showing a case in which the frequency multiplication circuit is activated from a low power dissipation mode to conduct an oscillation operation according to the fifth embodiment.

Secondly, referring to FIG. 23, a description will be given hereinbelow of an operation and effects of the fifth embodiment. FIG. 23 is a timing chart showing a case in which the frequency multiplication circuit 77 is activated from a state of a low power dissipation mode to perform an oscillation operation.

In FIG. 23, in a low power dissipation mode indicated by circled numeral 1, the oscillation operations of the ring oscillator 83 and the oscillation circuit 76 are in stopped conditions, and at the release from the low power dissipation mode indicated by circled numeral 2, they start the oscillation operations.

Moreover, although the data of the frequency setting circuit unit 94 is reset during the low poser dissipation mode, the data of the frequency information holding circuit unit 95 is preserved. The preserved data is the data (oscillation control condition) which has been used for the oscillation operation of the frequency multiplication circuit 77 prior to the low power dissipation mode indicated by the circled numeral 1, and which has been for the measurement of the cycle of the reference clock signal using the clock signal of the ring oscillator 83.

Therefore, when the release from the low power dissipation mode takes place as indicated by the circled numeral 2, the frequency multiplication circuit 77 can immediately start the oscillation operation on the basis of the data preserved in the frequency information holding circuit unit 95 without again performing the measurement of the reference clock signal cycle. Moreover, when the control clock 1 falls as indicated by circled numeral 3, the frequency setting circuit unit 94 outputs control data 1 to 4 newly set by the CPU 72 after the wake-up, and the frequency information holding circuit unit 95 latches the inputted control data 1 to 4 when the control clock rises and outputs the newly set control data 1 to 4 at the falling indicated by circled numeral 4. Still moreover, at the falling indicated by the circled numeral 4, F_E representing an enable signal of a multiplied clock signal output (oscillation output) is made active, and a clock signal POUT is outputted to the CPU 72.

As described above, according to the fifth embodiment, in a case in which the oscillation operation of the frequency multiplication circuit 77 constructed as a digital controlled type DPLL circuit is temporarily stopped at the shifting to the low power dissipation mode, the control data CD12 to CD1 set at that time are preserved in the frequency information holding circuit unit 95 so that the oscillation operation is resumed on the basis of the preserved control data CD12 to CD1. Accordingly, unlike a conventional technique, since there is no need to again set the oscillation control condition at the resumption of the oscillation operation, the oscillation state at the resumption can be stabilized more quickly. Moreover, the lower power dissipation is achievable.

In addition, since the frequency multiplication circuit 77 is equipped with the ring oscillator 83 constructed with a plurality of logical inverting circuits being connected into a ring-like configuration, the arrangement for obtaining polyphase clock signals needed for the digital controlled type oscillation operation is realizable with a less number of gates. Moreover, since the low power dissipation control circuit 78 stops the oscillation operation of the ring oscillator 83 when an operation of a clock synchronization circuit is stopped for the shifting to the low power dissipation mode, the lower power dissipation is achievable. Still moreover, since the frequency multiplication circuit 77 is equipped with the DCO 81 which is made to produce and output an n-multiplied clock signal obtained by n-multiply the frequency of the reference clock signal PREF outputted from the oscillation circuit 76, a high-accuracy oscillation operation is feasible according to the digital control method.

In the frequency multiplication circuit 77, assuming that the control data is again set, then the cycle of the reference clock signal PREF is measured on the basis of the cycle of the polyphase clock signal and the multiplication operation is resumed on the basis of this measurement value. On the other hand, with the arrangement of the control data being preserved, there is no need to again measure the cycle of the reference clock signal PREF, which enables the oscillation operation to be stabilized at an extremely high speed.

Still additionally, in the conventional analog type PLL circuit 200, in the case of the likewise temporary storage of the oscillation operation, it is required that a voltage signal outputted from the phase comparator 201 be once A/D-converted to, for example, latch and preserve the resultant digital data so that the preserved digital data is D/A-converted and outputted at the resumption of the oscillation operation. On the other hand, in the case of the digital controlled type frequency multiplication circuit 77 according to the fifth embodiment, since the control data is used in the digital form from first to last, the preservation of the data becomes extremely easy, which is advantageous as compared to the analog type.

(Sixth Embodiment)

Figure 24:
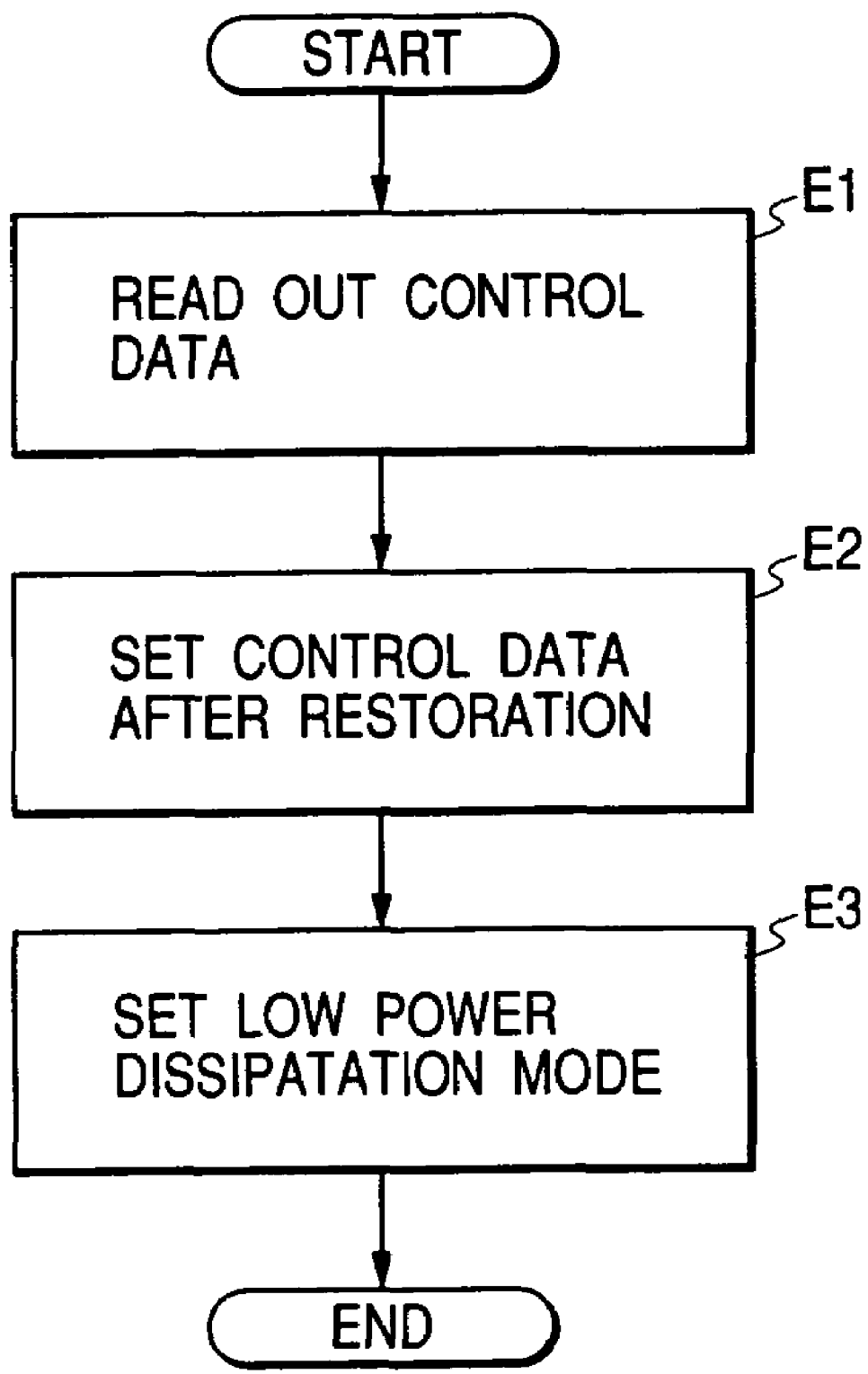
FIG. 24 is a flow chart showing the processing in a CPU according to a sixth embodiment of the present invention.

Referring to FIG. 24, a description will be given hereinbelow of a sixth embodiment of the present invention. In the sixth embodiment, simultaneously with the release from a low power dissipation mode, a CPU 52 changes the frequency of an n-multiplied clock signal in a frequency multiplication circuit 77. That is, the preserved data in a frequency information holding circuit unit 95 is readable and writable by a CPU 72.

In the flow chart of FIG. 24, the CPU 72 first reads out the preserved data from the frequency information holding circuit unit 95 (step E1). Then, the multiplication factor is determined at the next activation on the basis of the data read out therefrom, and the data according to the frequency at the activation is written in the frequency information holding circuit unit 95 (step E2). Subsequently, the shifting to a low power dissipation mode takes place (step E3).

As described above, according to the sixth embodiment, since the control data CD12 to CD1 can be changed prior to the stopping of the present oscillation operation, for example, in a case in which the CPU 52 controls the oscillation operation and sets the oscillation control condition, when the oscillation frequency at the next operation resumption is changed in a stage before the CPU 52 stops the oscillation operation, it is possible to previously set an oscillation control condition accordingly.

(Seventh Embodiment)

Figure 25:
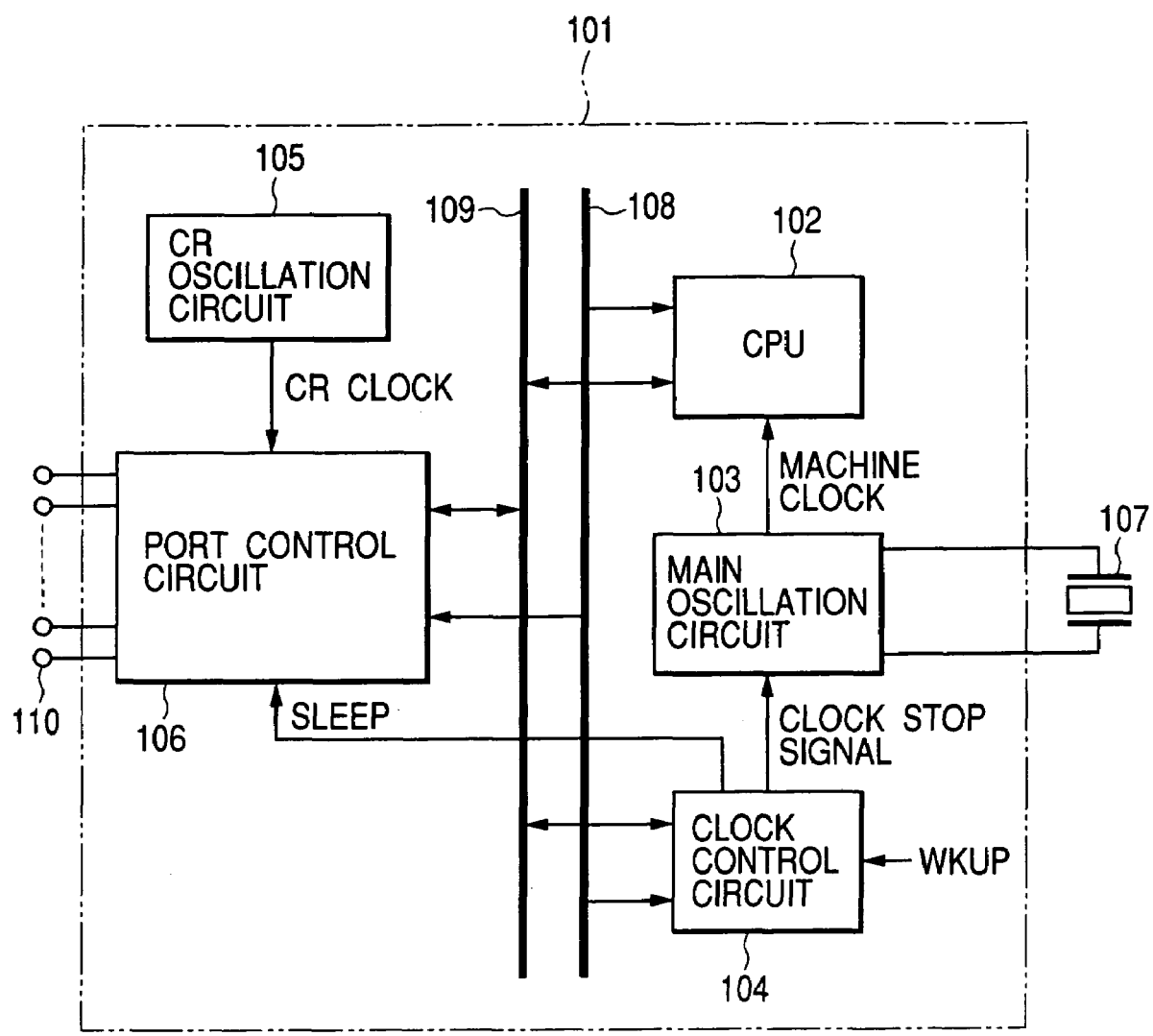
FIG. 25 is an illustration of an example of a configuration of a single-chip microcomputer according to a seventh embodiment of the present invention.

Referring to FIGS. 25 to 28, a description will be given hereinbelow of a seventh embodiment of the present invention. FIG. 25 shows an example of configuration of a single-chip microcomputer applicable to, for example, a body ECU (Electronic Control Unit) for a vehicle. The microcomputer, generally designated at reference numeral 101, includes a CPU 102 as a principal part and is equipped with a main oscillation circuit 103, a clock control circuit 104, a CR oscillation circuit 105, a port control circuit (signal level changing means) 106 and others around the CPU 102.

The main oscillation circuit 103 operates a crystal oscillator 107 externally connected to the microcomputer 101 to supply an operation clock signal (machine clock or system clock) to the CPU 102. The clock control circuit 104, when receiving an instruction for starting a sleep/stop mode from the CPU 102 through an address bus 108 and a data bus 109, outputs a clock stop signal to the main oscillation circuit 103 for stopping the output of the clock signal from the main oscillation circuit 103 and for setting the CPU 102 (or, the entire microcomputer 101 including the CPU 102) in the sleep/stop mode.

In this case, the sleep mode signifies a mode which, after once shifted, is automatically canceled (released) at the time of the elapse of a predetermined time detected by a timer built in the clock control circuit 104, while the stop mode signifies a mode which, after once shifted, is canceled only when a wake-up factor (wake-up signal which will be mentioned later, or the like) occurs in the external. That is, these modes are for accomplishing the reduction of power dissipation in a manner such that the operation of the CPU 102 is set in a lower state than normal.

In addition, when a wake-up signal WKUP is outputted in accordance with the occurrence of a wake-up factor, the clock control circuit 104 stops the output of the clock stop signal to resume the output of a clock signal from the main oscillation circuit 103. Incidentally, even in the case of the sleep mode, this mode is canceled in response to the output of a wake-up signal WKUP.

For example, the oscillation frequency of the main oscillation circuit 103 is approximately 4 MHz, and the oscillation frequency of the CR oscillation circuit 105 is approximately 25 kHz. Moreover, the CPU 102 four-multiplies a clock having a frequency of 4 MHz through the use of its internal PLL oscillation circuit (not shown) so that it operates at a clock frequency of 16 MHz.

The port control circuit 106 is for controlling the level of an output terminal (external signal output terminal) of the microcomputer 101 in accordance with the setting of an internal register made by the CPU 102. Moreover, to the port control circuit 106, there is given a SLEEP signal outputted from the clock control circuit 104 during the sleep mode.

Incidentally, although not shown concretely, the microcomputer 101 additionally an interrupt controller, a DMA controller, a watch dog timer, an A/D converter, a D/A converter, a peripheral circuit such as a serial communication circuit, and others.

Figure 26:
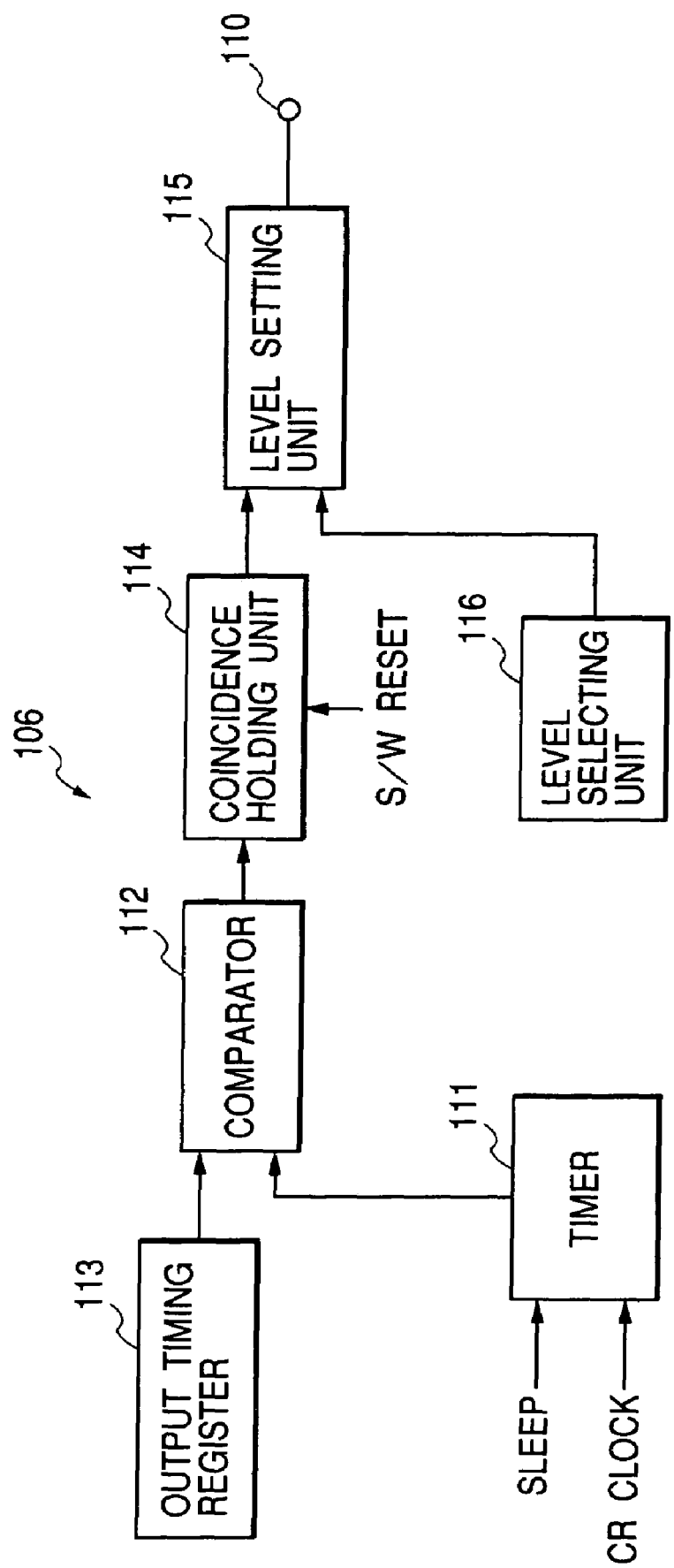
FIG. 26 is a block diagram showing an internal configuration of a port control circuit according to the seventh embodiment.

FIG. 26 is a functional block diagram showing an internal configuration of the port control circuit 106. A timer (level change timer) 111 carries out the counting operation on the basis of a CR clock signal outputted from the CR oscillation circuit 105, with the count data being given to a comparator (comparison circuit) 112. In the timer 111, the counting operation becomes enable when a SLEEP signal is active.

The comparator 112 also receives set data of an output timing register 113, and when both agree with each other, the comparator 112 outputs a coincidence signal through a coincidence holding unit 114 to a level setting unit 115. The output timing register 113 is made such that data writing can be made by the CPU 102. The coincidence holding unit 114 is a flip-flow made to hold the active state of the coincidence signal outputted from the comparator 112.

The level setting unit 115 outputs a signal with a level set in a level selection unit 116 to an external signal output terminal 110 of the microcomputer 101 in a manner such that the coincidence signal given through the coincidence holding unit 114 is used as a trigger. The level selection unit 116 permits the data writing by the CPU 102, as with the output timing register 113. Moreover, an output state of the coincidence holding unit 114 can be reset (S/W reset) when the CPU 102 performs the writing in a reset register separately provided.

In this connection, the purpose of the function of this port control circuit 106 is as follows. That is, when the CPU 102 shifts from the sleep mode to the wake-up, let it be assumed that there is a need to conduct some processing with respect to an external device, such as an object of control, connected to a terminal of the microcomputer 101. At this time, in a case in which it is required that the function of the external device be made active (for example, an operation power supply is turned on) in a former stage of the processing, if all the procedures are conducted after the wake-up of the CPU 102, it take a long time until the processing reaches completion.

For this reason, according to the seventh embodiment, also in a case in which the CPU 102 falls into the sleep mode, the level of the output terminal 110 is controlled through hardware in a stage before released, thereby making the function of the external device active in advance.

Figure 27:
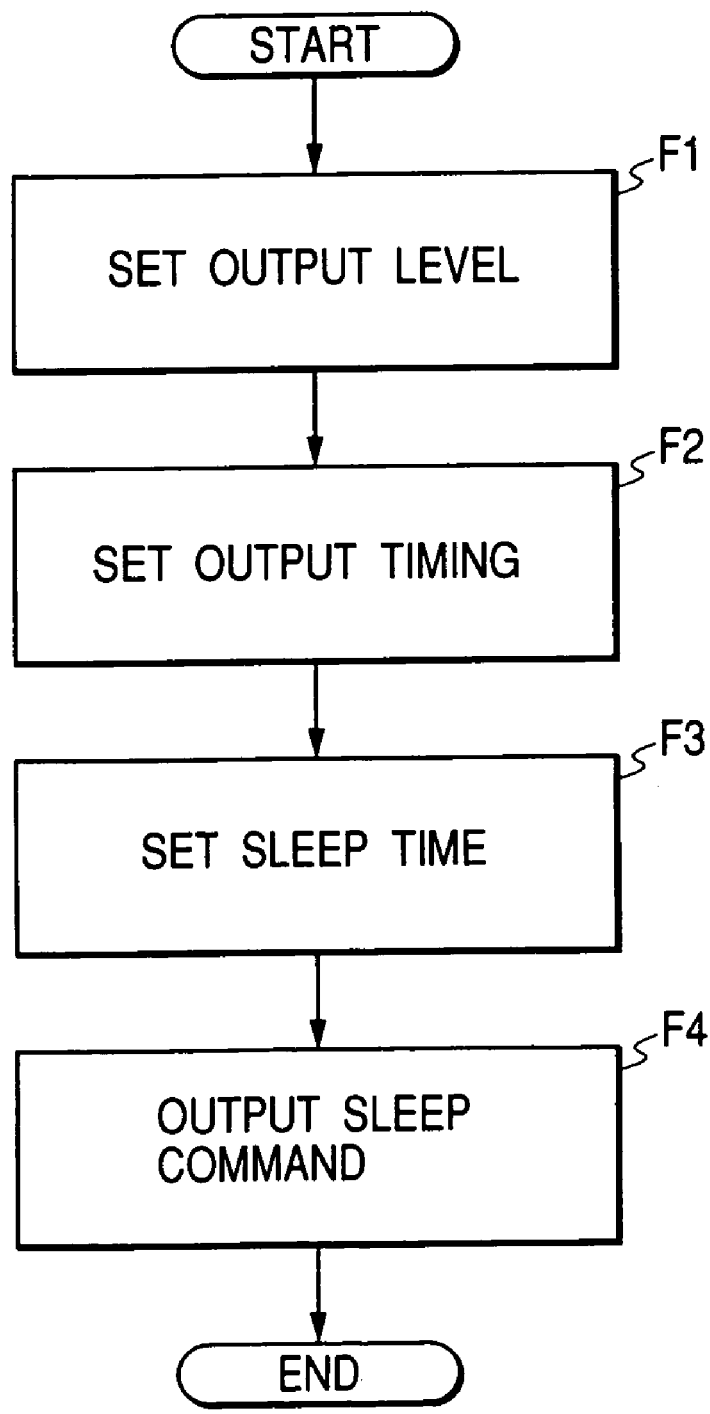
FIG. 27 is a flow chart showing the contents of the processing for the shifting to a sleep mode in a CPU according to the seventh embodiment.
Figure 28:
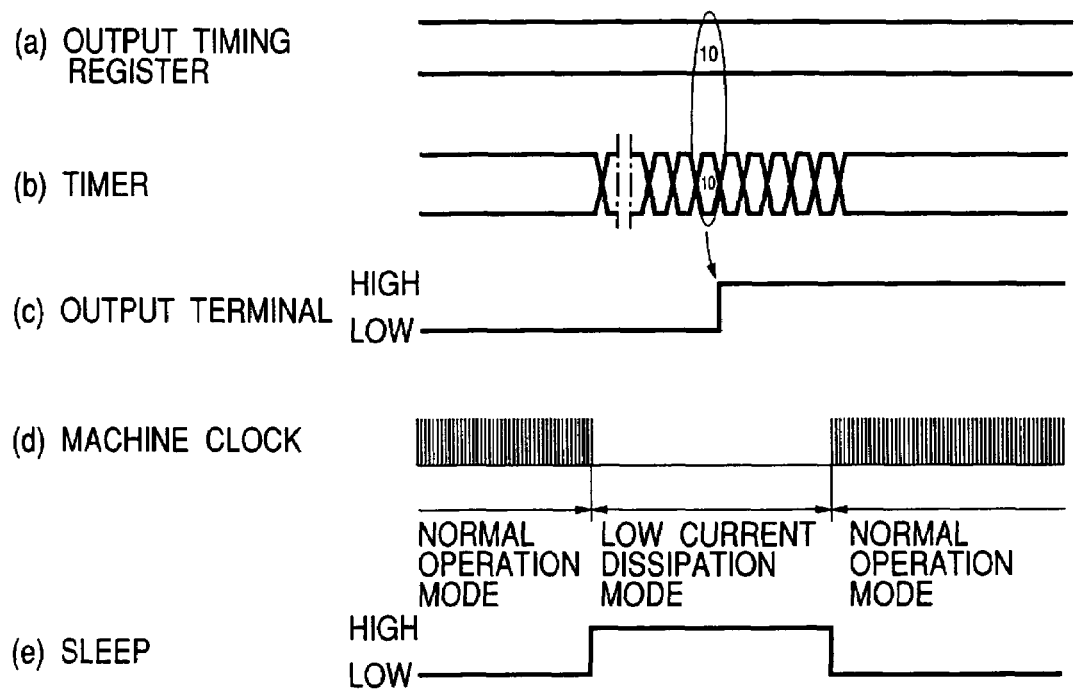
FIG. 28 is a timing chart showing the shifting to the sleep mode according to the seventh embodiment.

Referring to FIGS. 27 and 28, a description will be given hereinbelow of an operation and effects of the seventh embodiment. FIG. 27 is a flow chart showing the contents of sleep mode shifting processing in the CPU 102. In FIG. 27, first, the CPU 102 performs the writing in the level selection unit 116 to set a level of the output terminal 110 to be changed during the sleep mode (for example. L→H, step F1). Following this, the implementation of the writing in the output timing register 113 sets the timing at which the level of the output terminal 110 is changed during the sleep mode (step F2).

Thereafter, the CPU 102 performs the writing in an internal register (not shown) of the clock control circuit 104 to set a duration of the sleep mode (step F3), and issues a sleep command to the clock control circuit 104 (step F4). Upon receipt of the sleep command, the clock control circuit 104 outputs a clock stop signal to the main oscillation circuit 103 for stopping the oscillation operation. Concurrently, the clock control circuit 104 outputs a SLEEP signal to the port control circuit 106.

FIG. 28 is a timing chart showing the shifting to the sleep mode. When the SLEEP signal is made active (high) as indicated by (e), the machine clock outputted from the main oscillation circuit 103 stops as indicated by (d). Moreover, the timer 111 of the port control circuit 106 starts its counting operation at the rising of the SLEEP signal as indicated by (b). For example, set data "10" is set in the output timing register 113 as indicated by (a), and when the count value of the timer 11 reaches "10", the comparator 112 outputs a coincidence signal.

At this time, the level setting unit 115 changes the signal level of the output terminal 110 from L (low) to H (high). When the signal level of the output terminal 110 is changed to the high level, an external device connected to the output terminal 110 comes into an active state. Thereafter, when the set sleep duration elapses and the CPU 102 takes the wake-up state, the CPU 102 can immediately implement the necessary processing with respect to the external device. Moreover, after the implementation of the processing, the coincidence holding unit 114 is S/W-reset to return the signal level of the output terminal 110 to the original level.

As described above, according to the seventh embodiment, the port control circuit 106 of the microcomputer 101 changes the level of the output terminal 110 while the CPU 102 is set in the sleep mode. Therefore, since there is no need for the CPU 102 to continue the normal operation mode only for changing the level of the output terminal 110, the reduction of power dissipation is feasible.

In addition, since the port control circuit 106 changes the level of the output terminal 110 when the comparator 112 makes a comparison between the count value of the timer 11 and the value of the output timing register 113 and outputs a trigger signal when they agree with each other, the level of the output terminal 110 can be changed at the timing set in the register 113. Moreover, since the register 113 is constructed so that an arbitrary data value can be set by the CPU 102, the level change timing can arbitrarily be set through a user program.

Still additionally, since the level of the output terminal 110 can be reset by the CPU 102 when the release from the sleep mode takes place, the output terminal level can immediately be reset at the time that the CPU 102 has performed the necessary processing.

(Eighth Embodiment)

Figure 29:
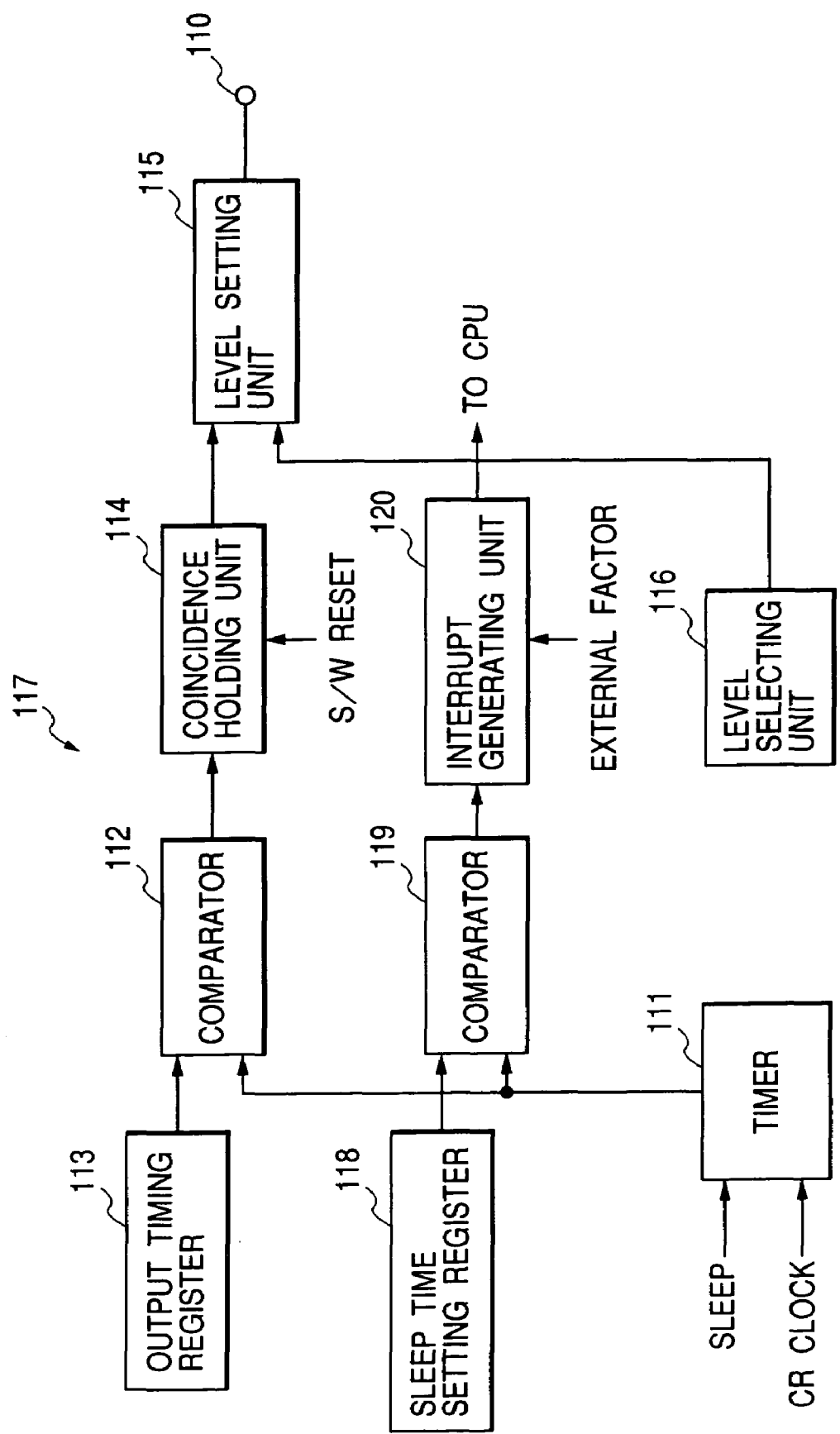
FIG. 29 is a block diagram showing an internal configuration of a port control circuit according to an eighth embodiment of the present invention.
Figure 30:
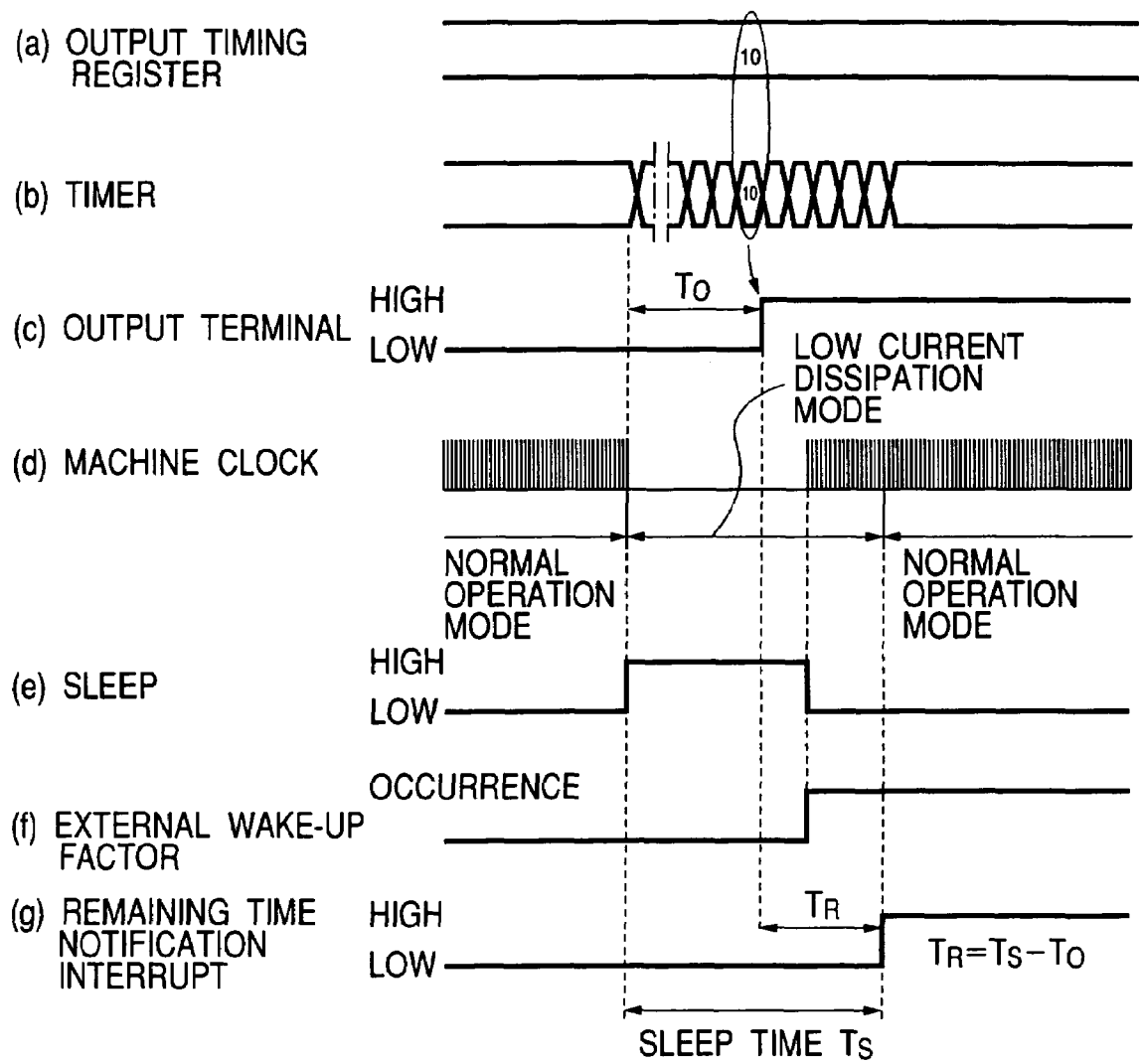
FIG. 30 is a timing chart showing the shifting to the sleep mode according to the eighth embodiment.

FIGS. 29 and 30 are illustrations useful for explaining an eighth embodiment of the present invention. In the illustrations, the same parts as those in the above-described seventh embodiment are marked with the same reference numerals, and the description thereof will be omitted for simplicity. A port control circuit 117 according to the eighth embodiment has an additional function as compared with the configuration according to the seventh embodiment. That is, a sleep time setting register 118 is additionally provided and the set data in the register 118 is compared with a count value of a timer 111 in a comparator 119.

The comparator 119 outputs a coincidence signal to an interrupt generation unit 120 at the time that they agree with each other. However, in a case in which an external wake-up factor occurs prior to the output of the coincidence signal from the comparator 119 and the release from the sleep mode takes place, upon receipt of the coincidence signal, the interrupt generation unit 120 makes a CPU 102 issue an interrupt request. That is, the timer 111, the sleep time setting register 18, the comparator 119 and the interrupt generation unit 120 constitute an interrupt generation means 121.

Secondly, referring to FIG. 30, a description will be given hereinbelow of an operation and effects of the eighth embodiment. First of all, the description starts at the function and purpose of the interruption generation means 121. Although the release from the sleep mode takes place by the occurrence of an external factor even prior to the elapse of the sleep time, if the release therefrom takes place due to the occurrence of an external factor after the port control circuit 106 changes the level of the output terminal 110 according to the function of the seventh embodiment, the following problems arise.

That is, as described in the seventh embodiment, the purpose that the port control circuit 106 changes the level of the output terminal 110 is that the CPU 102 immediately conducts the processing on an external device after the release from the sleep mode. Therefore, in general, a period of time from the change of the level of the output terminal 110 to the release from the sleep mode by the timer is set at a minimum time needed for making the external device active. This is because, if this time has redundancy, the current dissipation increases.

In such a situation, if the release from the sleep mode takes place prior to the elapse of the sleep time, since, at the time of the activation of the CPU 102, a necessary time does not elapse after the change of the level of the output terminal 110, there is a possibility that the external device is still in the inactive state. Moreover, at the time of the activation, the CPU 102 cannot learn the remaining time with respect to the necessary time.

For this reason, the purpose of the eighth embodiment is notifying the originally needed time to the CPU 102 by means of the interruption. That is, as shown in FIG. 30, after the port control circuit 117 changes the level of the output terminal 110 as in the case of the seventh embodiment, if an external factor occurs as indicated by (f) and the early release from the sleep mode takes place as indicated by (d) and (e), the interrupt generation unit 120 is made active. Moreover, when the original sleep time elapses and the comparator 119 outputs a coincidence signal, an interrupt is generated with respect to the CPU 102 at that time.

Therefore, owing to this interrupt signal, the CPU 102 can recognize the fact that the external device comes into an active state, and S/W-resets the level of the output terminal 110 after the implementation of the necessary processing.

As described above, according to the eighth embodiment, after the port control circuit 117 changes the level of the output terminal 110, when the release from the sleep mode takes place due to the occurrence of a release factor, the interrupt generation means 121 generates an interrupt request to the CPU 102 at a timing that the release from the sleep mode should be made by a release timer (not shown). Therefore, the CPU 102 can seize the signal level maintaining time changed with respect to the output terminal 110 and, after recognizing the interrupt request, can reset the level of the output terminal 110 when needed.

(Ninth Embodiment)

Figure 31:
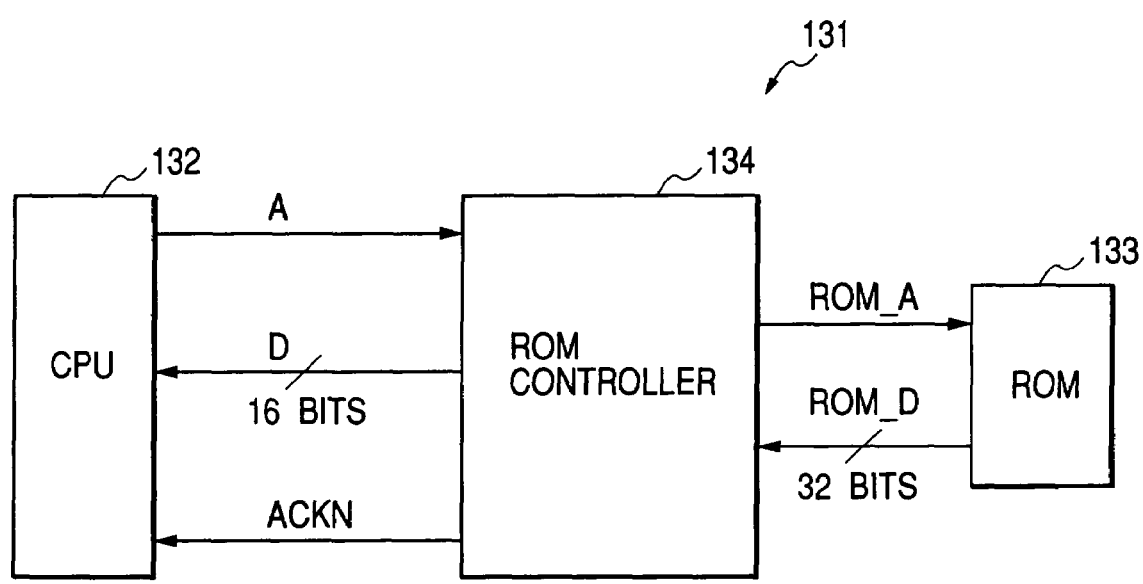
FIG. 31 is an illustration of a configuration of a microcomputer according to a ninth embodiment of the present invention.

Referring to FIGS. 31 to 34, a description will be given hereinbelow of a ninth embodiment of the present invention. FIG. 31 is an illustration of a configuration of a microcomputer 131. In FIG. 31, a CPU 132 has, for example, a 16-bit data bus configuration and reads out a program and data stored in a ROM 133 before the implementation. The ROM 133 is constructed with, for example, a flash ROM, and its data bus has a 32-bit width which is twice that of the CPU 132.

A ROM controller (memory interface circuit apparatus) 134 is interposed between the CPU 132 and the ROM 133, and the CPU 132 reads out data from the ROM 133 through the ROM controller 134. The ROM controller 134 outputs an address ROM_A, whereby a predetermined operation is conducted about a readout address A outputted from the CPU 132, to read out data ROM_D from the ROM 133. This data is outputted as data D to a CPU 132 side data bus at an appropriate timing.

That is, in the microcomputer 131, since the readout speed of the ROM 133 constructed with a flash ROM is lower than the processing speed of the CPU 132, the ROM 133 side data bus width is set to be twice the CPU 132 and the arbitration control therebetween is executed by the ROM controller 134.

Figure 32:
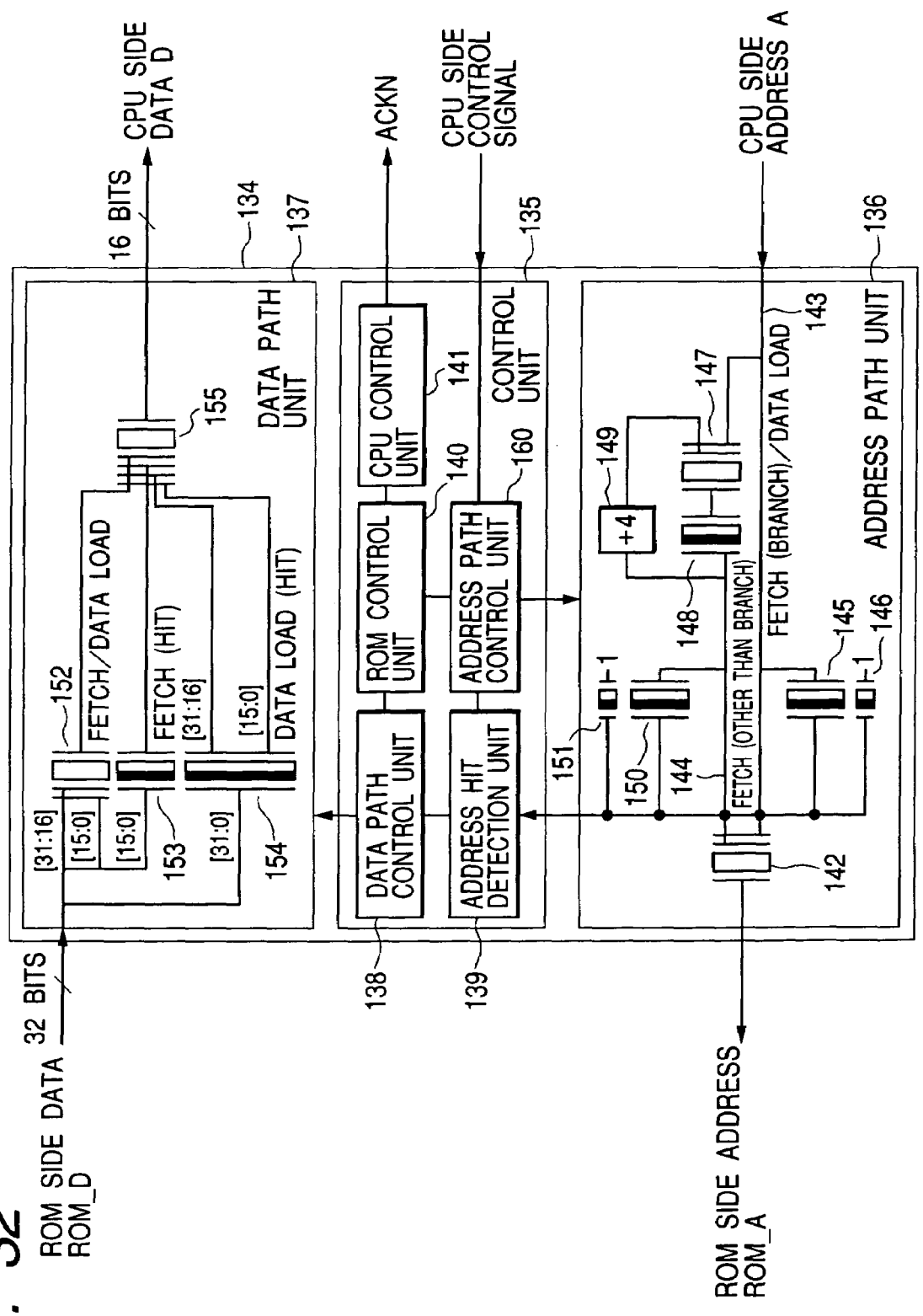
FIG. 32 is a block diagram showing an internal configuration of a ROM controller according to the ninth embodiment.

FIG. 32 is a block diagram showing an internal configuration of the ROM controller 134. The ROM controller 134 is composed of a control unit (data readout means, readout control means) 135, an address path unit 136, and a data path unit (readout control means) 137. The control unit 135 includes an address path control unit 160, a data path control unit 138, an address hit detection unit 139, a ROM control unit 140 and a CPU control unit 141.

The address path control unit 160 and the data path control unit 138 control the address path unit 136 and the data path unit 137, respectively. The address hit detection unit 139 detects the coincidence (hit) between an address retained in the address path unit 136 and an address outputted from the CPU 132. The CPU control unit 141 outputs a readout control signal (acknowledge signal ACKN) to the CPU 132. The readout control signal ACKN becomes a high level in the case of waiting for the ROM data readout, while a low level thereof indicates that the acknowledge is active. The ROM control unit 140 totalizes the control on these operations.

The address path unit 136 output an address through a multiplexer (MUX) 142 to the ROM 133. One input side of the MUX 142 is connected to a through path 143 directly connected to a CPU 132 side address bus, and the other input side thereof is connected to a counter side path 144.

An input side of a buffer (latch) 145 is also connected to the through path 143, and an output side of the buffer (address storage means) 145 is connected to the address hit detection unit 139. The buffer 145 stores an address outputted when the CPU 132 implements a data readout cycle.

Moreover, a bit outputting unit 146 sets a bit (valid bit) indicative of a ROM readout enable when a data readout address in the ROM 133 and data corresponding to this address are stored in the buffer 145 and a data buffer 154 which will be mentioned later, and the output side of the bit outputting unit 146 is connected to the address hit detection unit 139. The bit outputting unit 146 is reset through hardware.

On the other hand, on the counter path 144 side, there are located an MUX 147, a counter buffer address holding means) 148 and a counter (+4) 149. One input side of the MUX 147 is connected to the through path 143, and the other input side there is connected to the output side of the counter 149. Moreover, an output terminal of the MUX 147 is connected through the counter buffer 148 to the input side of the counter 149 and further to the counter side path 144.

In addition, as with the through path 143 side, the counter side path 144 is connected to the input side of a buffer 150, and the output side of the buffer 150 is connected to the address hit detection unit 139. Still additionally, the output side of a bit outputting unit 151 is also connected to the address hit detection unit 139.

As well as the bit outputting unit 146, when a TOM 133 instruction readout address and an instruction corresponding to this address are stored in the buffer 148 and an instruction buffer 153 which will be mentioned later, the bit outputting unit 151 sets a bit indicative of a ROM readout enable. If the instruction readout by the CPU 132 is conducted at a consecutive address, hit and mis-hit are alternately detected on the basis of the bit outputting unit 151, the buffer 153 and the CPU 132 side address A at every one cycle between the ROM controller 134 and the ROM 133.

The data path unit 137 is composed of an MUX 152, the instruction buffer 153, a data buffer 154 and an MUX 155. To the input side of the MUX 152, there are connected, of 32-bit ROM_D, high-order 16 bits [31:16] and low-order 16 bits [15:0]. The instruction buffer 153 stores the low-order 16-bit data when the CPU 132 implements an instruction readout (instruction fetch) cycle with respect to the ROM 133.

The data buffer 154 stores the 32-bit data when the CPU 132 implements a data readout (data load) cycle with respect to the ROM 133. The MUX 155 selects one of the MUX 152, the instruction buffer 153, the high-order side of the data buffer 154 and the low-order side of the data buffer 154 to output it to the CPU 132 side data bus.

Figure 33:
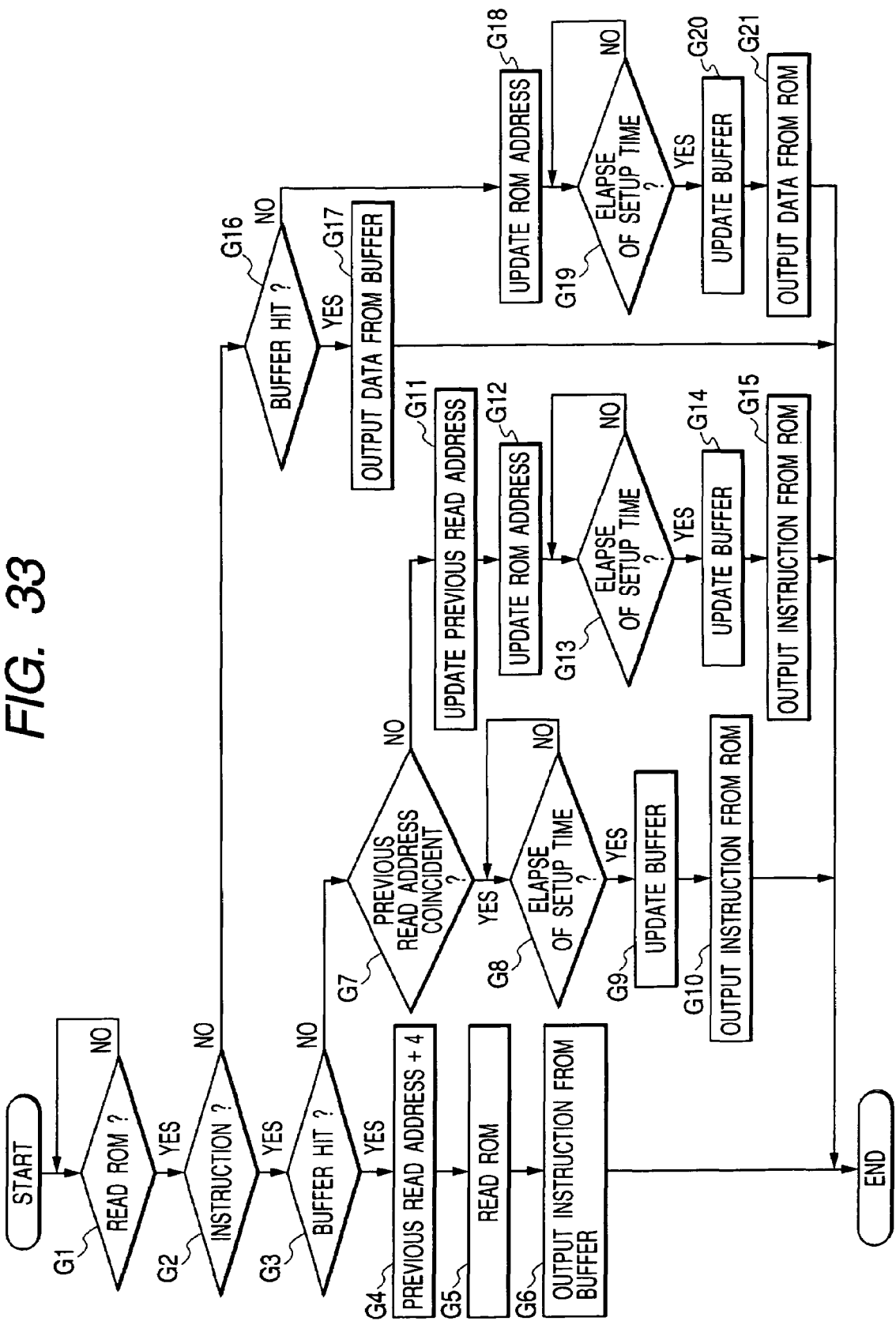
FIG. 33 is a flow chart showing the control contents in the ROM controller in a case in which a CPU implements a readout cycle with respect to a ROM according to the ninth embodiment.
Figure 34:
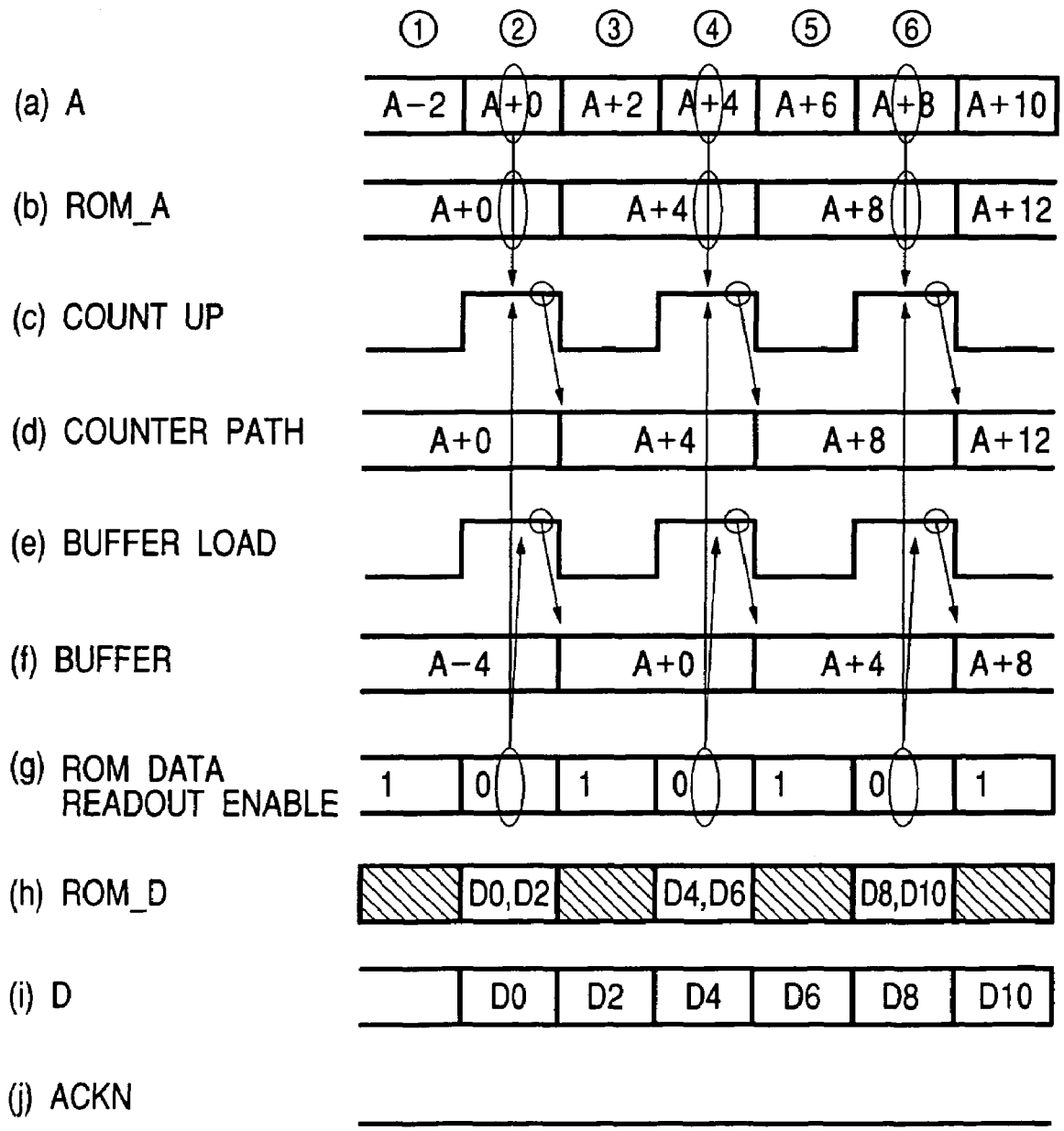
FIG. 34 is a timing chart showing a case in which a CPU continuously implements an instruction readout cycle according to the ninth embodiment.

FIG. 33 is a flow chart showing the control contents in the ROM controller 134 when the CPU 132 carries out a readout cycle with respect to the ROM 133, and the FIG. 34 is a timing chart when the CPU 132 continuously carries out instruction readout cycles. The ROM controller 134 is purely constructed with only hardware, and the flow chart shown in FIG. 33 shows an operation of the hardware.

A description will be given hereinbelow of the outline of the operation shown in FIG. 34. The CPU 132 performs the instruction readout in unit of 16 bits (2 bytes) as indicated by (a). In this case, the ROM controller 134 increments the address retained in its buffer 148 by "4" according to 32 bits of the data bus width of the ROM 133 to read out an instruction in unit of 32 bits (four bytes) as indicated by (b).

In addition, the ROM controller 134 outputs, of the read 32-bit instruction, the high-order 16 bits to the CPU 132 side data bus simultaneously with the readout, and once stores the low-order 16 bits in the buffer 153 as indicated by (h). Additionally, when the CPU 132 implements the next readout cycle, the instruction stored in the buffer 153 is outputted to the aforesaid data bus as indicated by (i).

Moreover, the control unit 135 outputs a count-up signal for increasing the address by "4" in the next cycle when the CPU address A agrees with the address retained in the counter buffer 148, as indicated by (c). Simultaneously, a load signal is outputted so that the address retained in the counter buffer 148 is loaded in the buffer 150 and the data read out from the ROM 133 is loaded in the buffer 153, as indicated by (e).

In FIG. 33, the control unit 135 takes a stand-by state until a readout cycle from the ROM 133 occurs in accordance with an output state of a decode signal from an external decoder (not shown) (step G1). Subsequently, if the aforesaid readout cycle occurs ("YES"), a decision is made as to whether or not the readout cycle is "instruction readout" (step 02).

A. <Instruction Readout: Address Continuation>

The control unit 135 refers to an access code or the like in a control signal outputted from the CPU 132, and when making a decision that it is "instruction readout" (step G2; "YES"), further makes a decision as to whether or this address hits the instruction buffer 153 (step G3).

If the instruction corresponding to the aforesaid address exists in the instruction buffer 153, a decision is made that it hits the instruction buffer 153 ("YES"), and the control unit 135 updates the value of the buffer 148 (through the MUX 147) on the basis of an address obtained by adding by "4" in the counter 149 (step G4). In this connection, when the bit outputting unit 51 outputs "1" and the address stored in the buffer 150 agrees with the CPU 132 side address A, the control unit 135 makes a decision that, of the instruction, the low-order 16 bits are in a hitting state.

Moreover, the aforesaid address is outputted through the MUX 142 to the ROM 133 side address bus to read out an instruction corresponding to 4 bytes (step G5). Subsequently, the control unit 135 outputs the instruction, hitting the instruction buffer 153 of the data path unit 137, from the buffer 153 to the CPU 132 side data bus.

In FIG. 34, the foregoing case corresponds to the cycle indicated by circled numeral 3. That is, when the CPU 132 outputs an address (A+2), an instruction D2 corresponding to this address is stored in the instruction buffer 153 through the readout by the ROM controller 134 in the previous cycles indicated by circled numerals 1 and 2. Therefore, in this case, the buffer hit occurs, and the instruction D2 is outputted from the buffer 153.

Simultaneously with this, in the case of the buffer hit, since the probability that an instruction is read out in succession (A+4) next time is high, the instruction readout according to the address (A+4) is made in advance in preparation for the next instruction readout.

Referring again to FIG. 33, if the decision in the step G3 shows no buffer hit ("NO"), the control unit 135 makes a decision as to whether or not the address at that time coincides with the address read out currently (step G7). If they agree with each other ("YES"), the operation waits for the elapse of the setup time until the readout at that time reaches completion (step G8, "YES"), and the contents of the buffer 153 are updated with the low-order 16 bits of the data read out (step G9). Moreover, the high-order 16 bits of the data read out are outputted intact to the CPU 132 side data bus (step G10).

For example, the aforesaid case corresponds to the cycle indicated by circled numeral 4 in FIG. 34. That is, when the CPU 132 outputs an address (A+4), although an instruction D4 corresponding to this address is not stored in the buffer 153 and, hence, a mis-hit buffer occurs, the address (A+4) coincides with the address (previously read address) for the readout made in the cycles indicated by circled numerals 3 and 4. Therefore, the control unit 135 outputs the high-order side D4 of the data, read out in the cycle indicated by circled numeral 4, to the CPU 132 side data bus and stores the low-order side D6 thereof in the buffer 153.

B. <Instruction Readout: Branch>

Furthermore, in the step G7, when a branch instruction in the program is executed, the address at that time does not agree with the previously read address ("NO"). At this time, the control unit 135 updates the previous read address (counter buffer 148) (step G11) and switches the MUX 142 to the through path 143 side to update the ROM address (step G12). Following this, the processing similar to the steps G8 to G10 is conducted (step G13 to G5).

C. <Data Readout>

In the step G2, when the CPU 132 executes the data readout cycle with respect to the ROM 133, the control unit 135 makes the "NO" decision and, hence, the operational flow advances to a step G16. For the CPU 132 to conduct the data loading, there are two cases of byte access and word (16 bits) access, and in any case, the ROM controller 134 simultaneously reads out, from the ROM 133, the data corresponding to 32 bits the readout object data pertains to. Moreover, the readout address in this case is stored in the buffer 145.

In addition, this 32-bit data is always stored in the data buffer 154 and one of the high-order 16-bit data and low-order 16-bit data the CPU 132 readout data pertains to is outputted through the MUXs 152 and 155 to the data bus.

That is, in the step G16, on the basis of the address stored in the buffer 145 and the bit of the bit outputting unit 146, the control unit 135 makes a decision as to whether or not the readout address hits the data buffer 154. If it hits the data buffer 154 ("YES"), the control unit 135 selects, through the MUX 155, the hit side 16-bit data from the data buffer 154 and outputs it to the CPU 132 side data bus (step G17). On the other hand, in the step G16, if the readout address does not hit the data buffer 154 ("NO"), the processing similar to the steps G12 to G15 is conducted on the data (steps G18 to G21).

As described above, according to the ninth embodiment, when the address outputted by the CPU 132 in the instruction readout cycle agrees with the address retained in the buffer 148, the control unit 135 of the ROM controller 134 increases the address value retained in the buffer 148 and reads out the data from the ROM 133 in the next cycle. Moreover, the instruction buffer 153 stores the data, read out by the control unit 135, by an excess amount over the bus width of the CPU 132, and when the CPU 132 implements an instruction readout cycle on the ROM 133 at a consecutive address next time, the control unit 135 outputs the data, retained in the instruction buffer 153, to the data bus of the CPU 132.

That is, even in a case in which the readout speed of the ROM 133 is low, when the CPU 132 executes the instruction readout at a consecutive address (address over the data bus width of the CPU 132), an instruction to be read out next time or afterwards is simultaneously read out in the current readout and stored in the instruction buffer 153, and the instruction is read out from the instruction buffer 153 in the next readout. Therefore, it is possible to reduce the wait cycle needed in the conventional technique when the CPU 132 performs the readout from the ROM 133, which leads to the enhancement of the processing efficiency.

In addition, when the CPU 132 carries out the data readout cycle with respect to the ROM 133, the data read out therefrom is stored in the data buffer 154, and when the CPU 132 implements the next data readout cycle and the readout address hits the data buffer 154, the control unit 135 outputs the data stored in the buffer 154 to the data bus of the CPU 132. That is, the data buffer 154 acts as a so-called data cache, which can enhance the CPU data readout efficiency.

(Tenth Embodiment)

Figure 35:
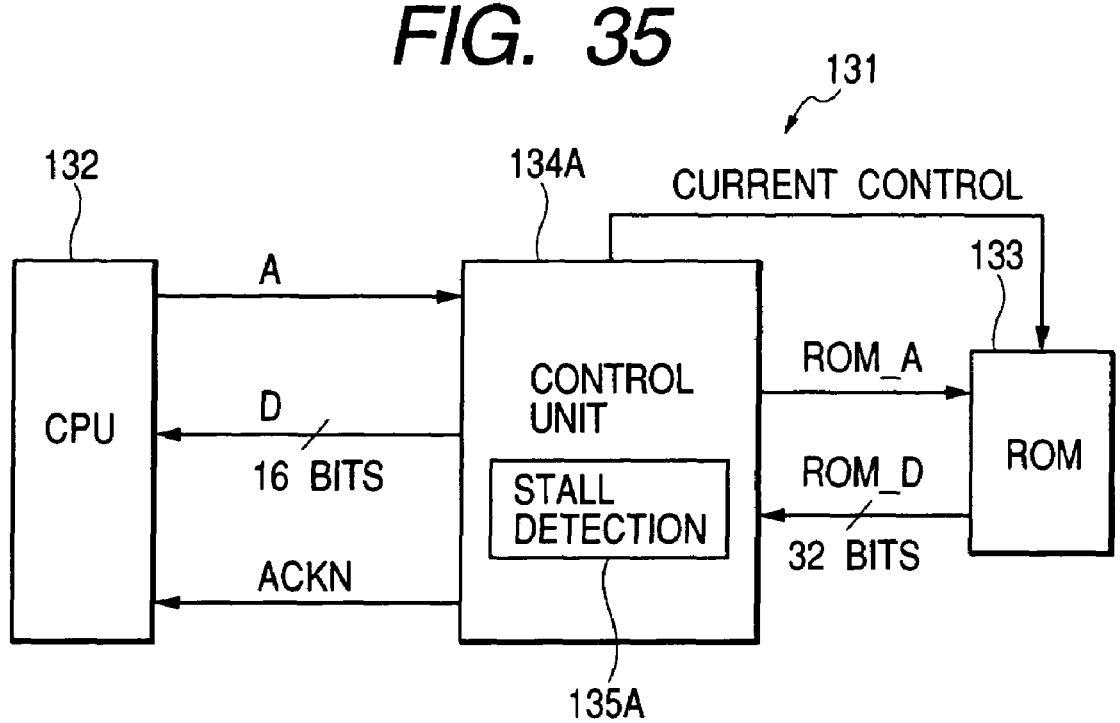
FIG. 35 is an illustration of a configuration of a microcomputer according to a tenth embodiment of the present invention.
Figure 36:
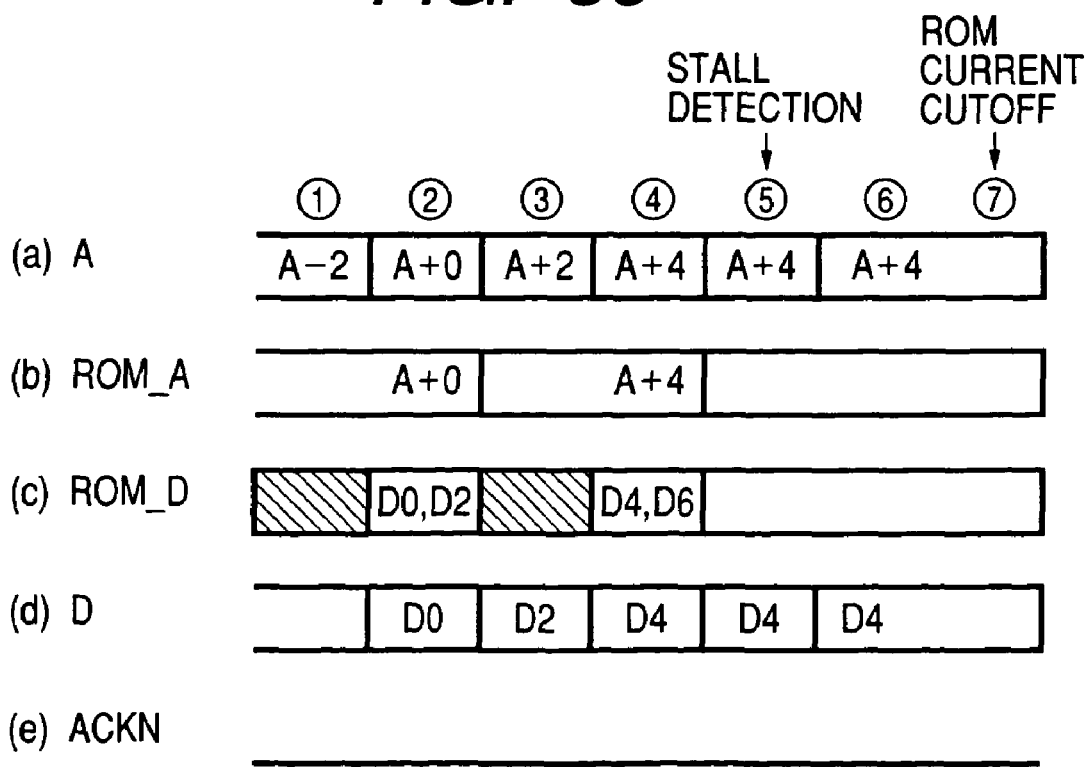
FIG. 36 is a flow chart showing the control contents in a ROM controller in a case in which a CPU implements a readout cycle with respect to a ROM according to the tenth embodiment.
Figure 37:
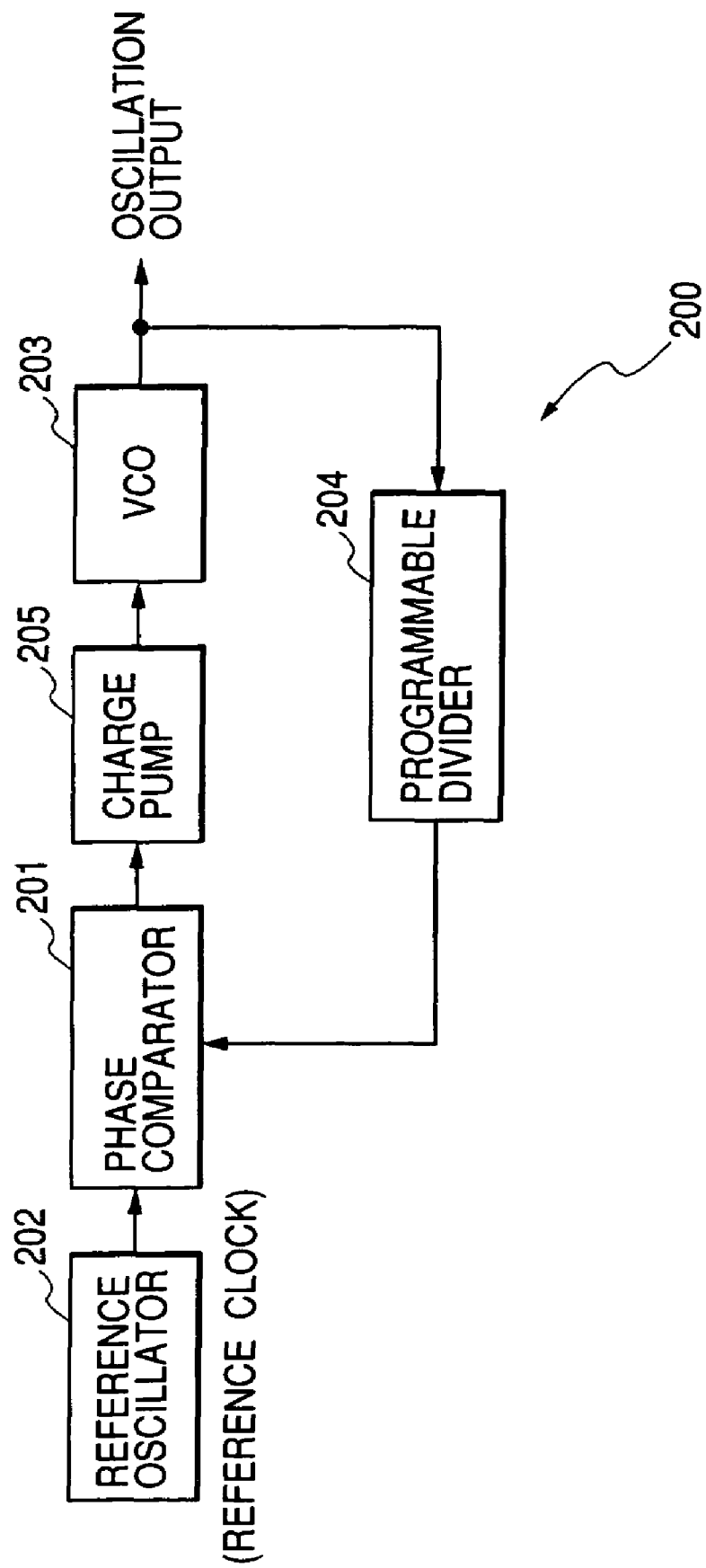
FIG. 37 is a functional block diagram schematically showing a configuration of a frequency multiplication circuit according to a conventional technique.
Figure 38:
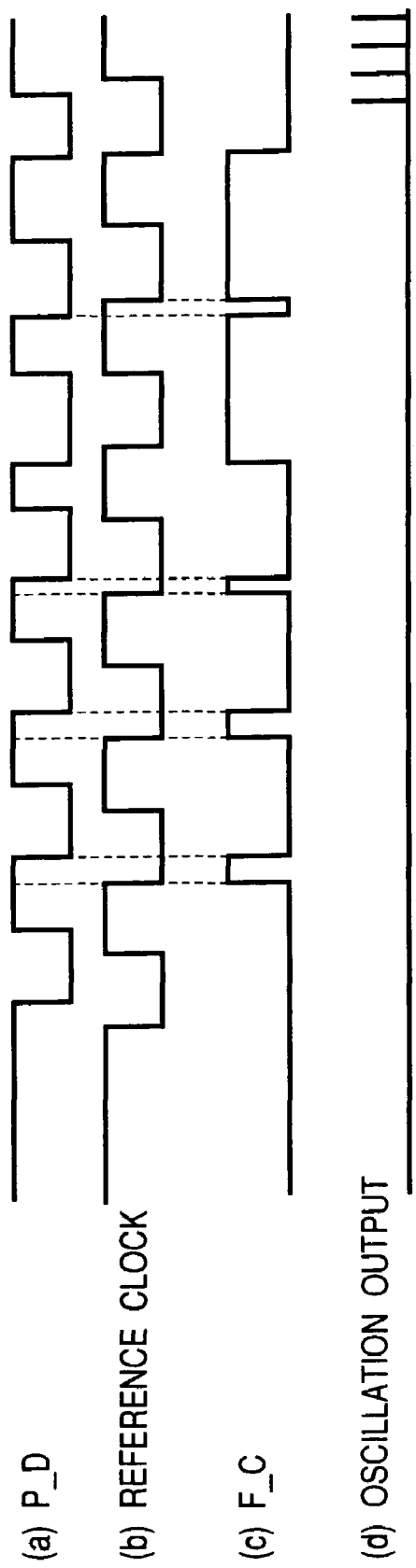
FIG. 38 is a timing chart showing the shifting to the sleep mode according to a conventional technique.
Figure 39:
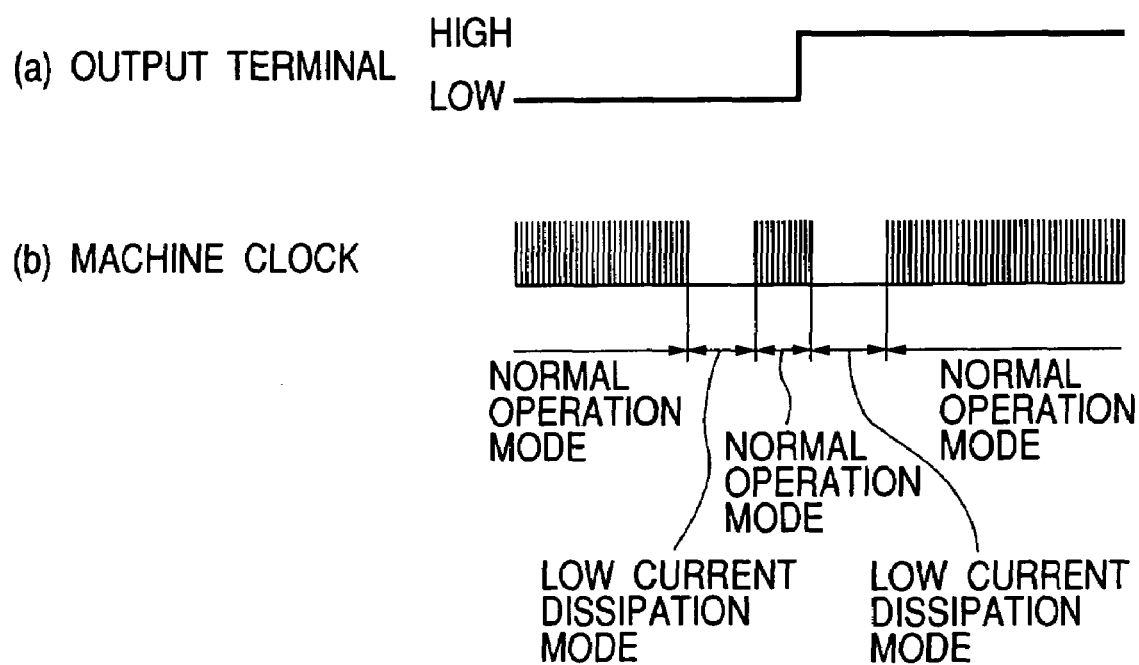
FIG. 39 is a timing chart showing the shifting to a sleep mode according to a conventional technique.

FIGS. 35 and 36 shows a tenth embodiment of the present invention. A description will be given hereinbelow of only a portion different from the above-described ninth embodiment.

As FIG. 35 shows, in the tenth embodiment, a control unit 135A of a ROM controller 134A has a function to detect that a CPU 132 falls into a stall state and, in this case, executes control to cut off a current of a ROM 133.

In a timing chart shown in FIG. 36, on the basis of the fact that, for example, address values (A+4) continuously take the same value in two cycles and at the timing of a cycle indicated by circled numeral 5, the control unit 135A detects that a stall occurs in the operation of the CPU 132.

Thereafter, if the stall state of the CPU 132 continues in two more cycles, the control unit 135A executes the control to cut off the dissipation current of the ROM 133. In this case, the "stall" includes, in addition to a stop of an internal arithmetic operation of the CPU 132 in an ordinary sense, a non-access state to the ROM 133 (for example, when access is made to other resources such as RAM or I/O). In this case, a decision can be made on the basis of the fact that the ROM 133 is not selected by a decode signal from an external decoder. For example, in the step G1 of FIG. 33, this decision can be made by measuring the time for which the decision shows "NO".

As described above, according to the tenth embodiment, the control unit 135A of the ROM controller 134A, when detecting that the CPU 132 falls into a stall state, stops the data readout from the ROM 133. Moreover, if the stall state of the CPU 132 continues for a predetermined period of time, the control unit 135A cuts off the dissipation current in the ROM 133. Therefore, the useless power dissipation is reducible.

It should be understood that the present invention is not limited to the above-described embodiments, and that it is intended to cover all changes and modifications of the embodiments of the invention herein which do not constitute departures from the spirit and scope of the invention.

For example, in the first embodiment, 1/N dividers 19 and 20 can be provided as needed. In the second embodiment, the main clock monitoring unit 7 is omissible. Moreover, in the second embodiment, the steps A0 and A4 are omissible. Still moreover, in the second embodiment, the fast correction operation is not always limited to the binary research method, but ii is also appropriate that the operation is made to start at relatively large adjustment signal data so that the absolute value thereof decreases gradually.

In addition, in the fifth embodiment, the stopping the oscillation operation of the oscillation circuit apparatus is not always involved in the implementation of a low power dissipation mode. That is, a clock signal outputted from the oscillation circuit apparatus is not limited to being supplied as a CPU operation clock signal, but no limitation is imposed on applications. Accordingly, in a case in which, after the output of a clock signal is temporarily stopped according to application, there is a need to resume the output thereof, it is applicable to broad application.

Still additionally, in the seventh embodiment, it is also appropriate that the data set in the output timing register 113 is fixed in a hardware-like manner. In the eighth embodiment, if the level change timer and the release timer are jointly put to use, the configuration can further be facilitated.

In the eighth embodiment, it is also possible that the interrupt generation timer is provided independently of the level change timer.

yet additionally, in a case in which the microcomputer 101 is equipped with a watch dog time for monitoring an operation of the CPU 102, a free run timer which performs a counting operation independently of an operation clock for the CPU 102, or the like, if the level change timer and these other timers are jointly put to use, then the configuration becomes simpler. However, in this case, when it is used as the level change timer, the count value of the watch dog timer or the like is read out at the time of the start of the timer operation and a value obtained by adding a count value corresponding to an output timing thereto is set in the output timing register. When the timers are jointly put to use, the software production and management becomes easy and the possibility of the occurrence of bug is reducible.

Moreover, in the ninth embodiment, it is also appropriate that the bus width of a buffer built in the memory interface circuit apparatus is made to be wider than the data bus width of the ROM. In this case, when the data readout means performs the readout from the ROM several times to store the data in the aforesaid buffer, the previous reading of much data becomes feasible.

Still moreover, in the ninth and tenth embodiments, it is also appropriate that the ROM is constructed by arranging two mats each having a 16-bit bus configuration. In this case, it is also appropriate that the ROM of the mat which does not undergo the readout by the ROM controller 134 is designed such that the dissipation current is cut off. This enables the useless power dissipation to be reducible when the ROM is constructed with a plurality of mats.

Yet moreover, in the tenth embodiment, it is also appropriate that all the dissipation currents in the ROM are cut off when the CPU 132 shifts to a low power dissipation mode such as sleep/stop. This enables reducing the useless power dissipation.

Additionally, in the tenth embodiment, it is also appropriate that the ROM controller 134A is designed such that, in a case in which the stall detection timing in the CPU 132 is, for example, in the cycle indicated by circled numeral 4 and the address (A+2) appears continuously, if the readout of the instruction data D2 and D4 which is in execution with respect to the ROM 133 at that time is continuable under other conditions, the readout thereof is continuously made until reaching completion. In this case, since the ROM controller 134A does not immediately stop the readout from the ROM 133 even if the stall state is detected, the readout efficiency is improvable.

What is claimed is:

1. A clock control circuit apparatus comprising:
an oscillation circuit generating a first clock signal oscillating at a first oscillating frequency;
a CR oscillation circuit for generating a second clock signal having a second oscillating frequency lower than the first oscillating frequency, the second oscillating frequency being made to be adjustable;
a correction circuit for correcting the second oscillating frequency based on the first clock signal; and
a monitoring circuit for monitoring an oscillating state of the first clock signal based on the second clock signal.

2. A microcomputer comprising:
a clock control circuit apparatus recited in claim 1:
a CPU receiving an operation clock signal produced based on the first clock signal; and
a timer for monitoring an operation of said CPU based on the second clock signal,
the timer having a first monitoring cycle being set to be equal to or longer than a second monitoring cycle of the monitoring circuit for monitoring the first clock signal.

3. A microcomputer comprising:
an oscillation circuit generating a first clock signal having a first oscillating frequency;
a CPU receiving an operation clock signal produced based on the first clock signal;
a CR oscillation circuit for generating a second clock signal having a second oscillating frequency lower than the first oscillating frequency; and
a correction circuit for correcting the second oscillating frequency based on the first clock signal,
said correction circuit including:
an edge detection circuit for detecting an edge of the second clock signal and generating an edge detecting signal;
a pulse counter for carrying out a counting operation based on the first clock signal;
a count setting register for storing a count value of the pulse counter corresponding to one cycle of the second clock signal;
a comparison adjuster for, receiving the edge detection signal from the edge detection circuit and simultaneously making a comparison between a count value of the pulse counter and the count value stored in the count setting register to produce an adjustment signal for the oscillation frequency of the CR oscillation circuit based on a difference between the count value of the pulse counter and the count value in the count setting register; and
an adjustment circuit for adjusting the oscillation frequency of the CR oscillation circuit based on the adjustment signal,
the comparison adjuster being made to gradually decrease an absolute value of a level of the adjustment signal when the adjustment circuit starts to run immediately after activating the CPU.

4. The microcomputer according to claim 3, wherein the comparison adjuster starts to adjust the level at a maximum value of an adjustment range in a first adjusting cycle and adjust the level at an absolute half value of the level in a preceding adjusting cycle in following cycles to the first adjusting cycle.

5. The microcomputer according to claim 3, wherein, the level has a minimum value thereof, and the comparison adjuster continues to adjust the level at the minimum value after an absolute value of the level reaches the minimum value.

6. The microcomputer according to claim 3, wherein the adjuster adjusts to gradually decrease the absolute value of the level at every the adjusting cycle, immediately after the CPU being activated.

7. A method of adjusting an oscillation frequency of a clock signal in a microcomputer comprising an oscillation circuit generating a first clock signal, a CPU receiving an operation clock signal produced based on the first clock signal, a CR oscillation circuit for generating a second clock signal having a second oscillating frequency lower than a first oscillating frequency of said first clock signal, the second oscillating frequency being made to be adjustable, and a correction circuit for correcting the second oscillating frequency based on the first clock signal,
in correcting the oscillation frequency of the second clock signal in the correction circuit, the method comprising the steps of:
detecting an edge of the second clock signal;

carrying out a counting operation based on the first clock signal;

retaining a count value corresponding to a single cycle of the second clock signal;

in response to an edge detection signal obtained by detecting the edge of the second clock signal, making a comparison between a count value obtained through the counting operation and the retained count value to produce an adjustment signal for the oscillation frequency of the CR oscillation circuit based on a difference between both the count values; and adjusting the oscillating frequency of the CR oscillation circuit based on the adjustment signal the adjustment signal gradually decreasing a level thereof from an absolute value of the level of immediately after the CPU being activated, at every adjustment cycle.

8. The method according to claim 7, wherein the adjusting step starts to adjust the level at a maximum value of an adjustment range in a first adjusting cycle and adjust the level an absolute half value of the level in an adjusting cycle preceding thereof at every the adjusting cycle following the first adjusting cycle.

9. The method according to claim 7, wherein the level has a minimum value thereof, and the adjusting step continues to adjust the level at the minimum value after an absolute value of the level reaches the minimum value.

10. The method according to claim 7, further comprising a selecting step for selecting whether or not the adjusting step decreases the absolute value of the level, immediately after activating the CPU.

* * * * *